United States Patent
Kim et al.

(10) Patent No.: US 10,306,568 B2
(45) Date of Patent: May 28, 2019

(54) METHOD FOR TRANSCEIVING SIGNAL IN WIRELESS COMMUNICATION SYSTEM AND APPARATUS THEREFOR

(71) Applicant: LG ELECTRONICS INC., Seoul (KR)

(72) Inventors: Hakseong Kim, Seoul (KR); Byounghoon Kim, Seoul (KR); Hanbyul Seo, Seoul (KR); Joonkui Ahn, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 45 days.

(21) Appl. No.: 15/301,290

(22) PCT Filed: Apr. 1, 2015

(86) PCT No.: PCT/KR2015/003239
§ 371 (c)(1),
(2) Date: Sep. 30, 2016

(87) PCT Pub. No.: WO2015/152629
PCT Pub. Date: Oct. 8, 2015

(65) Prior Publication Data
US 2017/0027013 A1 Jan. 26, 2017

Related U.S. Application Data

(60) Provisional application No. 61/974,405, filed on Apr. 2, 2014, provisional application No. 61/978,981, filed (Continued)

(51) Int. Cl.
*H04W 52/02* (2009.01)
*H04W 52/30* (2009.01)
(Continued)

(52) U.S. Cl.
CPC ..... *H04W 52/367* (2013.01); *H04W 52/0209* (2013.01); *H04W 52/30* (2013.01);
(Continued)

(58) Field of Classification Search
None
See application file for complete search history.

(56) References Cited

U.S. PATENT DOCUMENTS

2008/0069039 A1 3/2008 Li et al.
2011/0255450 A1 10/2011 Wang et al.
(Continued)

FOREIGN PATENT DOCUMENTS

CN 102845118 12/2012
JP 2013031172 2/2013
(Continued)

OTHER PUBLICATIONS

LG Electronics, "Issues on Multiplexing of WAN and D2D," 3GPP TSG RAN WG1 #76bis, R1-141354, Mar. 2014, 10 pages.
(Continued)

*Primary Examiner* — Jutai Kao
(74) *Attorney, Agent, or Firm* — Lee Hong Degerman Kang Waimey

(57) ABSTRACT

Disclosed is a method for transceiving D2D data in a wireless communication system supporting device-to-device (D2D) communication, the method carried out by a first terminal comprising the step of transceiving a signal with a second terminal by means of a frame comprising one or more from among a first subframe to which a resource associated with D2D communication is allocated or a second subframe to which a resource associated with cellular communication is allocated, wherein if an overlap occurs between the first subframes or between the first subframe and the second subframe, then the signal transmission/
(Continued)

reception from the overlapped section or a subframe comprising the overlapped section is dropped.

5 Claims, 56 Drawing Sheets

Related U.S. Application Data on Apr. 13, 2014, provisional application No. 61/979,486, filed on Apr. 14, 2014, provisional application No. 61/982,844, filed on Apr. 22, 2014, provisional application No. 61/984,027, filed on Apr. 24, 2014.

(51) Int. Cl.
| | | |
|---|---|---|
| *H04W 52/36* | (2009.01) | |
| *H04W 52/38* | (2009.01) | |
| *H04W 72/04* | (2009.01) | |
| *H04W 76/14* | (2018.01) | |
| *H04W 76/28* | (2018.01) | |

(52) U.S. Cl.
CPC ......... *H04W 52/383* (2013.01); *H04W 72/04* (2013.01); *H04W 72/0413* (2013.01); *H04W 72/0446* (2013.01); *H04W 76/14* (2018.02); *H04W 76/28* (2018.02)

(56) References Cited

U.S. PATENT DOCUMENTS

| | | | |
|---|---|---|---|
| 2011/0282989 A1 | 11/2011 | Geirhofer et al. | |
| 2013/0178221 A1* | 7/2013 | Jung | H04L 9/0844 455/450 |
| 2013/0188546 A1 | 7/2013 | Turtinen et al. | |
| 2015/0257184 A1* | 9/2015 | Yamazaki | H04W 76/023 370/329 |
| 2018/0176871 A1* | 6/2018 | Li | H04W 72/02 |

FOREIGN PATENT DOCUMENTS

| | | |
|---|---|---|
| KR | 1020120049804 | 5/2012 |
| KR | 1020130039735 | 4/2013 |
| WO | 2012034269 | 3/2012 |
| WO | 2013/191360 | 12/2013 |

OTHER PUBLICATIONS

Qualcomm Incorporated, "Coexistence of D2D Discovery and WAN," 3GPP TSG-RAN WG1 #76bis, R1-141456, Mar. 2014, 6 pages.
PCT International Application No. PCT/KR2015/003239, International Search Report dated Jun. 30, 2015, 2 pages.
Korean Intellectual Property Office Application No. 10-2016-7026027, Notice of Allowance dated Mar. 30, 2017, 2 pages.
European Patent Office Application Serial No. 15772447.7, Search Report dated Oct. 30, 2017, 11 pages.
Japan Patent Office Application No. 2016-559167, Office Action dated Nov. 28, 2017, 4 pages.
LG Electronics, "Issues in Signal Transmissions and Receptions in D2D Operations", 3GPP TSG RAN WG1 Meeting #74, R1-133389, Aug. 2013, 6 pages.
Catt, "Multiplexing between cellular link and D2D link", 3GPP TSG RAN WG1 Meeting #75, R1-135093, Nov. 2013, 3 pages.
Ericsson, "On resource allocation for D2D broadcast communication", 3GPP TSG RAN WG1 Meeting #75, R1-135807, Nov. 2013, 2 pages.
LG Electronics, "Coexistence issues of WAN and D2D on multiple carriers", 3GPP TSG RAN WG1 Meeting #77, R1-142153, May 2014, 4 pages.
European Patent Office Application Serial No. 15772447.7, Office Action dated Nov. 19, 2018, 5 pages.
LG Electronics, "Remaining issues in supporting D2D over multiple carriers" R1-143185, 3GPP TSG RAN WG1 Meeting #78, Aug. 2014, 5 pages.
The State Intellectual Property Office of the People's Republic of China Application Serial No. 201580018268.0, Office Action dated Dec. 26, 2018, 13 pages.
LG Electronics, "Issues in Signal Transmissions and Receptions in D2D Operations", R1-133389, 3GPP TSG RAN WG1 Meeting #74, Aug. 2013, 6 pages.

* cited by examiner

METHOD FOR TRANSCEIVING SIGNAL IN WIRELESS COMMUNICATION SYSTEM AND APPARATUS THEREFOR

CROSS-REFERENCE TO RELATED APPLICATIONS

This application is the National Stage filing under 35 U.S.C. 371 of International Application No. PCT/KR2015/003239, filed on Apr. 1, 2015, which claims the bennifet of U.S. Provisional Application Nos. 61/974,405, filed on Apr. 2, 2014, 61/978,981, filed on Apr. 13, 2014, 61/979,486, filed on Apr. 14, 2014, 61,/982,844, filed on Apr. 22, 2014 and 61/984,027, filed on Apr. 24, 2014, the contents of which are all hereby incorporated by reference herein in their entirety.

TECHNICAL FIELD

The present invention relates to a wireless communication system and, more particularly, to a method for transmitting and receiving a signal in a wireless communication system supporting device-to-device communication and an apparatus supporting the same.

BACKGROUND ART

A mobile communication system has been developed to provide a voice service, while guaranteeing activity of users. However, coverage of a mobile communication system has extended up to a data service, as well as the voice service, and currently, an explosive increase in traffic has caused shortage of resources, and since users expect relatively high speed services, an advanced mobile communication system is required.

Requirements of a next-generation mobile communication system include accommodation of explosive data traffic, a remarkable increase in a transfer rate per use, accommodation of considerably increased number of connection devices, very low end-to-end latency, and high energy efficiency. To this end, various technologies such as dual connectivity, massive multiple input multiple output (MIMO), in-band full duplex, non-orthogonal multiple access (NOMA), super wideband, and device networking have been researched.

DISCLOSURE

Technical Problem

Therefore, an object of the present invention is to provide a method for solving a collision that may occur due to overlap between subframes by dropping a subframe with low priority or an overlap symbol of the subframe according to predefined priority rule.

Another object of the present invention is to provide a method for solving a collision that may occur due to overlap between subframes by setting different priorities for one or one or more subframes in consideration of attributes of subframes or a preceding/subsequent positional relationship of subframes.

Another object of the present invention is to provide a method for performing discontinuous transmission (DTX) in a partial region of a subframe having a lower priority level by a DTX length determined by comparing a timing advance (TA) value of an uplink (UL) subframe with a DTX length having a predetermined size.

Another object of the present invention is to provide a method for determining whether to perform dropping on signal transmission and reception in an overlap section according to various references when there is a continuous D2D transmission through one or one or more D2D subframes (SFs).

Another object of the present invention is to provide a method for providing a reference for a continuous D2D transmission.

Another object of the present invention is to provide a method for solving a collision of signals in consideration of a TA value, a power limitation, and the like, in a carrier aggregation (CA) situation.

Technical subjects of the present invention that may be obtained in the present invention are not limited to the foregoing technical subjects and any other technical subjects not mentioned herein may be easily understood by a person skilled in the art from the present disclosure and accompanying drawings.

Technical Solution

According to an aspect of the present invention, there is provided a method for transmitting and receiving a device-to-device (D2D) signal in a wireless communication system supporting D2D communication, which is performed by a first terminal, including: transmitting and receiving a signal to and from a second terminal through a frame including at least one of a first subframe to which resource related to D2D communication has been allocated and a second subframe to which resource related to cellular communication has been allocated, wherein when overlapping occurs between first subframes or between the first subframe and the second subframe, transmission and reception of a signal in an overlap section or in a subframe including the overlap section is dropped.

Also, in the present disclosure, dropping of transmission and reception of the signal may be setting puncturing, rate matching, discontinuous transmission (DTX) or an ending gap.

Also, in the present disclosure, dropping of transmission and reception of the signal may be performed on the basis of a timing advance (TA) value applied to each subframe.

Also, in the present disclosure, dropping of transmission and reception of the signal may take place when a TA value applied to the first subframe and a TA value applied to the second subframe are different.

Also, in the present disclosure, transmission and reception of the signal may be dropped in an overlap section of the first subframe or in the entire section of the first subframe.

Also, in the present disclosure, when one or one or more first subframes are consecutively positioned and a TA value is applied to all the consecutive first subframes, transmission and reception of a signal may not be dropped in a final portion of each of the subframes.

Also, in the present disclosure, when one or one or more first subframes are consecutively positioned and a TA value is applied to none of the consecutive first subframes, transmission and reception of a signal may be dropped in a final portion of a last subframe among the consecutive first subframes.

Also, in the present disclosure, when one or one or more first subframes are consecutively positioned and a first subframe without a TA is present in the middle of the consecutive first subframes, transmission and reception of a signal in a final portion of the first subframe without the TA may be dropped.

Also, in the present disclosure, when one or one or more first subframes are consecutively positioned, consecutive first subframes may not overlap.

Also, in the present disclosure, when one or one or more first subframes are consecutively positioned, all TA values applied to the first subframes may be the same, transmission may be performed on the same application in each of the first subframes, each of the first subframes may be scheduled by a single scheduling assignment (SA), the same medium access control (MAC) protocol data unit (PDU) may be transmitted in each of the first subframes, or subframe bundling may be applied to the one or one or more first subframes.

Also, in the present disclosure, when all TA values applied to the first subframes are the same and all synchronization references in the first subframes are the same, the one or one or more first subframes may be consecutively positioned.

Also, in the present disclosure, when a first subframe in which a D2D synchronization signal is transmitted and a first subframe in which a different D2D signal, excluding the D2D synchronization signal, is transmitted overlap, transmission and reception of a signal in the first subframe in which the different D2D signal, excluding the D2D synchronization signal, is transmitted may be dropped.

According to another aspect of the present invention, there is provided a method for transmitting and receiving a device-to-device (D2D) signal in a wireless communication system supporting D2D communication, which is performed by a first terminal, including: performing D2D transmission and reception with a second terminal through a first subframe of a first component carrier; and performing transmission and reception with the second terminal through a second subframe of a second component carrier, wherein the first subframe is a subframe to which resource related to D2D transmission and reception is allocated, the second subframe is a subframe to which resource related to WAN or cellular transmission and reception is allocated, and when the first subframe of the first component carrier and the second subframe of the second component carrier overlap, transmission and reception of a signal in an overlap section or in a subframe including the overlap section is dropped.

Also, in the present disclosure, when a set maximum transmission power value is exceeded due to simultaneous transmission of signals in the overlap section, transmission and reception of a signal in an overlap section or in a subframe including the overlap section may be dropped.

According to another aspect of the present invention, there is provided a terminal for transmitting and receiving a device-to-device (D2D) signal in a wireless communication system supporting D2D communication, including: a radio frequency (RF) unit configured to transmit and receive a wireless signal; and a processor functionally connected to the RF unit, wherein the processor controls transmission and reception of a signal to and from a different terminal through a frame including at least one of a first subframe to which resource related to D2D communication has been allocated and a second subframe to which resource related to cellular communication has been allocated, and when overlapping occurs between first subframes or between the first subframe and the second subframe, transmission and reception of a signal in an overlap section or in a subframe including the overlap section is dropped.

Advantageous Effects

According to embodiments of the present invention, since a specific subframe or an overlap symbol of a specific subframe is discontinuously transmitted in consideration of a priority rule, a collision that may occur due to overlap between subframes may be solved.

Advantages and effects of the present invention that may be obtained in the present invention are not limited to the foregoing effects and any other technical effects not mentioned herein may be easily understood by a person skilled in the art from the present disclosure and accompanying drawings.

DESCRIPTION OF DRAWINGS

The above and/or other aspects of the present invention will be more apparent by describing certain exemplary embodiments of the present invention with reference to the accompanying drawings, in which.

BEST MODES

Figure 1:
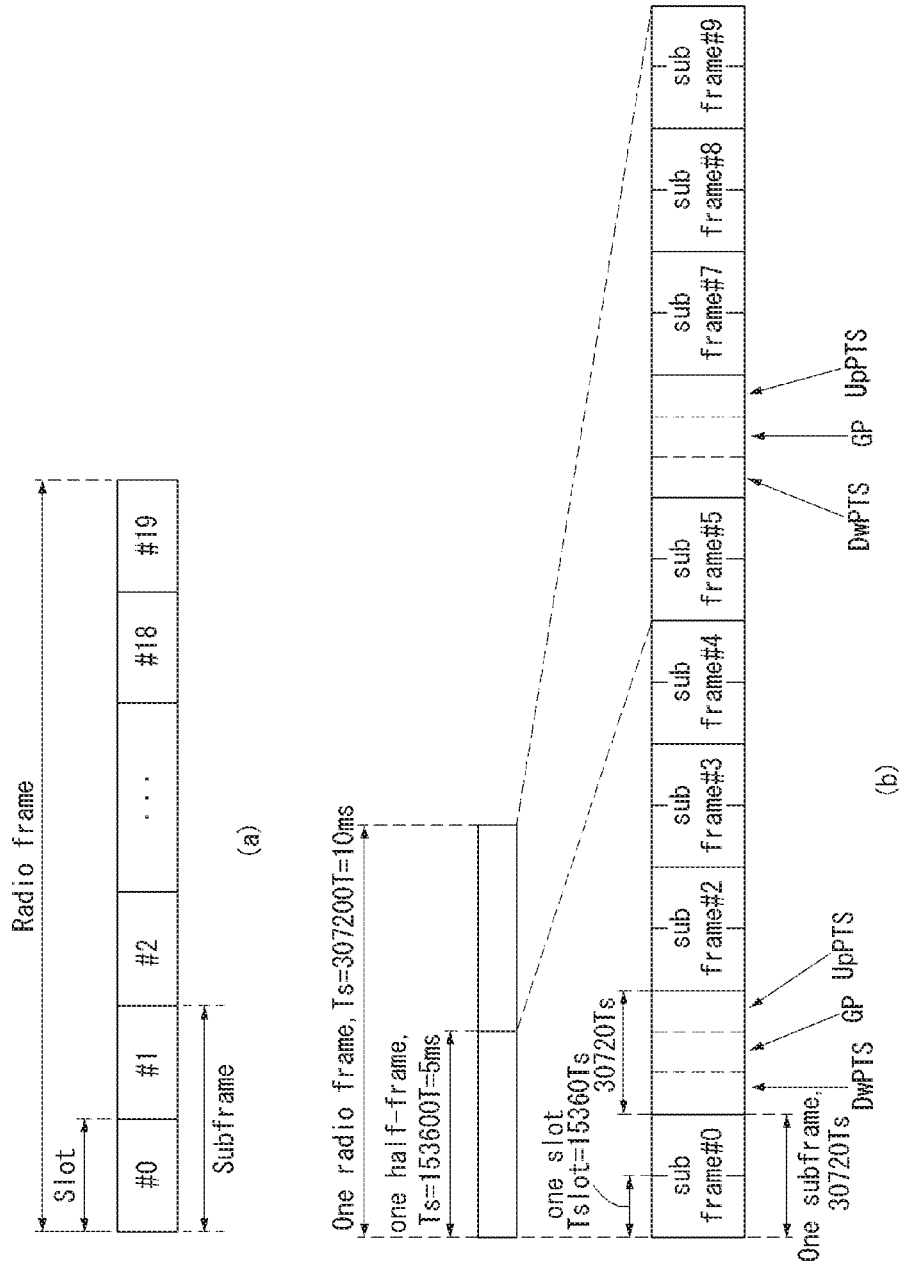
FIG. 1 is a view illustrating a structure of a radio frame in a wireless communication system to which the present invention is applicable.

Hereafter, preferred embodiments of the present invention will be described in detail with reference to the accompanying drawings. A detailed description to be disclosed hereinbelow together with the accompanying drawing is to describe embodiments of the present invention and not to describe a unique embodiment for carrying out the present invention. The detailed description below includes details in order to provide a complete understanding. However, those skilled in the art know that the present invention can be carried out without the details.

In some cases, in order to prevent a concept of the present invention from being ambiguous, known structures and devices may be omitted or may be illustrated in a block diagram format based on core function of each structure and device.

In the specification, a base station means a terminal node of a network directly performing communication with a terminal. In the present document, specific operations described to be performed by the base station may be performed by an upper node of the base station in some cases. That is, it is apparent that in the network constituted by multiple network nodes including the base station, various operations performed for communication with the terminal may be performed by the base station or other network nodes other than the base station. A base station (BS) may be generally substituted with terms such as a fixed station, Node B, evolved-NodeB (eNB), a base transceiver system (BTS), an access point (AP), and the like. Further, a 'terminal' may be fixed or movable and be substituted with terms such as user equipment (UE), a mobile station (MS), a user terminal (UT), a mobile subscriber station (MSS), a subscriber station (SS), an dvanced mobile station (AMS), a wireless terminal (WT), a Machine-Type Communication (MTC) device, a Machine-to-Machine (M2M) device, a Device-to-Device (D2D) device, and the like.

Hereinafter, a downlink means communication from the base station to the terminal and an uplink means communication from the terminal to the base station. In the downlink, a transmitter may be a part of the base station and a receiver may be a part of the terminal. In the uplink, the transmitter may be a part of the terminal and the receiver may be a part of the base station.

Specific terms used in the following description are provided to help appreciating the present invention and the use of the specific terms may be modified into other forms within the scope without departing from the technical spirit of the present invention.

The following technology may be used in various wireless access systems, such as code division multiple access (CDMA), frequency division multiple access (FDMA), time division multiple access (TDMA), orthogonal frequency division multiple access (OFDMA), single carrier-FDMA (SC-FDMA), non-orthogonal multiple access (NOMA), and the like. The CDMA may be implemented by radio technology universal terrestrial radio access (UTRA) or CDMA2000. The TDMA may be implemented by radio technology such as Global System for Mobile communications (GSM)/General Packet Radio Service (GPRS)/Enhanced Data Rates for GSM Evolution (EDGE). The OFDMA may be implemented as radio technology such as IEEE 802.11(Wi-Fi), IEEE 802.16(WiMAX), IEEE 802-20, E-UTRA (Evolved UTRA), and the like. The UTRA is a part of a universal mobile telecommunication system (UMTS). 3rd generation partnership project (3GPP) long term evolution (LTE) as a part of an evolved UMTS (E-UMTS) using evolved-UMTS terrestrial radio access (E-UTRA) adopts the OFDMA in a downlink and the SC-FDMA in an uplink. LTE-advanced (A) is an evolution of the 3GPP LTE.

The embodiments of the present invention may be based on standard documents disclosed in at least one of IEEE 802, 3GPP, and 3GPP2 which are the wireless access systems. That is, steps or parts which are not described to definitely show the technical spirit of the present invention among the embodiments of the present invention may be based on the documents. Further, all terms disclosed in the document may be described by the standard document.

3GPP LTE/LTE-A is primarily described for clear description, but technical features of the present invention are not limited thereto.

General System

FIG. 1 illustrates a structure a radio frame in a wireless communication system to which the present invention can be applied.

In 3GPP LTE/LTE-A, radio frame structure type 1 may be applied to frequency division duplex (FDD) and radio frame structure type 2 may be applied to time division duplex (TDD) are supported.

FIG. 1(a) exemplifies radio frame structure type 1. The radio frame is constituted by 10 subframes. One subframe is constituted by 2 slots in a time domain. A time required to transmit one subframe is referred to as a transmissions time interval (TTI). For example, the length of one subframe may be 1 ms and the length of one slot may be 0.5 ms.

One slot includes a plurality of orthogonal frequency division multiplexing (OFDM) symbols in the time domain and includes multiple resource blocks (RBs) in a frequency domain. In 3GPP LTE, since OFDMA is used in downlink, the OFDM symbol is used to express one symbol period. The OFDM symbol may be one SC-FDMA symbol or symbol period. The resource block is a resource allocation wise and includes a plurality of consecutive subcarriers in one slot.

FIG. 1(b) illustrates frame structure type 2. Radio frame type 2 is constituted by 2 half frames, each half frame is constituted by 5 subframes, a downlink pilot time slot (DwPTS), a guard period (GP), and an uplink pilot time slot (UpPTS), and one subframe among them is constituted by 2 slots. The DwPTS is used for initial cell discovery, synchronization, or channel estimation in a terminal. The UpPTS is used for channel estimation in a base station and to match uplink transmission synchronization of the terminal. The guard period is a period for removing interference which occurs in uplink due to multi-path delay of a downlink signal between the uplink and the downlink.

In frame structure type 2 of a TDD system, an uplink-downlink configuration is a rule indicating whether the uplink and the downlink are allocated (alternatively, reserved) with respect to all subframes. Table 1 shows he uplink-downlink configuration.

TABLE 1

| Uplink-Downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

Referring to Table 1, for each sub frame of the radio frame, 'D' represents a subframe for downlink transmission, 'U' represents a subframe for uplink transmission, and 'S' represents a special subframe constituted by three fields such as the DwPTS, the GP, and the UpPTS. The uplink-downlink configuration may be divided into 7 configurations and the positions and/or the numbers of the downlink subframe, the special subframe, and the uplink subframe may vary for each configuration.

A time when the downlink is switched to the uplink or a time when the uplink is switched to the downlink is referred to as a switching point. Switch-point periodicity means a period in which an aspect of the uplink subframe and the downlink subframe are switched is similarly repeated and both 5 ms or 10 ms are supported. When the period of the downlink-uplink switching point is 5 ms, the special subframe S is present for each half-frame and when the period of the downlink-uplink switching point is 5 ms, the special subframe S is present only in a first half-frame.

In all configurations, subframes #0 and #5 and the DwPTS are intervals only the downlink transmission. The UpPTS and a subframe just subsequently to the subframe are continuously intervals for the uplink transmission.

The uplink-downlink configuration may be known by both the base station and the terminal as system information. The base station transmits only an index of configuration information whenever the uplink-downlink configuration information is changed to announce a change of an uplink-downlink allocation state of the radio frame to the terminal. Further, the configuration information as a kind of downlink control information may be transmitted through a physical downlink control channel (PDCCH) similarly to other scheduling information and may be commonly transmitted to all terminals in a cell through a broadcast channel as broadcasting information.

The structure of the radio frame is just one example and the number subcarriers included in the radio frame or the number of slots included in the subframe and the number of OFDM symbols included in the slot may be variously changed.

Figure 2:
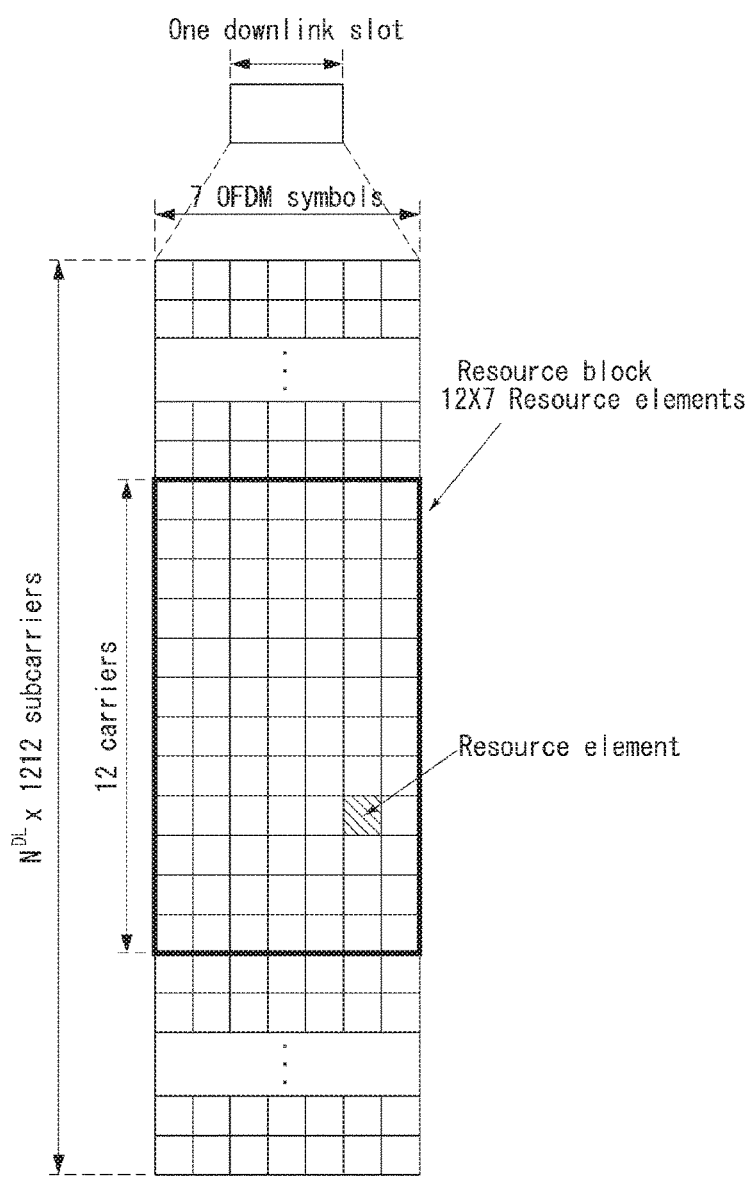
FIG. 2 is a view illustrating a resource grid of a downlink slot in a wireless communication system to which the present invention is applicable.

FIG. 2 is a diagram illustrating a resource grid for one downlink slot in the wireless communication system to which the present invention can be applied.

Referring to FIG. 2, one downlink slot includes the plurality of OFDM symbols in the time domain. Herein, it is exemplarily described that one downlink slot includes 7 OFDM symbols and one resource block includes 12 subcarriers in the frequency domain, but the present invention is not limited thereto.

Each element on the resource grid is referred to as a resource element and one resource block includes 12×7 resource elements. The number of resource blocks included in the downlink slot, NDL is subordinated to a downlink transmission bandwidth.

A structure of the uplink slot may be the same as that of the downlink slot.

Figure 3:
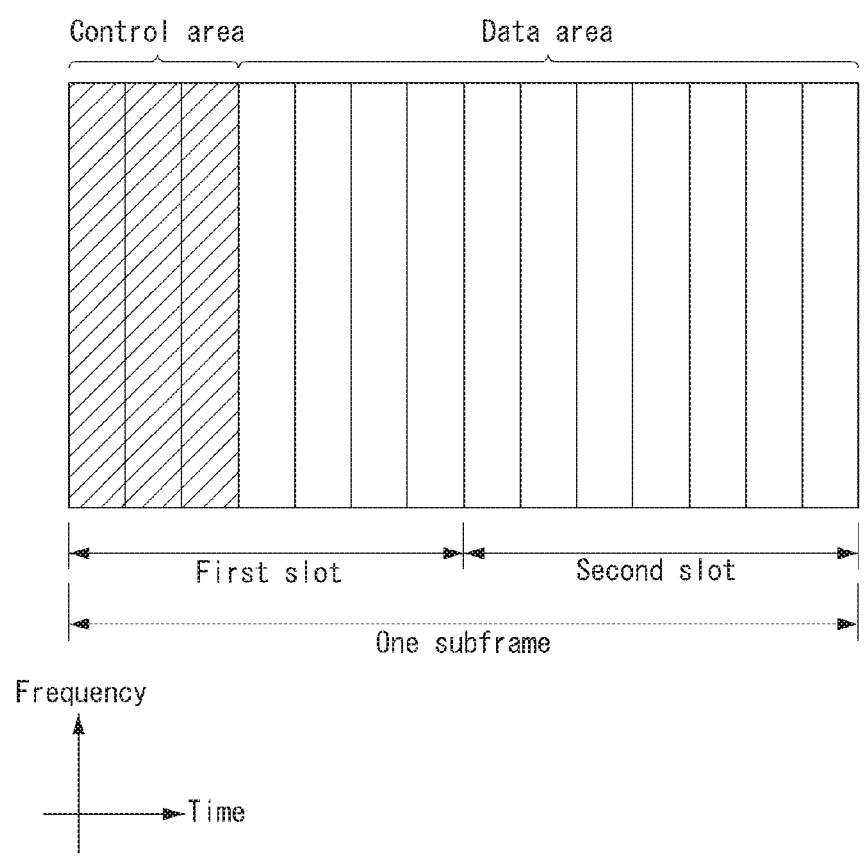
FIG. 3 is a view illustrating a structure of a downlink subframe in a wireless communication system to which the present invention is applicable.

FIG. 3 illustrates a structure of a downlink subframe in the wireless communication system to which the present invention can be applied.

Referring to FIG. 3, a maximum of three fore OFDM symbols in the first slot of the sub frame is a control region to which control channels are allocated and residual OFDM symbols is a data region to which a physical downlink shared channel (PDSCH) is allocated. Examples of the downlink control channel used in the 3GPP LTE include a Physical Control Format Indicator Channel (PCFICH), a Physical Downlink Control Channel (PDCCH), a Physical Hybrid-ARQ Indicator Channel (PHICH), and the like.

The PFCICH is transmitted in the first OFDM symbol of the subframe and transports information on the number (that is, the size of the control region) of OFDM symbols used for transmitting the control channels in the subframe. The PHICH which is a response channel to the uplink transports an Acknowledgement (ACK)/Not-Acknowledgement (NACK) signal for a hybrid automatic repeat request (HARQ). Control information transmitted through a PDCCH is referred to as downlink control information (DCI). The downlink control information includes uplink resource allocation information, downlink resource allocation information, or an uplink transmission (Tx) power control command for a predetermined terminal group.

The PDCCH may transport A resource allocation and transmission format (also referred to as a downlink grant) of a downlink shared channel (DL-SCH), resource allocation information (also referred to as an uplink grant) of an uplink shared channel (UL-SCH), paging information in a paging channel (PCH), system information in the DL-SCH, resource allocation for an upper-layer control message such as a random access response transmitted in the PDSCH, an aggregate of transmission power control commands for individual terminals in the predetermined terminal group, a voice over IP (VoIP). A plurality of PDCCHs may be transmitted in the control region and the terminal may monitor the plurality of PDCCHs. The PDCCH is constituted by one or an aggregate of a plurality of continuous control channel elements (CCEs). The CCE is a logical allocation wise used to provide a coding rate depending on a state of a radio channel to the PDCCH. The CCEs correspond to a plurality of resource element groups. A format of the PDCCH and a bit number of usable PDCCH are determined according to an association between the number of CCEs and the coding rate provided by the CCEs.

The base station determines the PDCCH format according to the DCI to be transmitted and attaches the control information to a cyclic redundancy check (CRC) to the control information. The CRC is masked with a unique identifier (referred to as a radio network temporary identifier (RNTI)) according to an owner or a purpose of the PDCCH. In the case of a PDCCH for a specific terminal, the unique identifier of the terminal, for example, a cell-RNTI (C-RNTI) may be masked with the CRC. Alternatively, in the case of a PDCCH for the paging message, a paging indication identifier, for example, the CRC may be masked with a paging-RNTI (P-RNTI). In the case of a PDCCH for the system information, in more detail, a system information block (SIB), the CRC may be masked with a system information identifier, that is, a system information (SI)-RNTI. The CRC may be masked with a random access (RA)-RNTI in order to indicate the random access response which is a response to transmission of a random access preamble.

Figure 4:
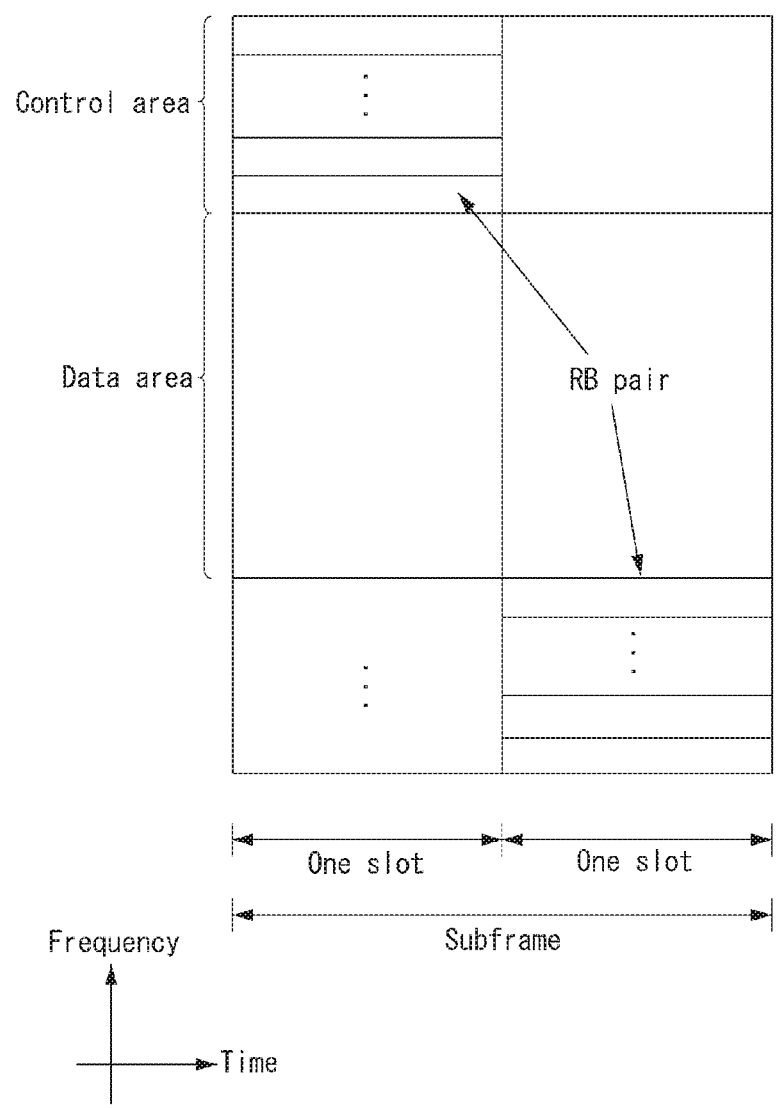
FIG. 4 is a view illustrating a structure of an uplink subframe in a wireless communication system to which the present invention is applicable.

FIG. 4 illustrates a structure of an uplink subframe in the wireless communication system to which the present invention can be applied.

Referring to FIG. 4, the uplink subframe may be divided into the control region and the data region in a frequency domain. A physical uplink control channel (PUCCH) transporting uplink control information is allocated to the control region. A physical uplink shared channel (PUSCH) transporting user data is allocated to the data region. One terminal does not simultaneously transmit the PUCCH and the PUSCH in order to maintain a single carrier characteristic.

A resource block (RB) pair in the subframe are allocated to the PUCCH for one terminal. RBs included in the RB pair occupy different subcarriers in two slots, respectively. The RB pair allocated to the PUCCH frequency-hops in a slot boundary.

Physical Uplink Control Channel (PUCCH)

The uplink control information (UCI) transmitted through the PUCCH may include a scheduling request (SR), HARQ ACK/NACK information, and downlink channel measurement information.

The HARQ ACK/NACK information may be generated according to a downlink data packet on the PDSCH is successfully decoded. In the existing wireless communication system, 1 bit is transmitted as ACK/NACK information with respect to downlink single codeword transmission and 2 bits are transmitted as the ACK/NACK information with respect to downlink 2-codeword transmission.

The channel measurement information which designates feedback information associated with a multiple input multiple output (MIMO) technique may include a channel quality indicator (CQI), a precoding matrix index (PMI), and a rank indicator (RI). The channel measurement information may also be collectively expressed as the CQI.

20 bits may be used per subframe for transmitting the CQI.

The PUCCH may be modulated by using binary phase shift keying (BPSK) and quadrature phase shift keying (QPSK) techniques. Control information of a plurality of terminals may be transmitted through the PUCCH and when code division multiplexing (CDM) is performed to distinguish signals of the respective terminals, a constant amplitude zero autocorrelation (CAZAC) sequence having a length of 12 is primary used. Since the CAZAC sequence has a characteristic to maintain a predetermined amplitude in the time domain and the frequency domain, the CAZAC sequence has a property suitable for increasing coverage by decreasing a peak-to-average power ratio (PAPR) or cubic metric (CM) of the terminal. Further, the ACK/NACK information for downlink data transmission performed through the PUCCH is covered by using an orthogonal sequence or an orthogonal cover (OC).

Further, the control information transmitted on the PUCCH may be distinguished by using a cyclically shifted sequence having different cyclic shift (CS) values. The cyclically shifted sequence may be generated by cyclically shifting a base sequence by a specific cyclic shift (CS) amount. The specific CS amount is indicated by the cyclic shift (CS) index. The number of usable cyclic shifts may vary depending on delay spread of the channel. Various types of sequences may be used as the base sequence the CAZAC sequence is one example of the corresponding sequence.

Further, the amount of control information which the terminal may transmit in one subframe may be determined according to the number (that is, SC-FDMA symbols other an SC-FDMA symbol used for transmitting a reference signal (RS) for coherent detection of the PUCCH) of SC-FDMA symbols which are usable for transmitting the control information.

In the 3GPP LTE system, the PUCCH is defined as a total of 7 different formats according to the transmitted control information, a modulation technique, the amount of control information, and the like and an attribute of the uplink control information (UCI) transmitted according to each PUCCH format may be summarized as shown in Table 2 given below.

TABLE 2

| PUCCH Format | Uplink Control Information (UCI) |
|---|---|
| Format 1 | Scheduling Request (SR) (unmodulated waveform) |
| Format 1a | 1-bit HARQ ACK/NACK with/without SR |
| Format 1b | 2-bit HARQ ACK/NACK with/without SR |
| Format 2 | CQI (20 coded bits) |
| Format 2 | CQI and 1- or 2-bit HARQ ACK/NACK (20 bits) for extended CP only |
| Format 2a | CQI and 1-bit HARQ ACK/NACK (20 + 1 coded bits) |
| Format 2b | CQI and 2-bit HARQ ACK/NACK (20 + 2 coded bits) |

PUCCH format 1 is used for transmitting only the SR. A waveform which is not modulated is adopted in the case of transmitting only the SR and this will be described below in detail.

PUCCH format 1a or 1b is used for transmitting the HARQ ACK/NACK. PUCCH format 1a or 1b may be used when only the HARQ ACK/NACK is transmitted in a predetermined subframe. Alternatively, the HARQ ACK/NACK and the SR may be transmitted in the same subframe by using PUCCH format 1a or 1b.

PUCCH format 2 is used for transmitting the CQI and PUCCH format 2a or 2b is used for transmitting the CQI and the HARQ ACK/NACK.

In the case of an extended CP, PUCCH format 2 may be transmitted for transmitting the CQI and the HARQ ACK/NACK.

Figure 5:
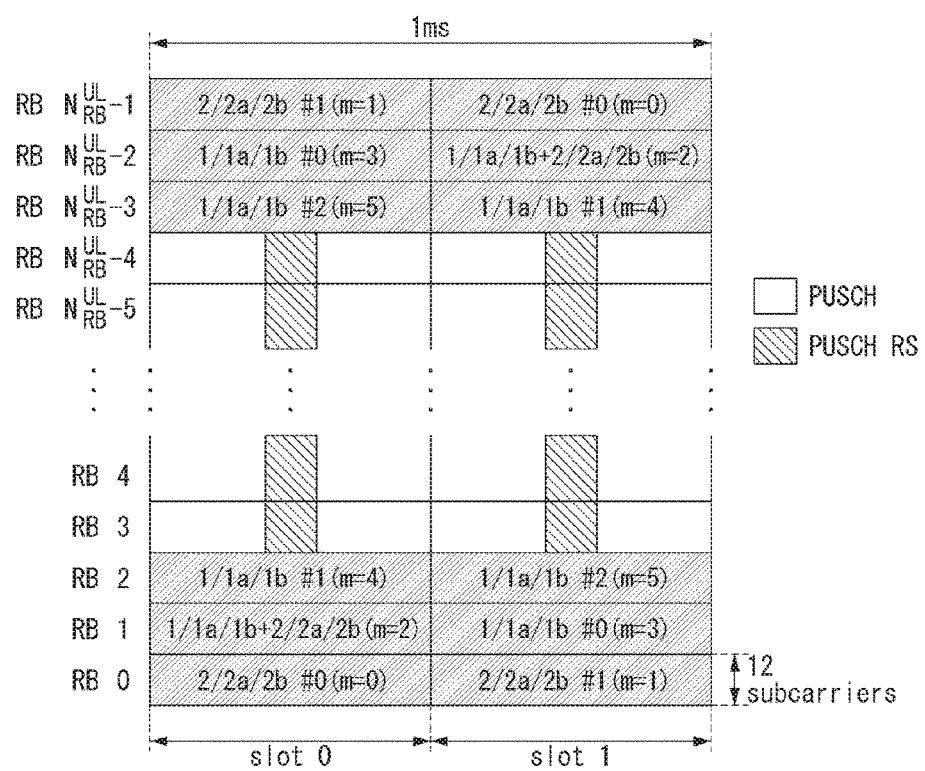
FIG. 5 is a view illustrating an example of a configuration in which PUCCH formats are mapped to PUCCH regions of an uplink physical resource block in a wireless communication system to which the present invention is applicable.

FIG. 5 illustrates one example of a type in which PUCCH formats are mapped to a PUCCH region of an uplink physical resource block in the wireless communication system to which the present invention can be applied.

In FIG. 5, $N_{RB}^{UL}$ a represents the number of resource blocks in the uplink and 0, 1, . . . , $N_{RB}^{UL}$−1 mean numbers of physical resource blocks. Basically, the PUCCH is mapped to both edges of an uplink frequency block. As illustrated in FIG. 5, PUCCH format 2/2a/2b is mapped to a PUCCH region expressed as m=0, 1 and this may be expressed in such a manner that PUCCH format 2/2a/2b is mapped to resource blocks positioned at a band edge. Further, both PUCCH format 2/2a/2b and PUCCH format 1/1a/1b may be mixedly mapped to a PUCCH region expressed as m=2. Next, PUCCH format 1/1a/1b may be mapped to a PUCCH region expressed as m=3, 4, and 5. The number ($N_{RB}^{(2)}$) of PUCCH RBs which are usable by PUCCH format 2/2a/2b may be indicated to terminals in the cell by broadcasting signaling.

PUCCH format 2/2a/2b is described. PUCCH format 2/2a/2b is a control channel for transmitting channel measurement feedback (CQI, PMI, and RI).

A reporting period of the channel measurement feedbacks (hereinafter, collectively expressed as CQI information) and a frequency wise (alternatively, a frequency resolution) to be measured may be controlled by the base station. In the time domain, periodic and aperiodic CQI reporting may be supported. PUCCH format 2 may be used for only the periodic reporting and the PUSCH may be used for aperiodic reporting. In the case of the aperiodic reporting, the base station may instruct the terminal to transmit a scheduling resource loaded with individual CQI reporting for the uplink data transmission.

Figure 6:
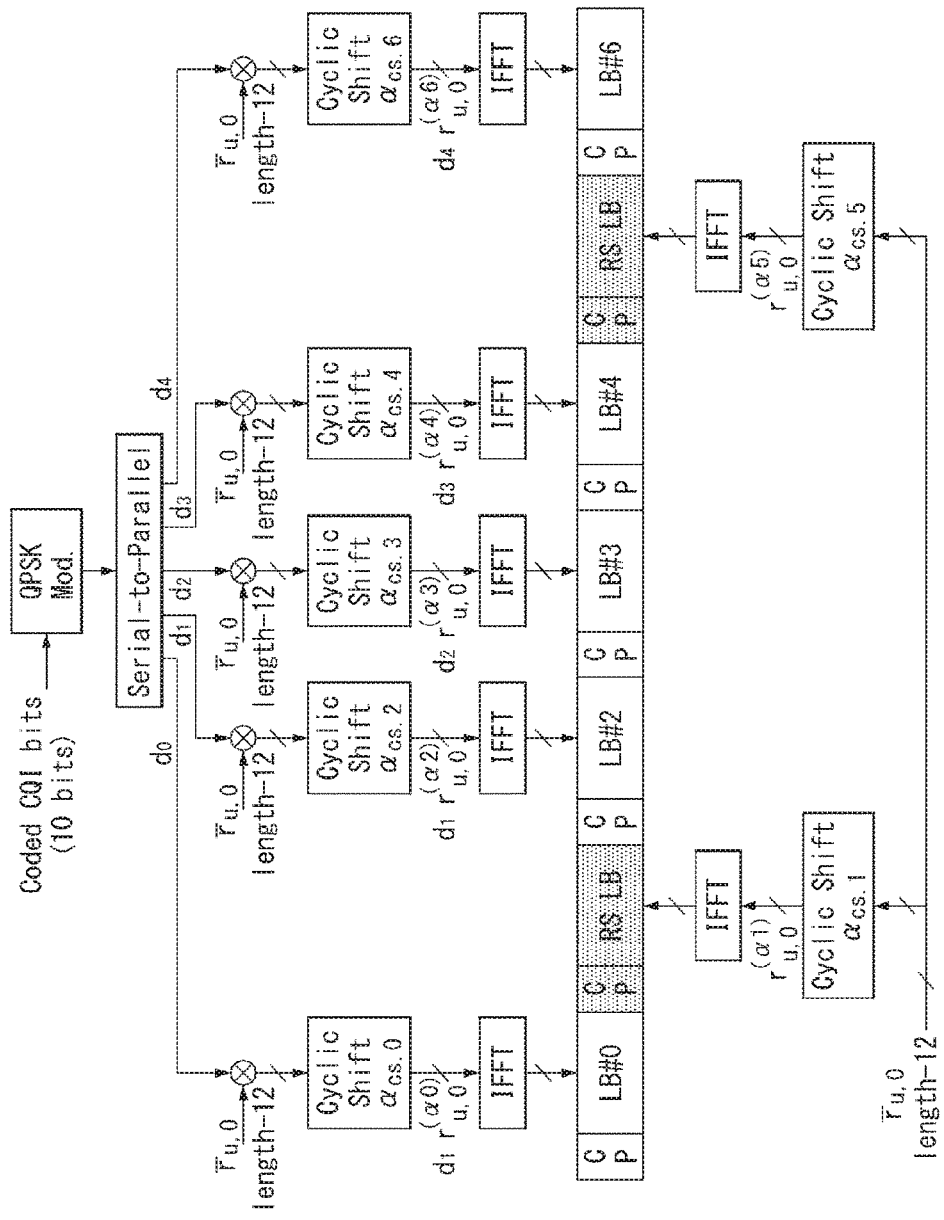
FIG. 6 is a view illustrating a structure of a CQI channel in case of a general CP in a wireless communication system to which the present invention is applicable.

FIG. 6 illustrates a structure of a CQI channel in the case of a general CP in the wireless communication system to which the present invention can be applied.

In SC-FDMA symbols 0 to 6 of one slot, SC-FDMA symbols 1 and 5 (second and sixth symbols) may be used for transmitting a demodulation reference signal and the CQI information may be transmitted in the residual SC-FDMA symbols. Meanwhile, in the case of the extended CP, one SC-FDMA symbol (SC-FDMA symbol 3) is used for transmitting the DMRS.

In PUCCH format 2/2a/2b, modulation by the CAZAC sequence is supported and the CAZAC sequence having the length of 12 is multiplied by a QPSK-modulated symbol. The cyclic shift (CS) of the sequence is changed between the symbol and the slot. The orthogonal covering is used with respect to the DMRS.

The reference signal (DMRS) is loaded on two SC-FDMA symbols separated from each other by 3 SC-FDMA symbols among 7 SC-FDMA symbols included in one slot and the CQI information is loaded on 5 residual SC-FDMA symbols. Two RSs are used in one slot in order to support a high-speed terminal. Further, the respective terminals are distinguished by using the CS sequence. CQI information symbols are modulated and transferred to all SC-FDMA symbols and the SC-FDMA symbol is constituted by one sequence. That is, the terminal modulates and transmits the CQI to each sequence.

The number of symbols which may be transmitted to one TTI is 10 and modulation of the CQI information is determined up to QPSK. When QPSK mapping is used for the SC-FDMA symbol, since a CQI value of 2 bits may be loaded, a CQI value of 10 bits may be loaded on one slot. Therefore, a CQI value of a maximum of 20 bits may be loaded on one subframe. A frequency domain spread code is used for spreading the CQI information in the frequency domain.

The CAZAC sequence (for example, ZC sequence) having the length of 12 may be used as the frequency domain spread code. CAZAC sequences having different CS values may be applied to the respective control channels to be distinguished from each to other. IFFT is performed with respect to the CQI information in which the frequency domain is spread.

12 different terminals may be orthogonally multiplexed on the same PUCCH RB by a cyclic shift having 12 equivalent intervals. In the case of a general CP, a DMRS sequence on SC-FDMA symbol 1 and 5 (on SC-FDMA symbol 3 in the case of the extended CP) is similar to a CQI signal sequence on the frequency domain, but the modulation of the CQI information is not adopted.

The terminal may be semi-statically configured by upper-layer signaling so as to periodically report different CQI, PMI, and RI types on PUCCH resources indicated as PUCCH resource indexes ($n_{PUCCH}^{(1,\tilde{p})}$, $n_{PUCCH}^{(2,\tilde{p})}$, and $n_{PUCCH}^{(3,\tilde{p})}$). Herein, the PUCCH resource index ($n_{PUCCH}^{(2,\tilde{p})}$) is information indicating the PUCCH region used for PUCCH format 2/2a/2b and a CS value to be used.

PUCCH Channel Structure

PUCCH formats 1a and 1b are described.

In PUCCH format 1a and 1b, the CAZAC sequence having the length of 12 is multiplied by a symbol modulated by using a BPSK or QPSK modulation scheme. For example, a result acquired by multiplying a modulated symbol d(0) by a CAZAC sequence r(n) (n=0, 1, 2, . . . , N−1) having a length of N becomes y(0), y(1), y(2), . . . , y(N−1). y(0), . . . , y(N−1) symbols may be designated as a block of symbols. The modulated symbol is multiplied by the CAZAC sequence and thereafter, the block-wise spread using the orthogonal sequence is adopted.

A Hadamard sequence having a length of 4 is used with respect to general ACK/NACK information and a discrete Fourier transform (DFT) sequence having a length of 3 is used with respect to the ACK/NACK information and the reference signal.

The Hadamard sequence having the length of 2 is used with respect to the reference signal in the case of the extended CP.

Figure 7:
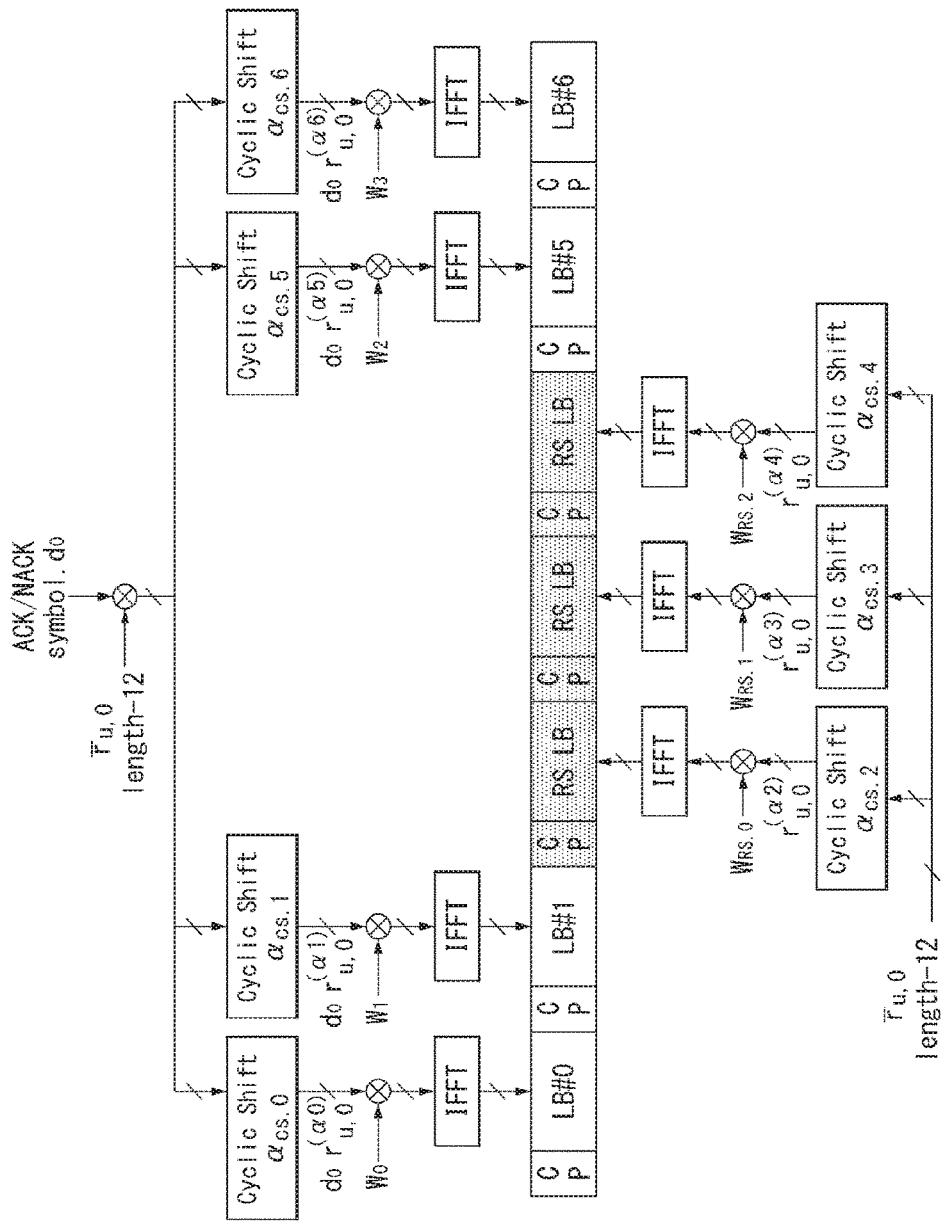
FIG. 7 is a view illustrating a structure of an ACK/NACK channel in case of a general CP in a wireless communication system to which the present invention is applicable.

FIG. 7 illustrates a structure of an ACK/NACK channel in the case of a general CP in the wireless communication system to which the present invention can be applied.

In FIG. 7, a PUCCH channel structure for transmitting the HARQ ACK/NACK without the CQI is exemplarily illustrated.

The reference signal (DMRS) is loaded on three consecutive SC-FDMA symbols in a middle part among 7 SC-FDMA symbols and the ACK/NACK signal is loaded on 4 residual SC-FDMA symbols.

Meanwhile, in the case of the extended CP, the RS may be loaded on two consecutive symbols in the middle part. The number of and the positions of symbols used in the RS may vary depending on the control channel and the numbers and the positions of symbols used in the ACK/NACK signal associated with the positions of symbols used in the RS may also correspondingly vary depending on the control channel.

Acknowledgment response information (not scrambled status) of 1 bit and 2 bits may be expressed as one HARQ ACK/NACK modulated symbol by using the BPSK and QPSK modulation techniques, respectively. A positive acknowledgement response (ACK) may be encoded as '1' and a negative acknowledgment response (NACK) may be encoded as '0'.

When a control signal is transmitted in an allocated band, 2-dimensional (D) spread is adopted in order to increase a multiplexing capacity. That is, frequency domain spread and time domain spread are simultaneously adopted in order to increase the number of terminals or control channels which may be multiplexed.

A frequency domain sequence is used as the base sequence in order to spread the ACK/NACK signal in the frequency domain. A Zadoff-Chu (ZC) sequence which is one of the CAZAC sequences may be used as the frequency domain sequence. For example, different CSs are applied to the ZC sequence which is the base sequence, and as a result, multiplexing different terminals or different control channels may be applied. The number of CS resources supported in an SC-FDMA symbol for PUCCH RBs for HARQ ACK/NACK transmission is set by a cell-specific upper-layer signaling parameter ($\Delta_{shift}^{PUCCH}$).

The ACK/NACK signal which is frequency-domain spread is spread in the time domain by using an orthogonal spreading code. As the orthogonal spreading code, a Walsh-Hadamard sequence or DFT sequence may be used. For example, the ACK/NACK signal may be spread by using an orthogonal sequence (w0, w1, w2, and w3) having the length of 4 with respect to 4 symbols. Further, the RS is also spread through an orthogonal sequence having the length of 3 or 2. This is referred to as orthogonal covering (OC).

Multiple terminals may be multiplexed by a code division multiplexing (CDM) scheme by using the CS resources in the frequency domain and the OC resources in the time domain described above. That is, ACK/NACK information and RSs of a lot of terminals may be multiplexed on the same PUCCH RB.

In respect to the time-domain spread CDM, the number of spreading codes supported with respect to the ACK/NACK information is limited by the number of RS symbols. That is, since the number of RS transmitting SC-FDMA symbols is smaller than that of ACK/NACK information transmitting SC-FDMA symbols, the multiplexing capacity of the RS is smaller than that of the ACK/NACK information.

For example, in the case of the general CP, the ACK/NACK information may be transmitted in four symbols and not 4 but 3 orthogonal spreading codes are used for the ACK/NACK information and the reason is that the number of RS transmitting symbols is limited to 3 to use only 3 orthogonal spreading codes for the RS.

In the case of the subframe of the general CP, when 3 symbols are used for transmitting the RS and 4 symbols are used for transmitting the ACK/NACK information in one slot, for example, if 6 CSs in the frequency domain and 3 orthogonal cover (OC) resources may be used, HARQ acknowledgement responses from a total of 18 different terminals may be multiplexed in one PUCCH RB. In the case of the subframe of the extended CP, when 2 symbols are used for transmitting the RS and 4 symbols are used for transmitting the ACK/NACK information in one slot, for example, if 6 CSs in the frequency domain and 2 orthogonal cover (OC) resources may be used, the HARQ acknowledgement responses from a total of 12 different terminals may be multiplexed in one PUCCH RB.

Next, PUCCH format 1 is described. The scheduling request (SR) is transmitted by a scheme in which the terminal requests scheduling or does not request the scheduling. An SR channel reuses an ACK/NACK channel structure in PUCCH format 1a/1b and is configured by an on-off keying (OOK) scheme based on an ACK/NACK channel design. In the SR channel, the reference signal is not transmitted. Therefore, in the case of the general CP, a sequence having a length of 7 is used and in the case of the extended CP, a sequence having a length of 6 is used. Different cyclic shifts (CSs) or orthogonal covers (OCs) may be allocated to the SR and the ACK/NACK. That is, the terminal transmits the HARQ ACK/NACK through a resource allocated for the SR in order to transmit a positive SR. The terminal transmits the HARQ ACK/NACK through a resource allocated for the ACK/NACK in order to transmit a negative SR.

Next, an enhanced-PUCCH (e-PUCCH) format is described. An e-PUCCH may correspond to PUCCH format 3 of an LTE-A system. A block spreading technique may be applied to ACK/NACK transmission using PUCCH format 3.

Figure 8:
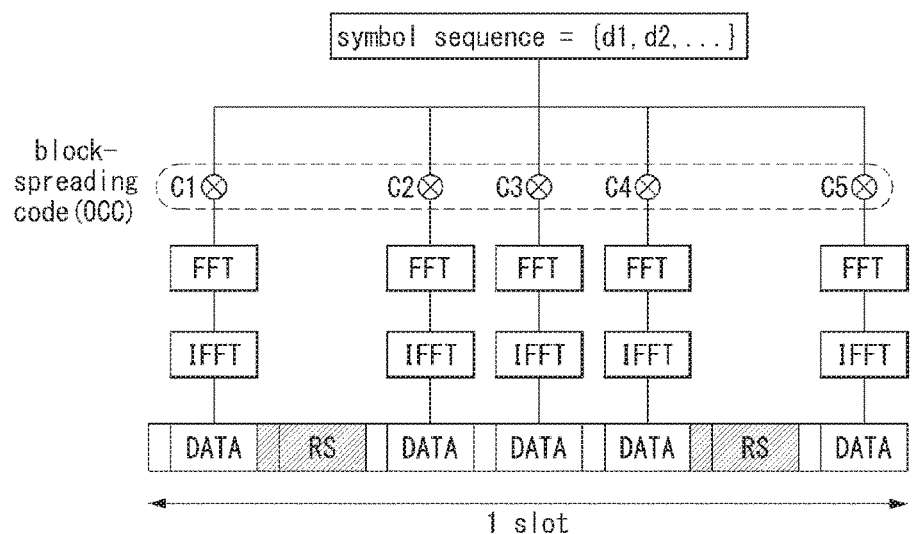
FIG. 8 is a view illustrating an example in which five SC-FDMA symbols are generated and transmitted during one slot in a wireless communication system to which the present invention is applicable.

The block spreading technique is a scheme that modulates transmission of the control signal by using the SC-FDMA scheme unlike the existing PUCCH format 1 series or 2 series. As illustrated in FIG. 8, a symbol sequence may be spread and transmitted on the time domain by using an orthogonal cover code (OCC). The control signals of the plurality of terminals may be multiplexed on the same RB by using the OCC. In the case of PUCCH format 2 described above, one symbol sequence is transmitted throughout the time domain and the control signals of the plurality of terminals are multiplexed by using the cyclic shift (CS) of the CAZAC sequence, while in the case of a block spreading based on PUCCH format (for example, PUCCH format 3), one symbol sequence is transmitted throughout the frequency domain and the control signals of the plurality of terminals are multiplexed by using the time domain spreading using the OCC.

FIG. 8 illustrates one example of generating and transmitting 5 SC-FDMA symbols during one slot in the wireless communication system to which the present invention can be applied.

In FIG. 8, an example of generating and transmitting 5 SC-FDMA symbols (that is, data part) by using an OCC having the length of 5 (alternatively, SF=5) in one symbol sequence during one slot. In this case, two RS symbols may be used during one slot.

In the example of FIG. 8, the RS symbol may be generated from a CAZAC sequence to which a specific cyclic shift value is applied and transmitted in a type in which a predetermined OCC is applied (alternatively, multiplied) throughout a plurality of RS symbols. Further, in the example of FIG. 8, when it is assumed that 12 modulated symbols are used for each OFDM symbol (alternatively, SC-FDMA symbol) and the respective modulated symbols are generated by QPSK, the maximum bit number which may be transmitted in one slot becomes 24 bits (=12×2). Accordingly, the bit number which is transmittable by two slots becomes a total of 48 bits. When a PUCCH channel structure of the block spreading scheme is used, control information having an extended size may be transmitted as compared with the existing PUCCH format 1 series and 2 series.

General Carrier Aggregation

A communication environment considered in embodiments of the present invention includes multi-carrier supporting environments. That is, a multi-carrier system or a carrier aggregation system used in the present invention means a system that aggregates and uses one or more component carriers (CCs) having a smaller bandwidth smaller than a target band at the time of configuring a target wideband in order to support a wideband.

In the present invention, multi-carriers mean aggregation of (alternatively, carrier aggregation) of carriers and in this case, the aggregation of the carriers means both aggregation between continuous carriers and aggregation between non-contiguous carriers. Further, the number of component carriers aggregated between the downlink and the uplink may be differently set. A case in which the number of downlink component carriers (hereinafter, referred to as 'DL CC') and the number of uplink component carriers (hereinafter, referred to as 'UL CC') are the same as each other is referred to as symmetric aggregation and a case in which the number of downlink component carriers and the number of uplink component carriers are different from each other is referred to as asymmetric aggregation. The carrier aggregation may be used mixedly with a term such as the carrier aggregation, the bandwidth aggregation, spectrum aggregation, or the like.

The carrier aggregation configured by combining two or more component carriers aims at supporting up to a bandwidth of 100 MHz in the LTE-A system. When one or more carriers having the bandwidth than the target band are combined, the bandwidth of the carriers to be combined may be limited to a bandwidth used in the existing system in order to maintain backward compatibility with the existing IMT system. For example, the existing 3GPP LTE system supports bandwidths of 1.4, 3, 5, 10, 15, and 20 MHz and a 3GPP LTE-advanced system (that is, LTE-A) may be configured to support a bandwidth larger than 20 MHz by using on the bandwidth for compatibility with the existing system. Further, the carrier aggregation system used in the preset invention may be configured to support the carrier aggregation by defining a new bandwidth regardless of the bandwidth used in the existing system.

The LTE-A system uses a concept of the cell in order to manage a radio resource.

The carrier aggregation environment may be called a multi-cell environment. The cell is defined as a combination of a pair of a downlink resource (DL CC) and an uplink resource (UL CC), but the uplink resource is not required. Therefore, the cell may be constituted by only the downlink resource or both the downlink resource and the uplink resource. When a specific terminal has only one configured serving cell, the cell may have one DL CC and one UL CC, but when the specific terminal has two or more configured serving cells, the cell has DL CCs as many as the cells and the number of UL CCs may be equal to or smaller than the number of DL CCs.

Alternatively, contrary to this, the DL CC and the UL CC may be configured. That is, when the specific terminal has multiple configured serving cells, a carrier aggregation environment having UL CCs more than DL CCs may also be supported. That is, the carrier aggregation may be appreciated as aggregation of two or more cells having different carrier frequencies (center frequencies). Herein, the described 'cell' needs to be distinguished from a cell as an area covered by the base station which is generally used.

The cell used in the LTE-A system includes a primary cell (PCell) and a secondary cell (SCell. The P cell and the S cell may be used as the serving cell. In a terminal which is in an RRC_CONNECTED state, but does not have the configured carrier aggregation or does not support the carrier aggregation, only one serving constituted by only the P cell is present. On the contrary, in a terminal which is in the RRC_CONNECTED state and has the configured carrier aggregation, one or more serving cells may be present and the P cell and one or more S cells are included in all serving cells.

The serving cell (P cell and S cell) may be configured through an RRC parameter. PhysCellId as a physical layer identifier of the cell has integer values of 0 to 503. SCellIndex as a short identifier used to identify the S cell has integer values of 1 to 7. ServCellIndex as a short identifier used to identify the serving cell (P cell or S cell) has the integer values of 0 to 7. The value of 0 is applied to the P cell and SCellIndex is previously granted for application to the S cell. That is, a cell having a smallest cell ID (alternatively, cell index) in ServCellIndex becomes the P cell.

The P cell means a cell that operates on a primary frequency (alternatively, primary CC). The terminal may be used to perform an initial connection establishment process or a connection re-establishment process and may be designated as a cell indicated during a handover process. Further, the P cell means a cell which becomes the center of control associated communication among serving cells configured in the carrier aggregation environment. That is, the terminal may be allocated with and transmit the PUCCH only in the P cell thereof and use only the P cell to acquire the system information or change a monitoring procedure. An evolved universal terrestrial radio access (E-UTRAN) may change only the P cell for the handover procedure to the terminal supporting the carrier aggregation environment by using an RRC connection reconfiguration message (RRC-ConnectionReconfigutaion) message of an upper layer including mobile control information (mobilityControlInfo).

The S cell means a cell that operates on a secondary frequency (alternatively, secondary CC). Only one P cell may be allocated to a specific terminal and one or more S cells may be allocated to the specific terminal. The S cell may be configured after RRC connection establishment is achieved and used for providing an additional radio resource. The PUCCH is not present in residual cells other than the P cell, that is, the S cells among the serving cells configured in the carrier aggregation environment. The E-UTRAN may provide all system information associated with a related cell which is in an RRC_CONNECTED state through a dedicated signal at the time of adding the S cells to the terminal that supports the carrier aggregation environment. A change of the system information may be controlled by releasing and adding the related S cell and in this case, the RRC connection reconfiguration (RRCConnectionReconfigutaion) message of the upper layer may be used. The E-UTRAN may perform having different parameters for each terminal rather than broadcasting in the related S cell.

After an initial security activation process starts, the E-UTRAN adds the S cells to the P cell initially configured during the connection establishment process to configure a network including one or more S cells. In the carrier aggregation environment, the P cell and the S cell may operate as the respective component carriers. In an embodiment described below, the primary component carrier (PCC) may be used as the same meaning as the P cell and the secondary component carrier (SCC) may be used as the same meaning as the S cell.

Figure 9:
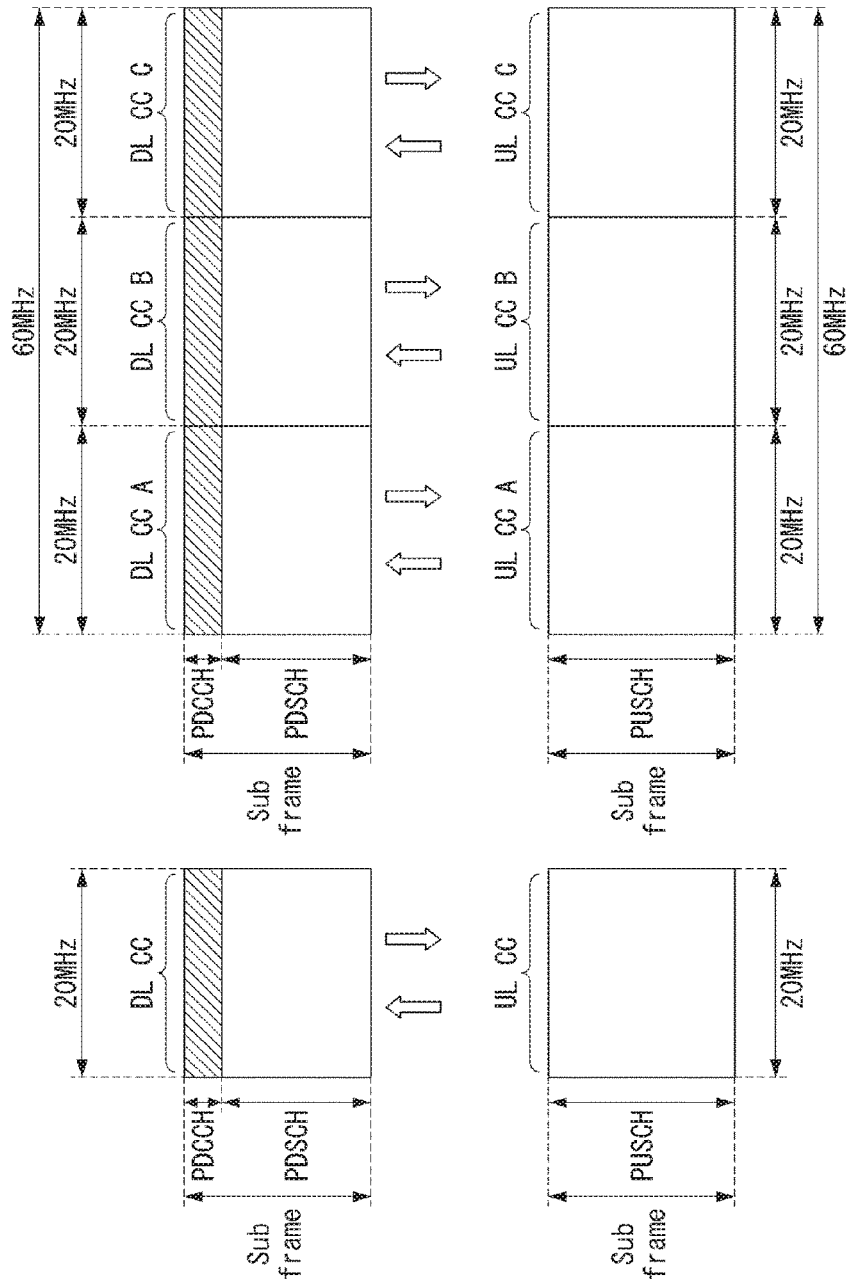
FIG. 9 is a view illustrating an example of merging component carriers and carriers in a wireless communication system to which the present invention is applicable.

FIG. 9 illustrates examples of a component carrier and carrier aggregation in the wireless communication system to which the present invention can be applied.

FIG. 9a illustrates a single carrier structure used in an LTE system. The component carrier includes the DL CC and the UL CC. One component carrier may have a frequency range of 20 MHz.

FIG. 9b illustrates a carrier aggregation structure used in the LTE system. In the case of FIG. 8b, a case is illustrated, in which three component carriers having a frequency magnitude of 20 MHz are combined. Each of three DL CCs and three UL CCs is provided, but the number of DL CCs and the number of UL CCs are not limited. In the case of carrier aggregation, the terminal may simultaneously monitor three CCs, and receive downlink signal/data and transmit uplink signal/data.

When N DL CCs are managed in a specific cell, the network may allocate M (M≤N) DL CCs to the terminal. In this case, the terminal may monitor only M limited DL CCs and receive the DL signal. Further, the network gives L (L≤M≤N) DL CCs to allocate a primary DL CC to the terminal and in this case, UE needs to particularly monitor L DL CCs. Such a scheme may be similarly applied even to uplink transmission.

A linkage between a carrier frequency (alternatively, DL CC) of the downlink resource and a carrier frequency (alternatively, UL CC) of the uplink resource may be indicated by an upper-layer message such as the RRC message or the system information. For example, a combination of the DL resource and the UL resource may be configured by a linkage defined by system information block type 2 (SIB2). In detail, the linkage may mean a mapping relationship between the DL CC in which the PDCCH transporting a UL grant and a UL CC using the UL grant and mean a mapping relationship between the DL CC (alternatively, UL CC) in which data for the HARQ is transmitted and the UL CC (alternatively, DL CC) in which the HARQ ACK/NACK signal is transmitted.

Cross Carrier Scheduling

In the carrier aggregation system, in terms of scheduling for the carrier or the serving cell, two types of a self-scheduling method and a cross carrier scheduling method are provided. The cross carrier scheduling may be called cross component carrier scheduling or cross cell scheduling.

The cross carrier scheduling means transmitting the PDCCH (DL grant) and the PDSCH to different respective DL CCs or transmitting the PUSCH transmitted according to the PDCCH (UL grant) transmitted in the DL CC through other UL CC other than a UL CC linked with the DL CC receiving the UL grant.

Whether to perform the cross carrier scheduling may be UE-specifically activated or deactivated and semi-statically known for each terminal through the upper-layer signaling (for example, RRC signaling).

When the cross carrier scheduling is activated, a carrier indicator field (CIF) indicating through which DL/UL CC the PDSCH/PUSCH the PDSCH/PUSCH indicated by the corresponding PDCCH is transmitted is required. For example, the PDCCH may allocate the PDSCH resource or the PUSCH resource to one of multiple component carriers by using the CIF. That is, the CIF is set when the PDSCH or PUSCH resource is allocated to one of DL/UL CCs in which the PDCCH on the DL CC is multiply aggregated. In this case, a DCI format of LTE-A Release-8 may extend according to the CIF. In this case, the set CIF may be fixed to a 3-bit field and the position of the set CIF may be fixed regardless of the size of the DCI format. Further, a PDCCH structure (the same coding and the same CCE based resource mapping) of the LTE-A Release-8 may be reused.

On the contrary, when the PDCCH on the DL CC allocates the PDSCH resource on the same DL CC or allocates the PUSCH resource on a UL CC which is singly linked, the CIF is not set. In this case, the same PDCCH structure (the same coding and the same CCE based resource mapping) and DCI format as the LTE-A Release-8 may be used.

When the cross carrier scheduling is possible, the terminal needs to monitor PDCCHs for a plurality of DCIs in a control region of a monitoring CC according to a transmission mode and/or a bandwidth for each CC. Therefore, a configuration and PDCCH monitoring of a search space which may support monitoring the PDCCHs for the plurality of DCIs are required.

In the carrier aggregation system, a terminal DL CC aggregate represents an aggregate of DL CCs in which the terminal is scheduled to receive the PDSCH and a terminal UL CC aggregate represents an aggregate of UL CCs in which the terminal is scheduled to transmit the PUSCH. Further, a PDCCH monitoring set represents a set of one or more DL CCs that perform the PDCCH monitoring. The PDCCH monitoring set may be the same as the terminal DL CC set or a subset of the terminal DL CC set. The PDCCH monitoring set may include at least any one of DL CCs in the terminal DL CC set. Alternatively, the PDCCH monitoring set may be defined separately regardless of the terminal DL CC set. The DL CCs included in the PDCCH monitoring set may be configured in such a manner that self-scheduling for the linked UL CC is continuously available. The terminal DL CC set, the terminal UL CC set, and the PDCCH monitoring set may be configured UE-specifically, UE group-specifically, or cell-specifically.

When the cross carrier scheduling is deactivated, the deactivation of the cross carrier scheduling means that the PDCCH monitoring set continuously means the terminal DL CC set and in this case, an indication such as separate signaling for the PDCCH monitoring set is not required. However, when the cross carrier scheduling is activated, the PDCCH monitoring set is preferably defined in the terminal DL CC set. That is, the base station transmits the PDCCH through only the PDCCH monitoring set in order to schedule the PDSCH or PUSCH for the terminal.

Figure 10:
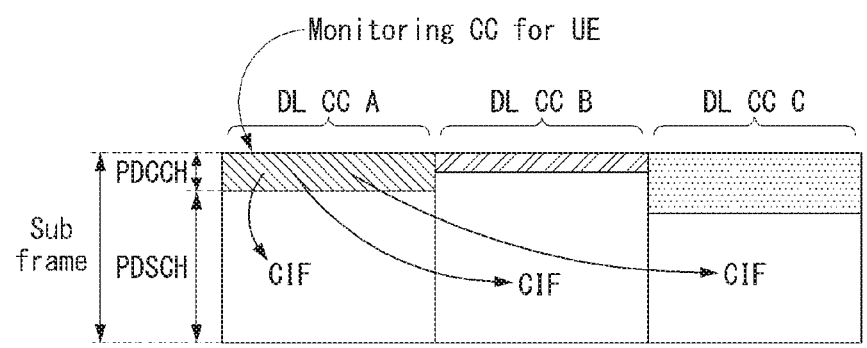
FIG. 10 is a view illustrating an example of a subframe structure according to cross-carrier scheduling in a wireless communication system to which the present invention is applicable.

FIG. 10 illustrates one example of a subframe structure depending on cross carrier scheduling in the wireless communication system to which the present invention can be applied.

Referring to FIG. 10, a case is illustrated, in which three DL CCs are associated with a DL subframe for an LTE-A terminal and DL CC'A' is configured as a PDCCH to monitoring DL CC. When the CIF is not used, each DL CC may transmit the PDCCH scheduling the PDSCH thereof without the CIF. On the contrary, when the CIF is used through the upper-layer signaling, only one DL CC 'A' may transmit the PDCCH scheduling the PDSCH thereof or the PDSCH of another CC by using the CIF. In this case, DL CC 'B' and 'C' in which the PDCCH monitoring DL CC is not configured does not transmit the PDCCH.

Multi-Input Multi-Output (MIMO)

An MIMO technology uses multiple transmitting (Tx) antennas and multiple receiving (Rx) antennas by breaking from generally one transmitting antenna and one receiving antenna up to now. In other words, the MIMO technology is a technology for achieving capacity increment or capability enhancement by using a multiple input multiple output antenna at a transmitter side or a receiver side of the wireless communication system. Hereinafter, "MIMO" will be referred to as "multiple input multiple output antenna".

In more detail, the MIMO technology does not depend on one antenna path in order to receive one total message and completes total data by collecting a plurality of data pieces received through multiple antennas. Consequently, the MIMO technology may increase a data transfer rate within in a specific system range and further, increase the system range through a specific data transfer rate.

In next-generation mobile communication, since a still higher data transfer rate than the existing mobile communication is required, it is anticipated that an efficient multiple input multiple output technology is particularly required. In such a situation, an MIMO communication technology is a next-generation mobile communication technology which may be widely used in a mobile communication terminal and a relay and attracts a concern as a technology to overcome a limit of a transmission amount of another mobile communication according to a limit situation due to data communication extension, and the like.

Meanwhile, the multiple input multiple output (MIMO) technology among various transmission efficiency improvement technologies which have been researched in recent years as a method that may epochally improve a communication capacity and transmission and reception performance without additional frequency allocation or power increment has the largest attention in recent years.

Figure 11:
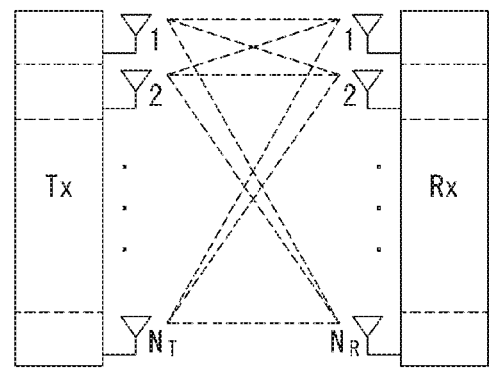
FIG. 11 is a view illustrating a configuration of a general multi-input multi-output (MIMO) antenna communication system.

FIG. 11 is a configuration diagram of a general multiple input multiple output (MIMO) communication system.

Referring to FIG. 11, when the number of transmitting antennas increases to NT and the number of receiving antennas increases to NR at the same time, since a theoretical channel transmission capacity increases in proportion to the number of antennas unlike a case using multiple antennas only in a transmitter or a receiver, a transfer rate may be improved and frequency efficiency may be epchally improved. In this case, the transfer rate depending on an increase in channel transmission capacity may theoretically increase to a value acquired by multiplying a maximum transfer rate (Ro) in the case using one antenna by a rate increase rate (Ri) given below.

$$R_i = \min(N_T, N_R)$$ [Equation 1]

That is, for example, in an MIMO communication system using four transmitting antennas and four receiving antennas, a transfer rate which is four times higher than a single antenna system may be acquired.

Such an MIMO antenna technology may be divided into a spatial diversity scheme increasing transmission reliability by using symbols passing through various channel paths and a spatial multiplexing scheme improving the transfer rate by simultaneously transmitting multiple data symbols by using multiple transmitting antennas. Further, a research into a scheme that intends to appropriately acquire respective advantages by appropriately combining two schemes is also a field which has been researched in recent years.

The respective schemes will be described below in more detail.

First, the spatial diversity scheme includes a space-time block coding series and a space-time Trelis coding series scheme simultaneously using a diversity gain and a coding gain. In general, the Trelis is excellent in bit error rate enhancement performance and code generation degree of freedom, but the space-time block code is simple in operational complexity. In the case of such a spatial diversity gain, an amount corresponding to a multiple (NT×NR) of the number (NT) of transmitting antennas and the number (NR) of receiving antennas may be acquired.

Second, the spatial multiplexing technique is a method that transmits different data arrays in the respective transmitting antennas and in this case, mutual interference occurs among data simultaneously transmitted from the transmitter in the receiver. The receiver receives the data after removing the interference by using an appropriate signal processing technique. A noise removing scheme used herein includes a maximum likelihood detection (MLD) receiver, a zero-forcing (ZF) receiver, a minimum mean square error (MMSE) receiver, a diagonal-bell laboratories layered space-time (D-BLAST), a vertical-bell laboratories layered space-time), and the like and in particular, when channel information may be known in the transmitter side, a singular value decomposition (SVD) scheme, and the like may be used.

Third, a technique combining the space diversity and the spatial multiplexing may be provided. When only the spatial diversity gain is acquired, the performance enhancement gain depending on an increase in diversity degree is gradually saturated and when only the spatial multiplexing gain is acquired, the transmission reliability deteriorates in the radio channel. Schemes that acquire both two gains while solving the problem have been researched and the schemes include a space-time block code (Double-STTD), a space-time BICM (STBICM), and the like.

In order to describe a communication method in the MIMO antenna system described above by a more detailed method, when the communication method is mathematically modeled, the mathematical modeling may be shown as below.

Figure 13:
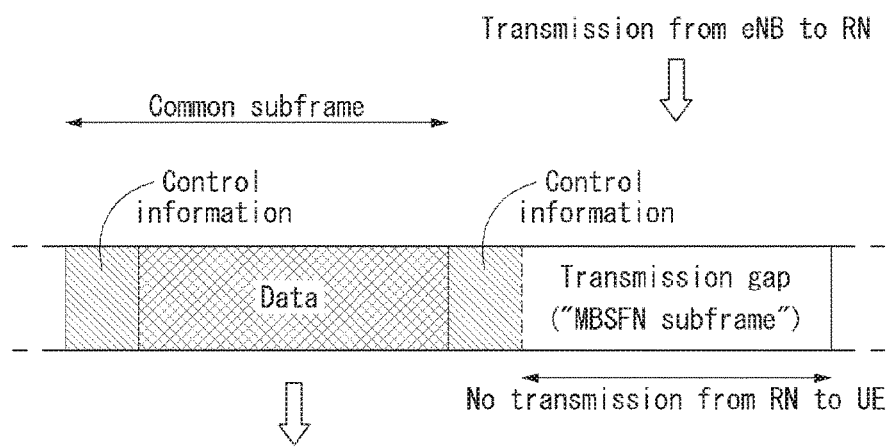
FIG. 13 is a view illustrating dividing relay node resource in a wireless communication system to which the present invention is applicable.

First, it is assumed that NT transmitting antennas and NR receiving antennas are present as illustrated in FIG. 13.

First, in respect to a transmission signal, when NT transmitting antennas are provided, since the maximum number of transmittable information is NT, NT may be expressed as a vector given below.

$$s = [s_1, s_2, \ldots, s_{N_T}]^T$$ [Equation 2]

Meanwhile, transmission power may be different in the respective transmission information s1, s2, . . . , sNT and in this case, when the respective transmission power is P1, P2, . . . , PNT, the transmission information of which the transmission power is adjusted may be expressed as a vector given below.

$$\hat{s} = [\hat{s}_1, \hat{s}_2, \ldots, \hat{s}_{N_T}]^T = [P_1 s_1, P_2 s_2, \ldots, P_{N_T} s_{N_T}]^T$$ [Equation 3]

Further, ŝ may be expressed as described below as a diagonal matrix P of the transmission power.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps$$ [Equation 4]

Meanwhile, the information vector ŝ of which the transmission power is adjusted is multiplied by a weight matrix W to constitute NT transmission signals x1, x2, . . . , xNT which are actually transmitted. Herein, the weight matrix serves to appropriately distribute the transmission information to the respective antennas according to a transmission channel situation, and the like. The transmission signals x1, x2, . . . , xNT may be expressed as below by using a vector x.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \cdots & w_{1N_T} \\ w_{21} & w_{22} & \cdots & w_{2N_T} \\ \vdots & & \ddots & \\ w_{i1} & w_{i2} & \cdots & w_{iN_T} \\ \vdots & & & \ddots \\ w_{N_T1} & w_{N_T2} & \cdots & w_{N_TN_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} =$$ [Equation 5]

$$W\hat{s} = WPs$$

Herein, wij represents a weight between the i-th transmitting antenna and j-th transmission information and W represents the weight as the matrix. The matrix W is called a weight matrix or a precoding matrix.

Meanwhile, the transmission signal x described above may be divided into transmission signals in a case using the spatial diversity and a case using the spatial multiplexing.

In the case using the spatial multiplexing, since different signals are multiplexed and sent, all elements of an information vector s have different values, while when the spatial diversity is used, since the same signal is sent through multiple channel paths, all of the elements of the information vector s have the same value.

Of course, a method mixing the spatial multiplexing and the spatial diversity may also be considered. That is, fro example, a case may also be considered, which transmits the same signal by using the spatial diversity through three transmitting antennas and different signals are sent by the spatial multiplexing through residual transmitting antennas.

Next, when NR receiving antennas are provided, received signals y1, y2, . . . , yNR of the respective antennas are expressed as a vector y as described below.

$$y = [y_1, y_2, \ldots, y_{N_R}]^T$$ [Equation 6]

Meanwhile, in the case of modeling the channel in the MIMO antenna communication system, respective channels may be distinguished according to transmitting and receiving antenna indexes and a channel passing through a receiving antenna i from a transmitting antenna j will be represented as hij. Herein, it is noted that in the case of the order of the index of hij, the receiving antenna index is earlier and the transmitting antenna index is later.

The multiple channels are gathered into one to be expressed even as vector and matrix forms. An example of expression of the vector will be described below.

Figure 12:
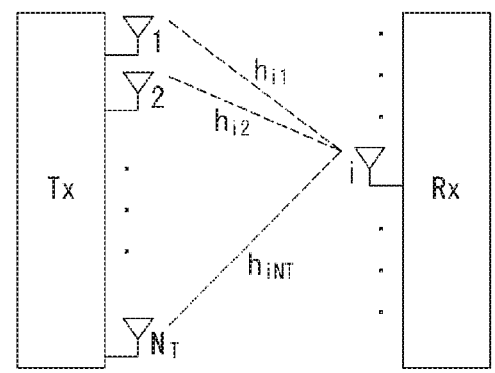
FIG. 12 is a view illustrating channels from a plurality of transmission antennas to one reception antenna.

FIG. 12 is a diagram illustrating a channel from multiple transmitting antennas to one receiving antenna.

As illustrated in FIG. 12, a channel which reaches receiving antenna I from a total of NT transmitting antennas may be expressed as below.

$$h_i^T = [h_{i1}, h_{i2}, \ldots, h_{iN_T}]$$ [Equation 7]

Further, all of channels passing through NR receiving antennas from NT transmitting antennas may be shown as below through matrix expression shown in Equation given above.

$$H = \begin{bmatrix} h_1^T \\ h_2^T \\ \vdots \\ h_i^T \\ \vdots \\ h_{N_R}^T \end{bmatrix} = \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & & \ddots \\ h_{N_R1} & h_{N_R2} & \cdots & h_{N_RN_T} \end{bmatrix}$$ [Equation 8]

Meanwhile, since additive white Gaussian noise (AWGN) is added after passing through a channel matrix H given above in an actual channel, white noises n1, n2, . . . , nNR added to NR receiving antennas, respectively are expressed as below.

$$n = [n_1, n_2, \ldots, n_{N_R}]^T$$ [Equation 9]

Each of the transmission signal, the reception signal, the channel, and the white noise in the MIMO antenna communication system may be expressed through a relationship given below by modeling the transmission signal, the reception signal, the channel, and the white noise.

$$y = \begin{bmatrix} y_1 \\ y_2 \\ \vdots \\ y_i \\ \vdots \\ y_{N_R} \end{bmatrix} = \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & & \ddots \\ h_{N_R1} & h_{N_R2} & \cdots & h_{N_RN_T} \end{bmatrix} \begin{bmatrix} x_1 \\ x_2 \\ \vdots \\ x_j \\ \vdots \\ x_{N_T} \end{bmatrix} + \begin{bmatrix} n_1 \\ n_2 \\ \vdots \\ n_i \\ \vdots \\ n_{N_R} \end{bmatrix} =$$ [Equation 10]

$$Hx + n$$

The numbers of rows and columns of the channel matrix H representing the state of the channel are determined by the numbers of transmitting and receiving antennas. In the case of the channel matrix H, the number of rows becomes equivalent to NR which is the number of receiving antennas and the number of columns becomes equivalent to NR which is the number of transmitting antennas. That is, the channel matrix H becomes an NR×NR matrix.

In general, a rank of the matrix is defined as the minimum number among the numbers of independent rows or columns. Therefore, the rank of the matrix may not be larger than the number of rows or columns. As an equation type example, the rank (rank(H)) of the channel matrix H is limited as below.

$$\text{rank}(H) \leq \min(N_T, N_R)$$ [Equation 11]

Further, when the matrix is subjected to Eigen value decomposition, the rank may be defined as not 0 but the number of Eigen values among the Eigen values. By a similar method, when the rank is subjected to singular value decomposition, the rank may be defined as not 0 but the number of singular values. Accordingly, a physical meaning of the rank in the channel matrix may be the maximum number which may send different information in a given channel.

In the present specification, a 'rank' for MIMO transmission represents the number of paths to independently transmit the signal at a specific time and in a specific frequency resource and 'the number of layers' represents the number of signal streams transmitted through each path. In general, since the transmitter side transmits layers of the number corresponding to the number of ranks used for transmitting the signal, the rank has the same meaning as the number layers if not particularly mentioned.

Coordinated Multi-point Transmission and Reception (COMP)

According to a demand of LTE-advanced, CoMP transmission is proposed in order to improve the performance of the system. The CoMP is also called co-MIMO, collaborative MIMO, network MIMO, and the like. It is anticipated that the CoMP will improves the performance of the terminal positioned at a cell edge and improve an average throughput of the cell (sector).

In general, inter-cell interference decreases the performance and the average cell (sector) efficiency of the terminal positioned at the cell edge in a multi-cell environment in which a frequency reuse index is 1. In order to alleviate the inter-cell interference, the LTE system adopts a simple passive method such as fractional frequency reuse (FFR) in the LTE system so that the terminal positioned at the cell edge has appropriate performance efficiency in an interference-limited environment. However, a method that reuses the inter-cell interference or alleviates the inter-cell interference as a signal (desired signal) which the terminal needs to receive is more preferable instead of reduction of the use of the frequency resource for each cell. The CoMP transmission scheme may be adopted in order to achieve the aforementioned object.

The CoMP scheme which may be applied to the downlink may be classified into a joint processing (JP) scheme and a coordinated scheduling/beamforming (CS/CB) scheme.

In the JP scheme, the data may be used at each point (base station) in a CoMP wise. The CoMP wise means a set of base stations used in the CoMP scheme. The JP scheme may be again classified into a joint transmission scheme and a dynamic cell selection scheme.

The joint transmission scheme means a scheme in which the signal is simultaneously transmitted through a plurality of points which are all or fractional points in the CoMP wise. That is, data transmitted to a single terminal may be simultaneously transmitted from a plurality of transmission points. Through the joint transmission scheme, the quality of the signal transmitted to the terminal may be improved regardless of coherently or non-coherently and interference with another terminal may be actively removed.

The dynamic cell selection scheme means a scheme in which the signal is transmitted from the single point through the PDSCH in the CoMP wise. That is, data transmitted to the single terminal at a specific time is transmitted from the single point and data is not transmitted to the terminal at another point in the CoMP wise. The point that transmits the data to the terminal may be dynamically selected.

According to the CS/CB scheme, the CoMP wise performs beamforming through coordination for transmitting the data to the single terminal. That is, the data is transmitted to the terminal only in the serving cell, but user scheduling/beamforming may be determined through coordination of a plurality of cells in the CoMP wise.

In the case of the uplink, CoMP reception means receiving the signal transmitted by the coordination among a plurality of points which are geographically separated. The CoMP scheme which may be applied to the uplink may be classified into a joint reception (JR) scheme and the coordinated scheduling/beamforming (CS/CB) scheme.

The JR scheme means a scheme in which the plurality of points which are all or fractional points receives the signal transmitted through the PDSCH in the CoMP wise. In the CS/CB scheme, only the single point receives the signal transmitted through the PDSCH, but the user scheduling/beamforming may be determined through the coordination of the plurality of cells in the CoMP wise.

Relay Node (RN)

The relay node transfers data transmitted and received between the base station and the terminal through two different links (a backhaul link and an access link). The base station may include a donor cell. The relay node is wirelessly connected to a wireless access network through the donor cell.

Meanwhile, in respect to the use of a band (spectrum) of the relay node, a case in which the backhaul link operates in the same frequency band as the access link is referred to as 'in-band' and a case in which the backhaul link and the access link operate in different frequency bands is referred to as 'out-band'. In both the cases of the in-band and the out-band, a terminal (hereinafter, referred to as a legacy terminal) that operates according to the existing LTE system (for example, release-8) needs to be able to access the donor cell.

The relay node may be classified into a transparent relay node or a non-transparent relay node according to whether the terminal recognizing the relay node. Transparent means a case in which it may not be recognized whether the terminal communicates with the network through the relay node and non-transparent means a case in which it is recognized whether the terminal communicates with the network through the relay node.

In respect to control of the relay node, the relay node may be divided into a relay node which is constituted as a part of the donor cell or a relay node that autonomously controls the cell.

The relay node which is constituted as a part of the donor cell may have a relay node identity (ID), but does not have a cell identity thereof.

When at least a part of radio resource management (RRM) is controlled by a base station to which the donor cell belongs, even though residual parts of the RRM are positioned at the relay node, the relay node is referred to as the relay node which is constituted as a part of the donor cell. Preferably, the relay node may support the legacy terminal. For example, various types including smart repeaters, decode-and-forward relay nodes, L2 (second layer) relay nodes, and the like and a type-2 relay node correspond to the relay node.

In the case of the relay node that autonomously controls the cell, the relay node controls one or a plurality of cells and unique physical layer cell identities are provided to the respective cells controlled by the relay node. Further, the respective cells controlled by the relay node may use the same RRM mechanism. In terms of the terminal, there is no difference between accessing the cell controlled by the relay node and accessing a cell controlled by a general base station. The cell controlled by the relay node may support the legacy terminal. For example, a self-backhauling relay node, an L3 (third layer) relay node, a type-1 relay node, and a type-1a relay node correspond to the relay node.

The type-1 relay node as the in-band relay node controls a plurality of cells and the plurality of respective cells are recognized as separate cells distinguished from the donor cell in terms of the terminal. Further, the plurality of respective cells may have physical cell IDs (they are defined in the LTE release-8) and the relay node may transmit a synchronization channel, the reference signal, and the like thereof. In the case of a single-cell operation, the terminal may receive scheduling information and an HARQ feedback directly from the relay node and transmit control channels (scheduling request (SR), CQI, ACK/NACK, and the like)

thereof to the relay node. Further, the type-1 relay node is shown as a legacy base station (a base station that operates according to the LTE release-8 system) to the legacy terminals (terminal that operate according to the LTE release-8 system). That is, the type-1 relay node has the backward compatibility. Meanwhile, the terminals that operate according to the LTE-A system recognize the type-1 relay node as a base station different from the legacy base station to provide performance improvement.

The type-1a relay node has the same features as the type-1 relay node including operating as the out-band The operation of the type-1a relay node may be configured so that an influence on an L1 (first layer) operation is minimized or is not present.

The type-2 relay node as the in-band relay node does not have a separate physical cell ID, and as a result, a new cell is not formed. The type-2 relay node is transparent with respect to the legacy terminal and the legacy terminal may not recognize the presence of the type-2 relay node. The type-2 relay node may transmit the PDSCH, but at least does not transmit the CRS and the PDCCH.

Meanwhile, in order for the relay node to operate as the in-band, some resources in the time-frequency space needs to be reserved for the backhaul link and the resources may be configured not to be used for the access link. This is referred to as resource partitioning.

A general principle in the resource partitioning in the relay node may be described as below. Backhaul downlink and access downlink may be multiplexed in the time division multiplexing scheme on one carrier frequency (that is, only one of the backhaul downlink and the access downlink is activated at a specific time). Similarly, backhaul uplink and access uplink may be multiplexed in the time division multiplexing scheme on one carrier frequency (that is, only one of the backhaul uplink and the access uplink is activated at a specific time).

In the backhaul link multiplexing in the FDD, backhaul downlink transmission may be performed in a downlink frequency band and backhaul uplink transmission may be performed in an uplink frequency band. In the backhaul link multiplexing in the TDD, THE backhaul downlink transmission may be performed in the downlink subframe of the base station and the relay node and the backhaul uplink transmission may be performed in the uplink subframe of the base station and the relay node.

In the case of the in-band relay node, for example, when both backhaul downlink reception from the base station and access downlink transmission to the terminal are performed in the same frequency band, signal interference may occurs at a receiver side of the relay node by a signal transmitted from a transmitter side of the relay node. That is, the signal interference or RF jamming may occur at an RF front-end of the relay node. Similarly, even when both the backhaul uplink transmission to the base station and the access uplink reception from the terminal are performed in the same frequency band, the signal interference may occur.

Therefore, in order for the relay node to simultaneously transmit and receive the signal in the same frequency band, when sufficient separation (for example, the transmitting antenna and the receiving antenna are installed to be significantly geographically spaced apart from each other like installation on the ground and underground) between a received signal and a transmitted signal is not provided, it is difficult to implement the transmission and reception of the signal.

As one scheme for solving a problem of the signal interference, the relay node operates not transmit the signal to the terminal while receiving the signal from the donor cell. That is, a gap is generated in transmission from the relay node to the terminal and the terminal may be configured not to expect any transmission from the relay node during the gap. The gap may be configured to constitute a multicast broadcast single frequency network (MBSFN) subframe.

FIG. 13 illustrates a structure of relay resource partitioning in the wireless communication system to which the present invention can be applied.

In FIG. 13, in the case of a first subframe as a general subframe, a downlink (that is, access downlink) control signal and downlink data are transmitted from the relay node and in the case of a second subframe as the MBSFN subframe, the control signal is transmitted from the relay node from the terminal in the control region of the downlink subframe, but no transmission is performed from the relay node to the terminal in residual regions. Herein, since the legacy terminal expects transmission of the PDCCH in all downlink subframes (in other words, since the relay node needs to support legacy terminals in a region thereof to perform a measurement function by receiving the PDCCH every subframe), the PDCCH needs to be transmitted in all downlink subframes for a correct operation of the legacy terminal. Therefore, eve on a subframe (second subframe) configured for downlink (that is, backhaul downlink) transmission from the base station to the relay node, the relay does not receive the backhaul downlink but needs to perform the access downlink transmission in first N (N=1, 2, or 3) OFDM symbol intervals of the subframe. In this regard, since the PDCCH is transmitted from the relay node to the terminal in the control region of the second subframe, the backward compatibility to the legacy terminal, which is served by the relay node may be provided. In residual regions of the second subframe, the relay node may receive transmission from the base station while no transmission is performed from the relay node to the terminal. Therefore, through the resource partitioning scheme, the access downlink transmission and the backhaul downlink reception may not be simultaneously performed in the in-band relay node.

The second subframe using the MBSFN subframe will be described in detail. The control region of the second subframe may be referred to as a relay non-hearing interval. The relay non-hearing interval means an interval in which the relay node does not receive the backhaul downlink signal and transmits the access downlink signal. The interval may be configured by the OFDM length of 1, 2, or 3 as described above. In the relay node non-hearing interval, the relay node may perform the access downlink transmission to the terminal and in the residual regions, the relay node may receive the backhaul downlink from the base station. In this case, since the relay node may not simultaneously perform transmission and reception in the same frequency band, It takes a time for the relay node to switch from a transmission mode to a reception mode. Therefore, in a first partial interval of a backhaul downlink receiving region, a guard time (GT) needs to be set so that the relay node switches to the transmission/reception mode. Similarly, even when the relay node operates to receive the backhaul downlink from the base station and transmit the access downlink to the terminal, the guard time for the reception/transmission mode switching of the relay node may be set. The length of the guard time may be given as a value of the time domain and for example, given as a value of k (k≥1) time samples (Ts) or set to the length of one or more OFDM symbols. Alternatively, when the relay node backhaul downlink subframes are consecutively configured or according to a predetermines subframe timing alignment relationship, a guard time of a last part of the subrrame may not be defined or set. The guard time may be defined only in the frequency domain configured for the backhaul downlink subframe transmission in order to maintain the backward compatibility (when the guard time is set in the access downlink interval, the legacy terminal may not be supported). In the backhaul downlink reception interval other than the guard time, the relay node may receive the PDCCH and the PDSCH from the base station. This may be expressed as a relay (R)-PDCCH and a relay-PDSCH (R-PDSCH) in a meaning of a relay node dedicated physical channel.

General D2D Communication

Generally, D2D communication is limitatively used as the term for communication between objects or object intelligent communication, but the D2D communication in the present invention may include all communication between various types of devices having a communication function such as a smart phone and a personal computer in addition to simple devices with a communication function.

Figure 14:
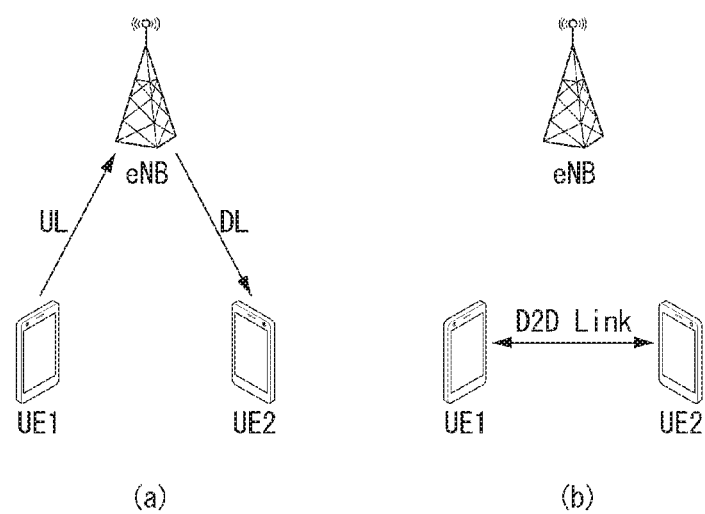
FIG. 14 is a view conceptually illustrating D2D communication in a wireless communication system to which the present invention is applicable.

FIG. 14 is a diagram for schematically describing the D2D communication in a wireless communication system to which the present invention may be applied.

FIG. 14a illustrates a communication scheme based on an existing base station eNB, and the UE1 may transmit the data to the base station on the uplink and the base station may transmit the data to the UE2 on the downlink. The communication scheme may be referred to as an indirect communication scheme through the base station. In the indirect communication scheme, a Un link (referred to as a backhole link as a link between base stations or a link between the base station and the repeater) and/or a Uu link (referred to as an access link as a link between the base station and the UE or a link between the repeater and the UE) which are defined in the existing wireless communication system may be related.

FIG. 14b illustrates a UE-to-UE communication scheme as an example of the D2D communication, and the data exchange between the UEs may be performed without passing through the base station. The communication scheme may be referred to as a direct communication scheme between devices. The D2D direct communication scheme has advantages of reducing latency and using smaller wireless resources as compared with the existing indirect communication scheme through the base station.

Figure 15:
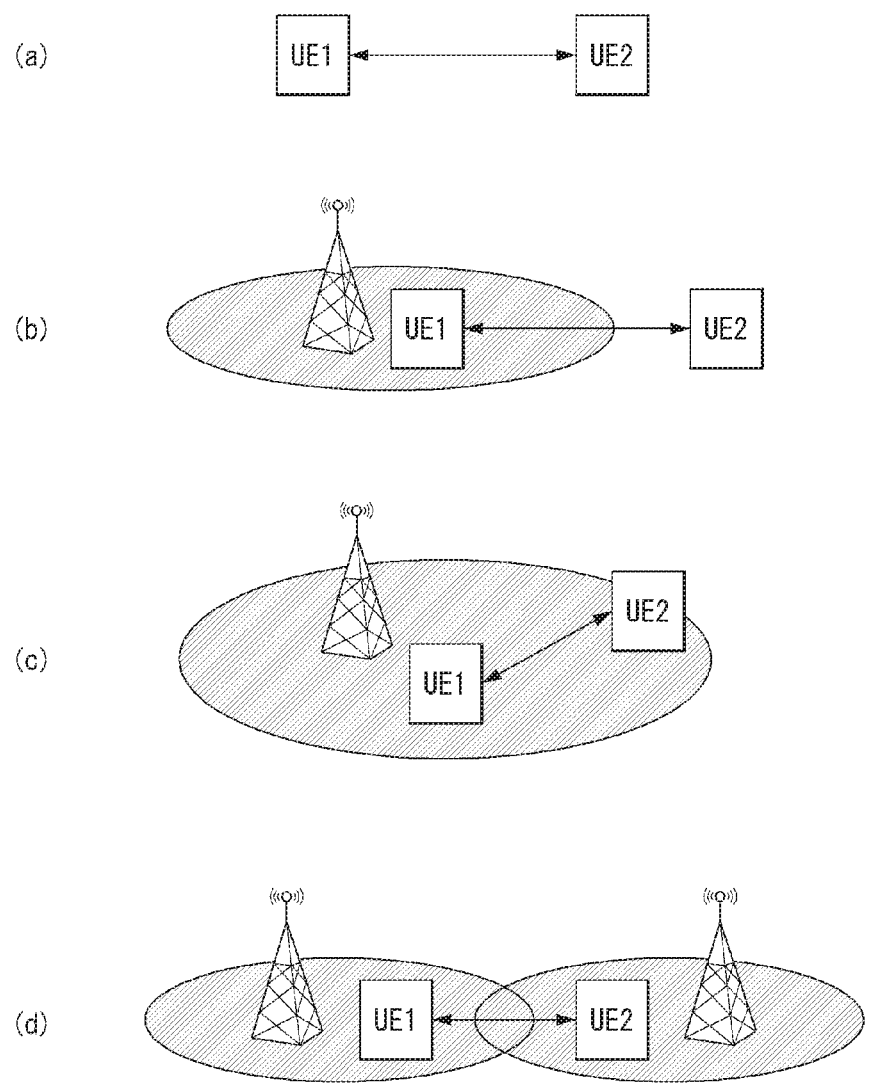
FIG. 15 is a view illustrating an example of various scenarios of D2D communication, to which a method proposed in this disclosure is applicable.

FIG. 15 illustrates examples of various scenarios of the D2D communication to which the method proposed in the specification may be applied.

The D2D communication scenario may be divided into (1) an out-of-coverage network, (2) a partial-coverage network, and (3) in-coverage network according to whether the UE1 and the UE2 are positioned in coverage/out-of-coverage.

The in-coverage network may be divided into an in-coverage-single-cell and an in-coverage-multi-cell according to the number of cells corresponding to the coverage of the base station.

FIG. 15a illustrates an example of an out-of-coverage network scenario of the D2D communication.

The out-of-coverage network scenario means perform the D2D communication between the D2D UEs without control of the base station.

In FIG. 15a, only the UE1 and the UE2 are present and the UE1 and the UE2 may directly communicate with each other.

FIG. 15b illustrates an example of a partial-coverage network scenario of the D2D communication.

The partial-coverage network scenario means performing the D2D communication between the D2D UE positioned in the network coverage and the D2D UE positioned out of the network coverage.

In FIG. 15b, it may be illustrated that the D2D UE positioned in the network coverage and the D2D UE positioned out of the network coverage communicate with each other.

FIG. 15c illustrates an example of the in-coverage-single-cell and FIG. 15d illustrates an example of the in-coverage-multi-cell scenario.

The in-coverage network scenario means that the D2D UEs perform the D2D communication through the control of the base station in the network coverage.

In FIG. 15c, the UE1 and the UE2 are positioned in the same network coverage (alternatively, cell) under the control of the base station.

In FIG. 15d, the UE1 and the UE2 are positioned in the network coverage, but positioned in different network coverages. In addition, the UE1 and the UE2 performs the D2D communication under the control of the base station managing the network coverage.

Here, the D2D communication will be described in more detail.

The D2D communication may operate in the scenario illustrated in FIG. 15, but generally operate in the network coverage and out of the network coverage. The link in used for the D2D communication (direct communication between the UEs) may be referred to as D2D link, directlink, or sidelink, but for the convenience of description, the link is commonly referred to as the sidelink.

The sidelink transmission may operate in uplink spectrum in the case of the FDD and in the uplink (alternatively, downlink) subframe in the case of the TDD. For multiplexing the sidelink transmission and the uplink transmission, time division multiplexing (TDM) may be used.

The sidelink transmission and the uplink transmission do not simultaneously occur. In the uplink subframe used for the uplink transmission and the sidelink subframe which partially or entirely overlaps with UpPTS, the sidelink transmission does not occur. Alternatively, the transmission and the reception of the sidelink do not simultaneously occur.

A structure of a physical resource used in the sidelink transmission may be used equally to the structure of the uplink physical resource. However, the last symbol of the sidelink subframe is constituted by a guard period and not used in the sidelink transmission.

The sidelink subframe may be constituted by extended CP or normal CP.

The D2D communication may be largely divided into discovery, direct communication, and synchronization.

1) Discovery

The D2D discovery may be applied in the network coverage. (including inter-cell and intra-cell). Displacement of synchronous or asynchronous cells may be considered in the inter-cell coverage. The D2D discovery may be used for various commercial purposes such as advertisement, coupon issue, and finding friends to the UE in the near area.

When the UE 1 has a role of the discovery message transmission, the UE 1 transmits the discovery message and the UE 2 receives the discovery message. The transmission and the reception of the UE 1 and the UE 2 may be reversed. The transmission from the UE 1 may be received by one or more UEs such as UE2.

The discovery message may include a single MAC PDU, and here, the single MAC PDU may include a UE ID and an application ID.

A physical sidelink discovery channel (PSDCH) may be defined as the channel transmitting the discovery message. The structure of the PSDCH channel may reuse the PUSCH structure.

A method of allocating resources for the D2D discovery may use two types Type 1 and Type 2.

In Type 1, eNB may allocate resources for transmitting the discovery message by a non-UE specific method.

In detail, a wireless resource pool for discovery transmission and reception constituted by the plurality of subframes is allocated at a predetermined period, and the discovery transmission UE transmits the next discovery message which randomly selects the specific resource in the wireless resource pool.

The periodical discovery resource pool may be allocated for the discovery signal transmission by a semi-static method. Setting information of the discovery resource pool for the discovery transmission includes a discovery period, the number of subframes which may be used for transmission of the discovery signal in the discovery period (that is, the number of subframes constituted by the wireless resource pool).

In the case of the in-coverage UE, the discovery resource pool for the discovery transmission is set by the eNB and may notified to the UE by using RRC signaling (for example, a system information block (SIB)).

The discovery resource pool allocated for the discovery in one discovery period may be multiplexed to TDM and/or FDM as a time-frequency resource block with the same size, and the time-frequency resource block with the same size may be referred to as a 'discovery resource'.

The discovery resource may be used for transmitting the discovery MAC PDU by one UE. The transmission of the MAC PDU transmitted by one UE may be repeated (for example, repeated four times) contiguously or non-contiguously in the discovery period (that is, the wireless resource pool). The UE randomly selects the first discovery resource in the discovery resource set) which may be used for the repeated transmission of the MAC PDU and other discovery resources may be determined in relation with the first discovery resource. For example, a predetermined pattern is preset and according to a position of the first selected discovery resource, the next discovery resource may be determined according to a predetermined pattern. Further, the UE may randomly select each discovery resource in the discovery resource set which may be used for the repeated transmission of the MAC PDU.

In Type 2, the resource for the discovery message transmission is UE-specifically allocated. Type 2 is sub-divided into Type-2A and Type-2B again. Type-2A is a type in which the UE allocates the resource every transmission instance of the discovery message in the discovery period, and the type 2B is a type in which the resource is allocated by a semi-persistent method.

In the case of Type 2B, RRC_CONNECTED UE request allocation of the resource for transmission of the D2D discovery message to the eNB through the RRC signaling. In addition, the eNB may allocate the resource through the RRC signaling. When the UE is transited to a RRC_IDLE state or the eNB withdraws the resource allocation through the RRC signaling, the UE releases the transmission resource allocated last. As such, in the case of the type 2B, the wireless resource is allocated by the RRC signaling and activation/deactivation of the wireless resource allocated by the PDCCH may be determined.

The wireless resource pool for the discovery message reception is set by the eNB and may notified to the UE by using RRC signaling (for example, a system information block (SIB)).

The discovery message reception UE monitors all of the discovery resource pools of Type 1 and Type 2 for the discovery message reception.

2) Direct Communication

An application area of the D2D direct communication includes in-coverage and out-of-coverage, and edge-of-coverage. The D2D direct communication may be used on the purpose of public safety (PS) and the like.

When the UE 1 has a role of the direct communication data transmission, the UE 1 transmits direct communication data and the UE 2 receives direct communication data. The transmission and the reception of the UE 1 and the UE 2 may be reversed. The direct communication transmission from the UE 1 may be received by one or more UEs such as UE2.

The D2D discovery and the D2D communication are not associated with each other and independently defined. That is, the in groupcast and broadcast direct communication, the D2D discovery is not required. As such, when the D2D discovery and the D2D communication are independently defined, the UEs need to recognize the adjacent UEs. In other words, in the case of the groupcast and broadcast direct communication, it is not required that all of the reception UEs in the group are close to each other.

A physical sidelink shared channel (PSSCH) may be defined as a channel transmitting D2D direct communication data. Further, a physical sidelink control channel (PSCCH) may be defined as a channel transmitting control information (for example, scheduling assignment (SA) for the direct communication data transmission, a transmission format, and the like) for the D2D direct communication. The PSSCH and the PSCCH may reuse the PUSCH structure.

A method of allocating the resource for D2D direct communication may use two modes mode 1 and mode 2.

Mode 1 means a mode of scheduling a resource used for transmitting data or control information for D2D direct communication. Mode 1 is applied to in-coverage.

The eNB sets a resource pool required for D2D direct communication. Here, the resource pool required for D2D direct communication may be divided into a control information pool and a D2D data pool. When the eNB schedules the control information and the D2D data transmission resource in the pool set to the transmission D2D UE by using the PDCCH or the ePDCCH, the transmission D2D UE transmits the control information and the D2D data by using the allocated resource.

The transmission UE requests the transmission resource to the eNB, and the eNB schedules the control information and the resource for transmission of the D2D direct communication data. That is, in the case of mode 1, the transmission UE needs to be in an RRC_CONNECTED state in order to perform the D2D direct communication. The transmission UE transmits the scheduling request to the eNB and a buffer status report (BSR) procedure is performed so that the eNB may determine an amount of resource required by the transmission UE.

The reception UEs monitor the control information pool and may selectively decode the D2D data transmission related with the corresponding control information when decoding the control information related with the reception UEs. The reception UE may not decode the D2D data pool according to the control information decoding result.

Mode 2 means a mode in which the UE arbitrarily selects the specific resource in the resource pool for transmitting the data or the control information for D2D direct communication. In the out-of-coverage and/or the edge-of-coverage, the mode 2 is applied.

In mode 2, the resource pool for transmission of the control information and/or the resource pool for transmission of the D2D direct communication data may be pre-configured or semi-statically set. The UE receives the set resource pool (time and frequency) and selects the resource for the D2D direct communication transmission from the resource pool. That is, the UE may select the resource for the control information transmission from the control information resource pool for transmitting the control information. Further, the UE may select the resource from the data resource pool for the D2D direct communication data transmission.

In D2D broadcast communication, the control information is transmitted by the broadcasting UE. The control information explicitly and/or implicitly indicate the position of the resource for the data reception in associated with the physical channel (that is, the PSSCH) transporting the D2D direct communication data.

3) Synchronization

A D2D synchronization signal (alternatively, a sidelink synchronization signal) may be used so that the UE obtains time-frequency synchronization. Particularly, in the case of the out-of-coverage, since the control of the eNB is impossible, new signal and procedure for synchronization establishment between UEs may be defined.

The UE which periodically transmits the D2D synchronization signal may be referred to as a D2D synchronization source. When the D2D synchronization source is the eNB, the structure of the transmitted D2D synchronization signal may be the same as that of the PSS/SSS. When the D2D synchronization source is not the eNB (for example, the UE or the global navigation satellite system (GNSS)), a structure of the transmitted D2D synchronization signal may be newly defined.

The D2D synchronization signal is periodically transmitted for a period of not less than 40 ms. Each UE may have multiple physical-layer sidelink synchronization identities. The D2D synchronization signal includes a primary D2D synchronization signal (alternatively, a primary sidelink synchronization signal) and a secondary D2D synchronization signal (alternatively, a secondary sidelink synchronization signal).

Before transmitting the D2D synchronization signal, first, the UE may search the D2D synchronization source. In addition, when the D2D synchronization source is searched, the UE may obtain time-frequency synchronization through the D2D synchronization signal received from the searched D2D synchronization source. In addition, the corresponding UE may transmit the D2D synchronization signal.

Hereinafter, for clarity, direct communication between two devices in the D2D communication is exemplified, but the scope of the present invention is not limited thereto, and the same principle described in the present invention may be applied even to the D2D communication between two or more devices.

One of D2D discovery methods includes a method for performing, by all of pieces of UE, discovery using a dispersive method (hereinafter referred to as "dispersive discovery"). The method for performing D2D discovery dispersively means a method for autonomously determining and selecting, by all pieces of UE, discovery resources dispersively and transmitting and receiving discovery messages, unlike a centralized method for determining resource selection at one place (e.g., an eNB, UE, or a D2D scheduling device).

In the following specification, a signal (or message) periodically transmitted by pieces of UE for D2D discovery may be referred to as a discovery message, a discovery signal, or a beacon. This is collectively referred to as a discovery message, for convenience of description.

In dispersive discovery, dedicated resources may be periodically allocated as resources for transmitting and receiving, by UE, a discovery message separately from cellular resources. This is described below with reference to FIG. 17.

Figure 16:
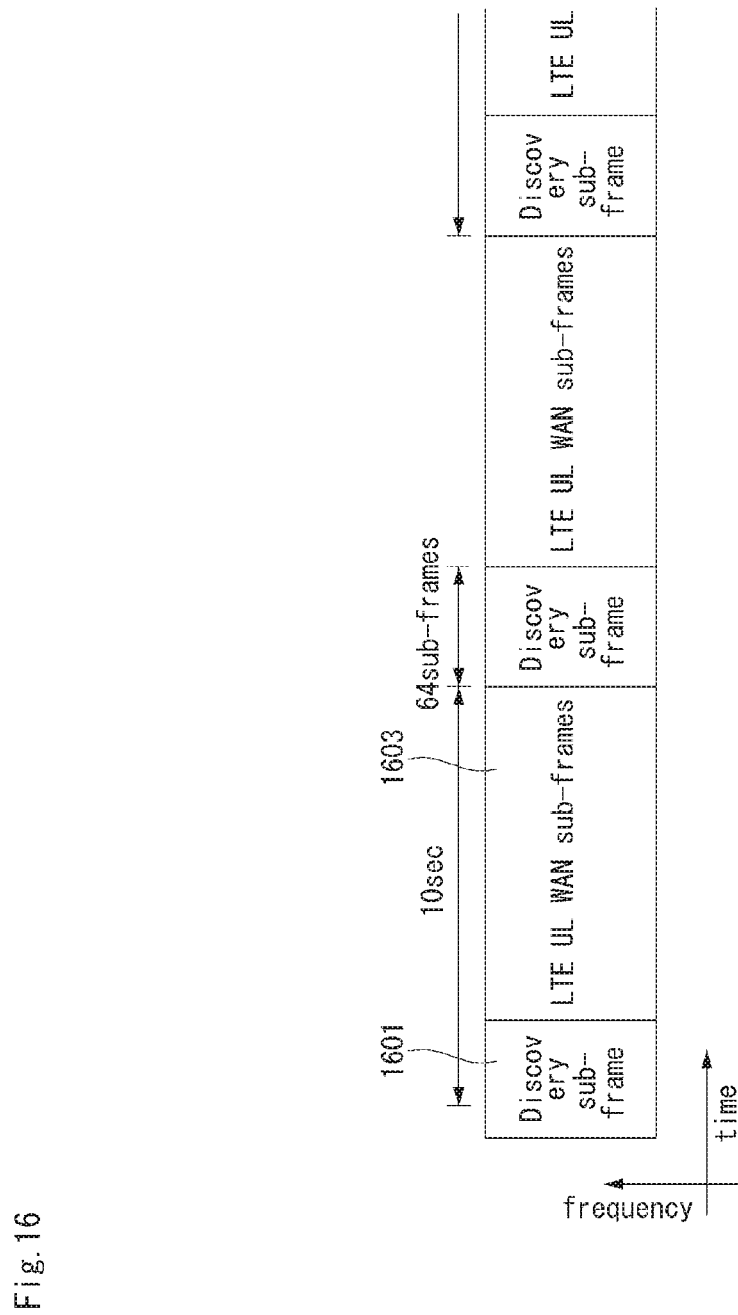
FIG. 16 is a view illustrating an example of allocating discovery resource according to an embodiment of the present invention.

FIG. 16 shows an example of a frame structure to which discovery resources are allocated, to which methods proposed according to embodiments of the present invention may be applied.

Referring to FIG. 16, in the dispersive discovery method, a discovery subframe (i.e., a "discovery resource pool") 1601 for discovery, of all of cellular uplink frequency-time resources, is allocated fixedly (or dedicatedly), and the remaining region may include an existing LTE uplink Wide Area Network (WAN) subframe region 1603. The discovery resource pool may include one or more subframes.

The discovery resource pool may be periodically allocated at a specific time interval (i.e., a "discovery period"). Furthermore, the discovery resource pool may be repeatedly configured within one discovery period.

FIG. 16 shows an example in which a discovery resource pool is allocated in a discovery period of 10 sec and 64 contiguous subframes are allocated to each discovery resource pool. The size of a discovery period and time/frequency resources of a discovery resource pool is not limited thereto.

UE autonomously selects resources (i.e., "discovery resources") for transmitting its own discovery message within a discovery pool dedicatedly allocated thereto and transmits the discovery message through the selected resources. This is described below with reference to FIG. 17.

Figure 17:
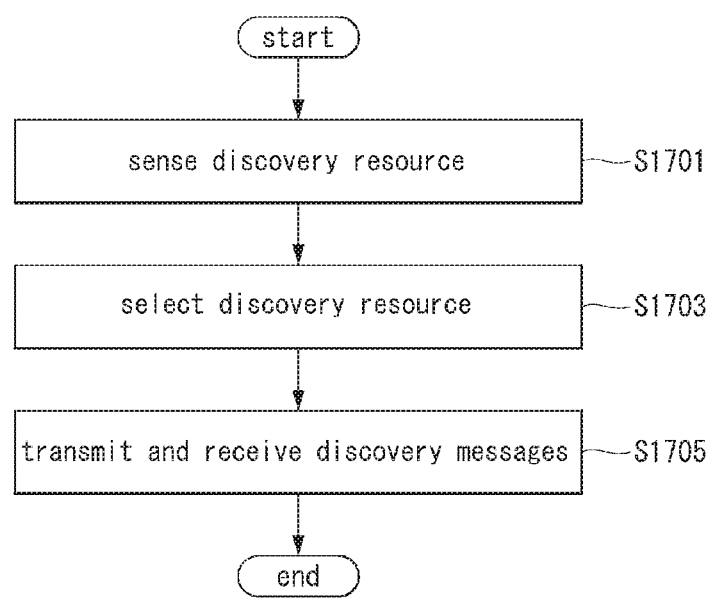
FIG. 17 is a view briefly illustrating a discovery process according to an embodiment of the present invention.

FIG. 17 is a diagram schematically showing a discovery process to which methods proposed according to embodiments of the present invention may be applied.

Referring to FIGS. 16 and 17, a discovery method basically includes a three-step procedure: a resource sensing step S1701 for discovery message transmission, a resource selection step S1703 for discovery message transmission, and a discovery message transmission and reception step S1705.

First, in the resource sensing step S1701 for discovery message transmission, all of pieces of UE performing D2D discovery receive (i.e., sense) all of discovery messages in a dispersive way (i.e., autonomously) during 1 period of D2D discovery resources (i.e., a discovery resource pool). For example, assuming that an uplink bandwidth is 10 MHz in FIG. 16, all of pieces of UE receive (i.e., sense) all of discovery messages transmitted in N=44 RBs (6 RBs of a total of 50 RBs are used for PUCCH transmission because the entire uplink bandwidth is 10 MHz) during K=64 msec (64 subframes).

Furthermore, in the resource selection step S1703 for discovery message transmission, UE sorts resources having a low energy level from the sensed resources and randomly selects discovery resources within a specific range (e.g., within lower x % (x=a specific integer, 5, 7, 10, . . . )) from the selected resources.

Discovery resources may include one or more resource blocks having the same size and may be multiplexed within a discovery resource pool in a TDM and/or FDM manner.

Furthermore, in the discovery message transmission and reception step S1705, the UE transmits and receives discovery messages based on discovery resources selected after one discovery period (after P=10 seconds in the example of FIG. 16) and transmits and receives discovery messages periodically according to a random resource hopping pattern in a subsequent discovery period.

Such a D2D discovery procedure continues to be performed even in an RRC_IDLE state not having a connection with an eNB in addition to an RRC_CONNECTED state in which the UE has a connection with the eNB.

If such a discovery method is taken into consideration, all of pieces of UE sense all of resources (i.e., discovery resource pools) transmitted by surrounding pieces of UE and randomly select discovery resources within a specific range (e.g., within low x %) from all the sensed resources.

D2D Frame Structure

Hereinafter, a D2D frame structure for direct communication between terminals will be described.

The D2D discovery procedure discussed above with reference to FIG. 14B will be described.

In FIG. 14B, a UE refers to a terminal of a user, but in a case in which network equipment such as an eNB transmits and receives a signal according to a communication scheme between UEs, the network equipment such as an eNB may also be included in the concept of the UE.

Hereinafter, a link directly connected between UEs will be referred to as a D2D link and a link through which a UE communicates with an eNB will be referred to as an eNB-UE link, for the purposes of description.

The expression of the D2D link and the eNB-UE link are merely an example, and may be expressed by other terms having the same meaning.

As illustrated in FIG. 14B, a UE performs communication with another UE through a D2D link, and performs communication with a different UE, which is at a location not connectable by the D2D link, through an eNB-UE link.

That is, in terms of a specific UE, a wireless communication system in which the D2D link and the eNB-UE link coexist should be operated.

In general, resource in use in a wireless communication system includes DL resource used by an eNB for transmission to a UE and UL resource used by a UE for transmission to an eNB.

In an FDD system, DL resource corresponds to a DL band and UL resource corresponds to a UL band, and in a TDD system, DL resource corresponds to a DL subframe and UL resource corresponds to a UL subframe.

The DL resource is resource for transmitting a signal at high transmission power, and thus, when a UE having relatively low power operates the DL resource by a D2D link, an interference level is increased.

Thus, it may be preferred for the UE to utilize the UL resource for a D2D link.

The UL resource includes a plurality of UL subframes. A UE connected to an eNB and synchronized may recognize a boundary of a UL subframe from a timing advance (TA) indication designated by the eNB.

Figure 18:
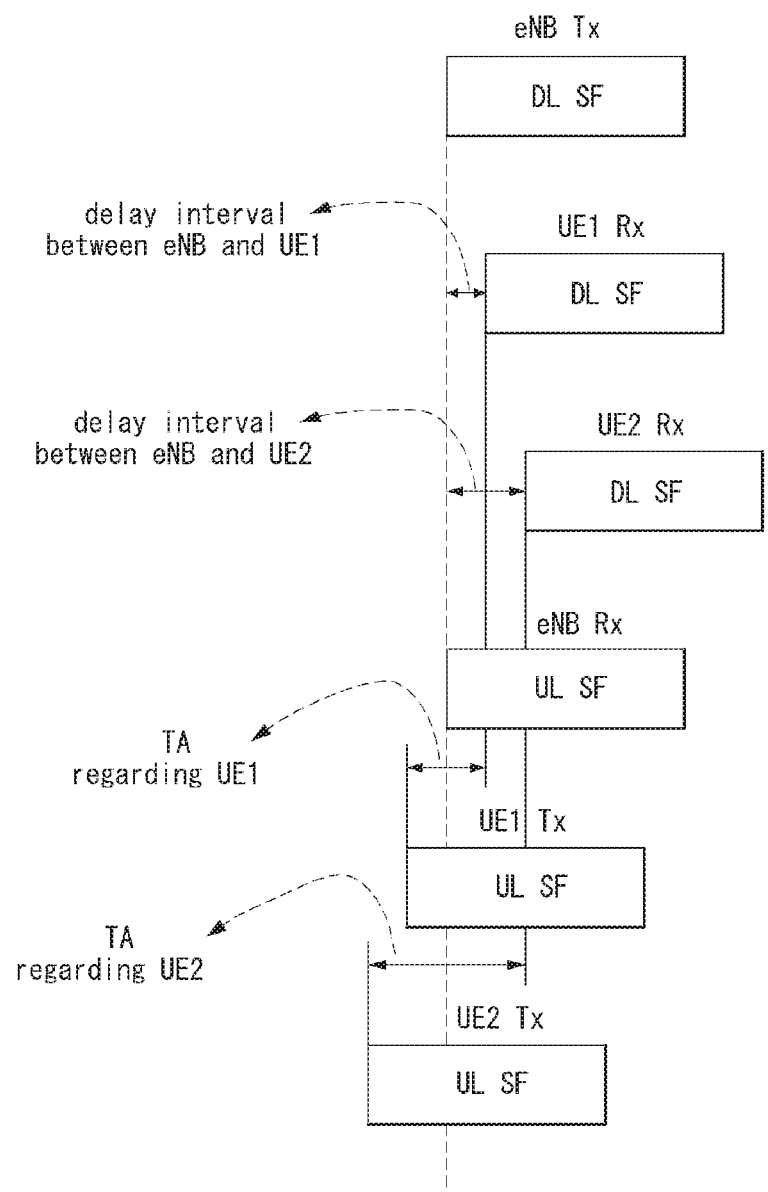
FIG. 18 is a view illustrating an example of a method for recognizing a UL subframe boundary through timing advance (TA) indication.

FIG. 18 is a view illustrating an example of a method for recognizing a UL subframe boundary through timing advance (TA) indication.

As illustrated in FIG. 18, an eNB instructs a plurality of UEs at different distances to set a boundary of a UL subframe earlier by a predetermined time from a point in time at which a boundary of a DL subframe was detected through TA indication, so that signals transmitted from the UEs may reach at the same point in time.

By setting appropriate TAs such that propagation delay between the eNB and the respective UEs (in particular, by setting the TA values double the propagation delay between corresponding UEs and the eNB as illustrated in FIG. 18), signals transmitted by the UEs at different positions may simultaneously reach the eNB.

Through the TA indication of the base station, each of the terminals may obtain the UL subframe boundary of the eNB-UE link.

Also, the UEs positioned to be close to each other as major targets of the D2D operation have a high possibility of having a similar or the same TA value, and thus, the UEs may determine the subframe boundary of the D2D link on the basis of the TA value, thus being synchronized therebetween.

In particular, in this method, when UL resource is used as the D2D link, since a subframe boundary used by the D2D link and a subframe boundary used by the eNB-UE link are the same, the operation of switching the two links in a time dimension, that is, operating the D2D link in a specific subframe and operating the eNB-UE link in a different subframe, may be smoothly performed.

Meanwhile, the UE not connected to the eNB may also need to perform a D2D operation according to circumstances.

In this case, since the UE, not connected to the eNB, cannot receive the TA indication from the eNB, based on which reference a subframe boundary for the D2D link is to be set is an issue.

Of course, the UE, not connected to the eNB, may attempt connection to the eNB through a procedure such as a random access (RA) before performing the D2D operation and set a subframe boundary on the basis of an obtained TA indication However, the process of obtaining the TA through RA may be disadvantageous in that it may entail additional time delay and battery consumption as the UE attempts connection to the eNB before D2D communication each time.

Thus, preferably, the UE, not connected to the eNB, performs the operation without the TA.

Here, the operation without the TA may refer to that the UE does not have a TA value specified for a specific UE, which means that a plurality of unspecified UEs may operate with the same TA value.

In detail, the TA value may be set to 0 to make the boundary of a DL subframe received by the UE be the boundary of a UL subframe (or D2D subframe) or a specific TA value may be set in advance and transmitted through system information, or the like.

As discussed above, D2D communication may be divided into (1) a discovery process of recognizing whether a UE as a target of D2D is present at an adjacent position and (2) a communication process of transmitting and receiving data to and from a specific UE.

In a case in which D2D communication is performed without receiving a TA indication from the eNB, both of the processes (1) and (2) may be applied or only either the process (1) or (2) may be applied.

For example, the D2D discovery process of the UE not connected to the eNB is performed without a TA indication, but when a different UE with which the UE wants to communicate is discovered through the D2D discovery process, the UE may attempt to connect to the eNB and operate to perform a communication process according to a TA value obtained from the eNB.

Here, in performing a portion or the entirety of the procedure of the D2D communication for synchronization with the UE not connected to the eNB, the UE connected to the eNB may perform a D2D operation on the assumption that it does not have an obtained TA like the case in which it is not connected to the eNB.

In particular, when the UE connected to the eNB performs D2D communication according to a TA indication, synchronization of the UL subframe is maintained to be the same in the D2D communication and in the eNB-UE link, minimizing an influence on the eNB-UE link due to the D2D communication.

That is, when a specific subframe is used in D2D communication, an adjacent subframe maintaining the same subframe boundary as that of the specific subframe may be utilized as an eNB-UE link.

Thus, in case of a UE that transmits a D2D signal not requiring switching of transmission/reception operations between the eNB-UE link and a D2D link, the UE may transmit a D2D signal in every resource of a subframe allocated to the D2D in D2D communication performed according to the TA indication.

Also, in a case in which D2D communication is performed according to the TA indication although the D2D discovery procedure is performed without a TA, if a UE (UE1) not connected to the eNB can recognize the fact that a counterpart UE (UE2) to perform D2D communication is not connected to the eNB, the UE 1 may directly attempt D2D communication without a TA indication like in the D2D discovery, rather than being connected to the eNB and performing communication according to subframe synchronization based on a TA indication.

That is, D2D communication between two UEs not connected to the eNB may be performed without a TA indication, like the D2D discovery.

This is because, since both UEs are not connected to the eNB, minimization of an influence of an eNB-UE link operation that may be obtained by performing D2D communication according to a TA indication is meaningless.

Thus, when generating a D2D discovery signal, the UEs may operate to generate different signals according to whether they are connected to the eNB (for example, whether they are in an idle mode or in a connected mode) such that a different UE which receives the D2D discovery signals can recognize a state of the UEs.

Alternatively, even though a UE is connected to the eNB and performs UL transmission according to a TA, if the currently used TA value is dropped to below a predetermined reference so the UE may be able to perform D2D communication without a TA, the UE may generate a discovery signal as if it is in an idle mode, and to this end, the UE may operate to generate different discovery signals according to whether the TA value used by the UE is below a predetermined level (it is assumed that the TA is below the predetermined level in case of an idle mode).

When a specific UE is connected to the eNB and performs D2D communication according to a TA indication, if a counterpart UE is checked to be in an idle mode, the specific UE may report the corresponding fact to the eNB so that the eNB instructs the counterpart UE to attempt connection, and may operate to synchronize a UL subframe according to a TA value given by the eNB.

Accordingly, the specific UE may perform D2D communication during which the specific UE maintains its TA value.

Figure 19:
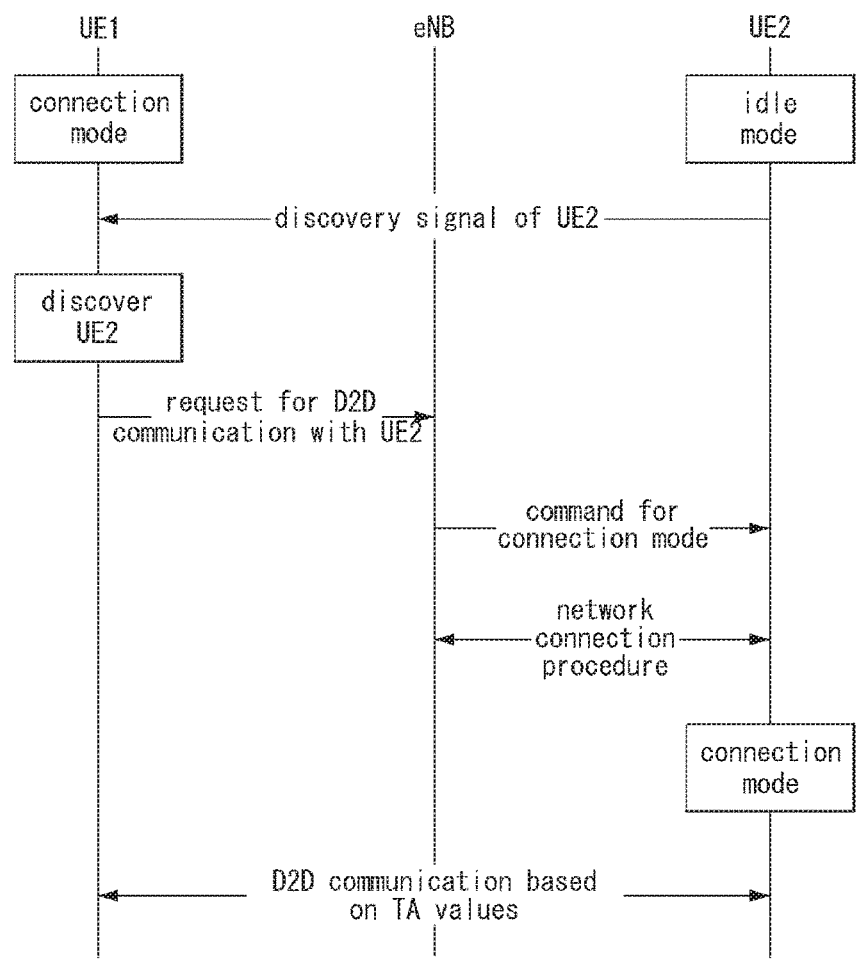
FIG. 19 is a view illustrating an example of a D2D operation according to whether a base station (BS or an eNB) and a terminal (or a UE) are connected.

FIG. 19 is a view illustrating an example of a D2D operation according to whether the UE and the eNB are connected.

As illustrated in FIG. 19, the UE1 is connected to the eNB (connected mode), and a UE2 is not connected to the eNB (idle mode).

Here, when the UE1 transmits a request for D2D communication with the UE2 to the eNB, the UE1 may transmit additional information indicating that the UE2 is in an idle mode, together.

Hereinafter, a frame structure enabling D2D communication to be effectively performed without a TA in an FDD system and a TDD system will be described.

FDD System

Figure 20:
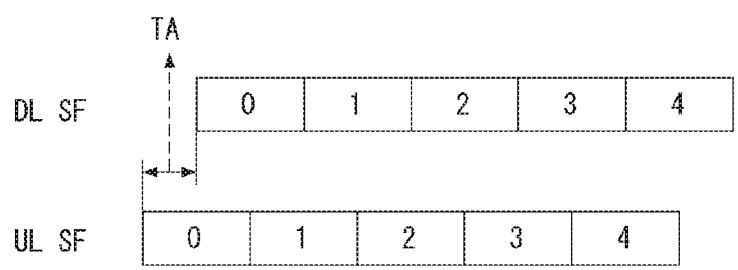
FIG. 20 is a view illustrating an example of a boundary between a DL subframe and a UL subframe in an FDD system.

FIG. 20 is a view illustrating an example of a boundary between a DL subframe and a UL subframe in an FDD system.

As illustrated in FIG. 20, it can be seen that a UL subframe starts earlier by a TA to value in relation to a DL subframe.

Figure 21:
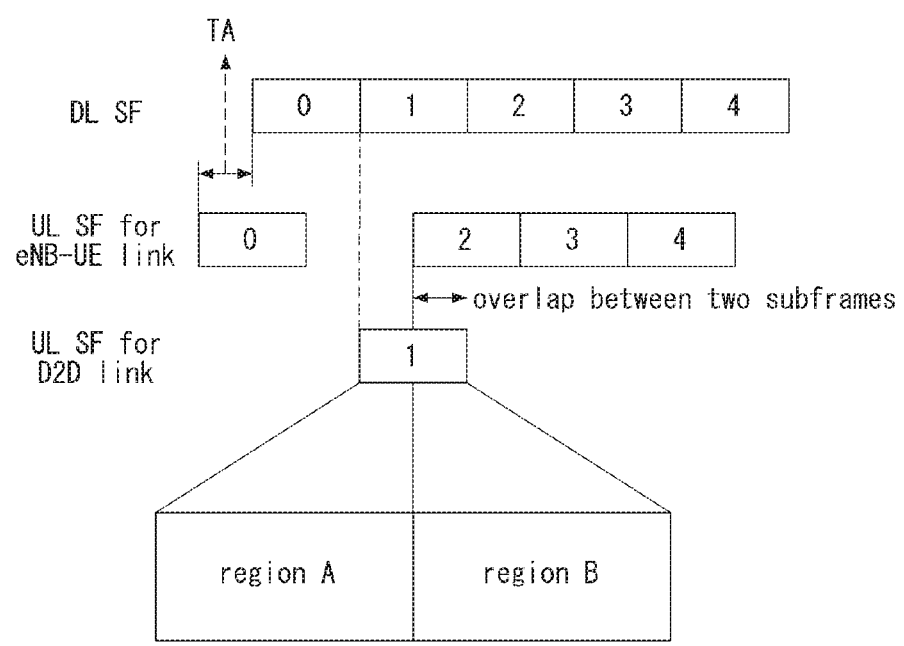
FIG. 21 is a view illustrating an example in which D2D is performed in a UL subframe 1 of FIG. 20.

FIG. 21 is a view illustrating an example in which D2D is performed in a UL subframe 1 of FIG. 20.

As discussed above, a TA is set to 0 in a situation in which D2D is performed and it is assumed that a boundary of the DL subframe and a boundary of the UL subframe match.

That is, as illustrated in FIG. 21, a problem in which a rear portion (marked by "region B") of the UL subframe 1 for a D2D link overlaps a UL subframe 2 of an eNB-UE link arises.

Here, in a case in which the UL subframe 2 is used as an eNB-UE link, D2D may be performed only in a region A of the UL subframe 1.

Hereinafter, solutions (method 1 to method 4) to a case in which a boundary of the UL subframe of the D2D link and a boundary of the UL subframe of the eNB-UE link do not match as illustrated in FIG. 21 will be described.

1. Method 1

Method 1 is a method for performing D2D only when subframes do not overlap such as in the region A of FIG. 21.

To this end, the eNB may transfer position or length information of the region occupied by the region A in one subframe to the UE through signaling such as an RRC or system information.

Since the region B should be able to include a subsequent eNB-UE link subframe of the UE having a maximum TA value, the eNB may set a length of the region A in consideration of a cell radius thereof.

In addition, a guard period in which the UE may convert an operation mode between an eNB-UE operation and a D2D operation (for example, switching between transmission in the eNB-UE link and reception in the D2D link) may be set for a predetermined period of time at a first and/or end portion.

The guard period is essential on the position of the UE which performs transmission and reception switching, but it may not be set for a UE which performs the same transmission/reception operation in two adjacent subframes without switching transmission and reception.

For example, on a UE that continuously transmits a signal in several subframe, signal transmission may be performed without a guard period, whereas in case of a UE that performs transmission in an adjacent subframe and switches to reception, a predetermined time may be set to a guard period and signal may be transmitted and received only through the other region.

In the region B of FIG. 21, since an eNB-UE link operation should be basically performed in the UL subframe 2, it is impossible to utilize it as a D2D link.

FIGS. 22 through 25 are views illustrating examples of a method for solving a conflict when UL subframes overlap.

Figure 22:
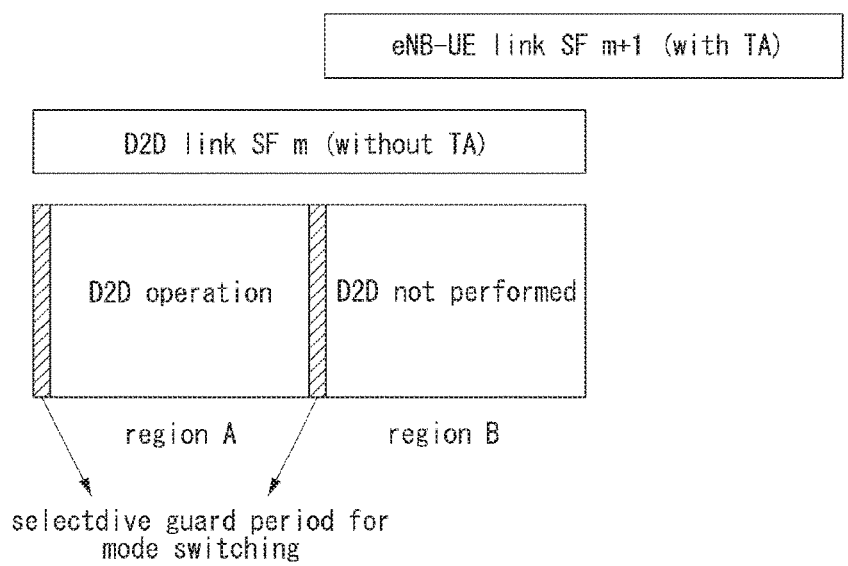
FIGS. 22 through 25 are views illustrating examples of a method for solving a collision when UL subframes overlap.

FIG. 22 illustrates an example of a method for solving a conflict when UL subframes overlap, which represents the method 1 discussed above.

2. Method 2

Method 2 refers to a method of using both region A and region B of FIG. 21 for the purpose of D2D.

Figure 23:
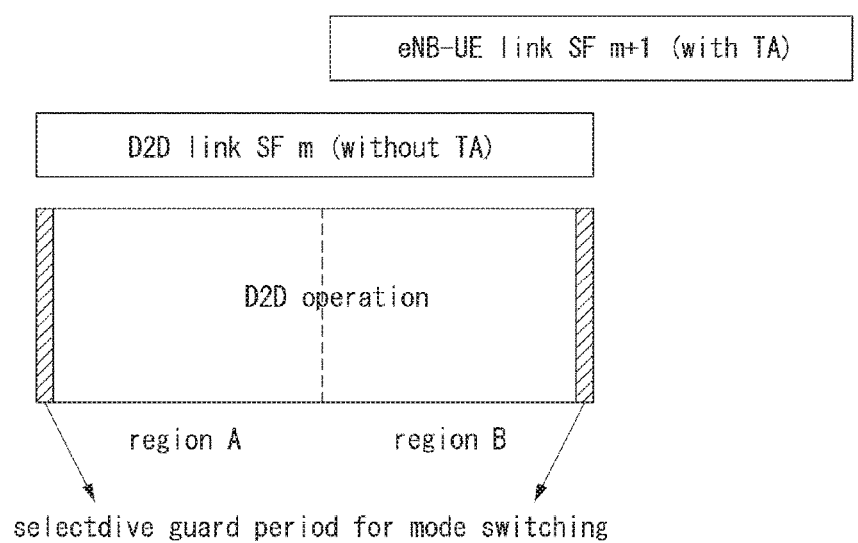

That is, FIG. 23 illustrates an example of a method for solving a conflict when UL subframes overlap, representing method 2.

As illustrated in FIG. 23, there is a restriction in using a subsequent subframe as an eNB-UE link.

A simple method is defining such that an eNB-UE operation is not performed in the subsequent subframe (SF m+1 of FIG. 23).

That is, in a case in which a UE is instructed by a BS to transmit a specific signal (UL ACK/NACK, a periodical channel state information report, a sounding reference signal, or semi-persistent scheduling signal) in the subsequent subframe, the UE shifts transmission of the specific signal to a pre-arranged position such as a following frame or omits transmission of the specific signal.

Alternatively, in order to effectively utilize resource, an eNB-UE operation may be performed using a partial time resource (that is, a portion of the time resource of subframe m+1 which does not overlap the region B), or contents described in the following method 3 may be applied.

3. Method 3

Method 3, a middle type between method 1 and method 2 discussed above, is a method of performing a D2D operation in a partial region of the region B.

As discussed above, method 3 may be effective even when the subsequent subframe described above in method 2 is partially utilized in an eNB-UE link.

Figure 24:
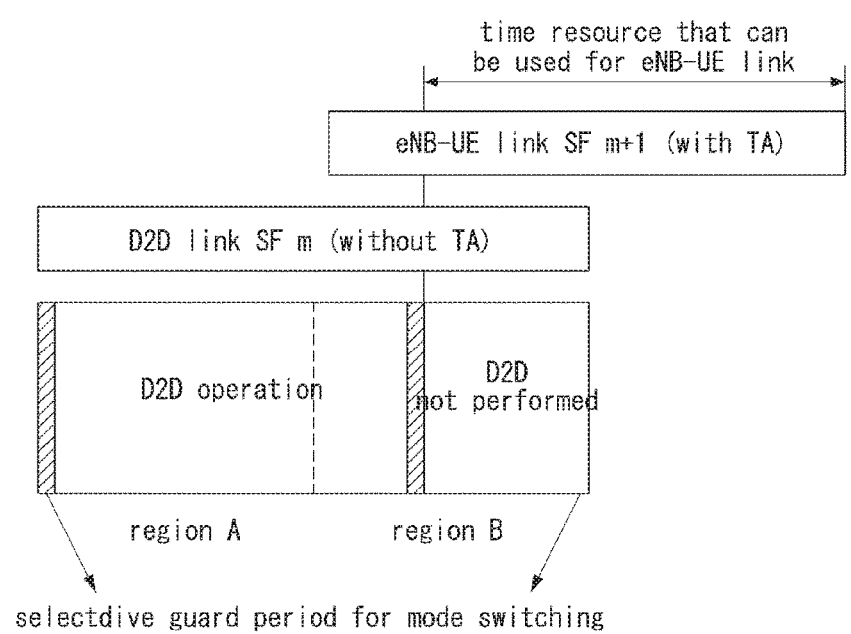

FIG. 24 illustrates an example of a method of solving a conflict when UL subframes overlap, representing method 3.

As illustrated in FIG. 24, as a partial region of the region B of D2D link SF m is utilized for D2D, there is a restriction in operating an eNB-UE link for a partial time of a start portion in the subframe m+1.

As illustrated in FIG. 24, method 3 is effective in a case in which formats (in particular, a length of time in use) of a signal transmitted and received to and from the eNB-UE link is restricted to some of the formats in advance when the eNB-UE link is operated by using only a partial time.

In detail, when the entire region of region B is used for D2D as illustrated in FIG. 23, a signal transmitted and received to and from the eNB-UE link in the subframe m+1 should have various types of signal formats, which complicates implementation of a UE.

Thus, signal formats used in the subframe m+1 are restricted to some and a format which is most appropriate for the current situation is selected from the restricted formats, and here, in a case in which the selected format occupies only a partial region of the region B as illustrated in FIG. 24, the other remaining portion other than the partial region of region B is utilized for a D2D operation together with the region A.

(1) to (3) shows examples of an eNB-UE operation that may be performed using partial time resource in the subframe subsequent to the D2D subframe.

(1) The Use of a Format of Transmitting a PUSCH or a PUCCH Using Only Some Rear Symbols of a Subframe.

Here, the eNB may inform about how many symbols are to be used to transmit the PUSCH or the PUCCH in the corresponding subframe.

An eNB-UE operation may be performed to transmit a PUSCH or a PUCCH only in one slot by utilizing features that similar signal formats are configured to change a frequency position (frequency hopping scheme) between two slots constituting one subframe.

(2) Transmission of an SRS Transmitted Only in One Symbol

In this case, when several symbols are available in a subsequent subframe, an SRS may be transmitted in each symbol.

To this end, the eNB may inform about how many symbols can be used to transmit the SRS in a subsequent subframe.

(3) Transmission of a PRACH Preamble Used Only in Some Symbols

Similarly, the eNB may inform about how many symbols can be used to transmit a PRACH in a subsequent subframe.

4. Method 4

Method 4 is a middle type between another method of method 3, that is, another method 1, and method 2, in which a D2D operation is performed only in a partial region of the region A.

Method 4 may be effective in a case in which the entirety of the subsequent frame described above in method 1 is utilized for eNB-UE link.

Figure 25:
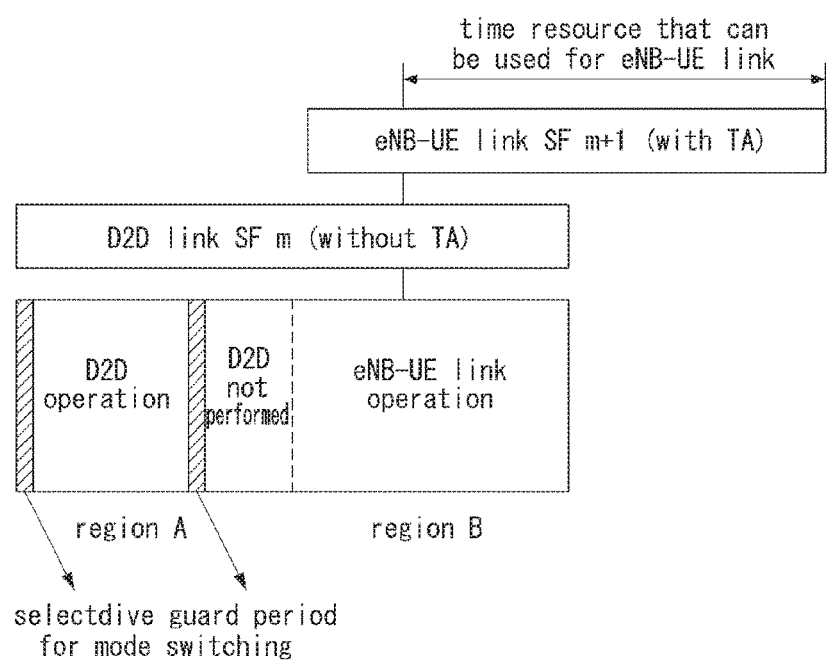

FIG. 25 illustrates an example of a method for solving a conflict when UL subframes overlap, representing method 4.

Method 4 is a method of operating the eNB-UE link in the entire region of the subframe m+1 by not performing the D2D operation in the region B.

In method 4, the D2D link is operated using only a predetermined time of the region A as illustrated in FIG. 25, and this is especially effective in a case in which formats (in particular, a length of time in use) of signals transmitted and received through the D2D link are restricted to some formats in advance.

In detail, when the entire region of the region A is used for D2D as illustrated in FIG. 22, a region occupied by a signal transmitted and received through the D2D link in the subframe may be varied according to an actually applied TA value.

This makes the subframe m have various types of signal formats, resultantly complicating implementation of a UE.

Thus, signal formats used in the subframe m are restricted to one or more formats, and a format which is most appropriate for the current situation is selected from among the restricted formats, and here, in a case in which the selected format occupies only a partial region of the region A as illustrated in FIG. 25, the other remaining portion excluding the partial region of the region A may be left not to be used for D2D purpose.

In FIGS. 19 through 25, the guard period for mode switching of the UE may appear only at a start point or an end point of the D2D operation, appear at both sides (the start point and the end point), or may not appear at none of both sides.

The case in which the guard period does not appear at none of both sides may be a case in which the UE performs mode switching at a very high speed, for example.

Alternatively, an operation may be performed such that a portion or the entirety of the guard period does not appear by additionally providing an appropriate offset to a boundary of the D2D subframe.

FIGS. 26 through 32 are views illustrating examples in which a guard internal is set in a D2D operation.

Figure 26:
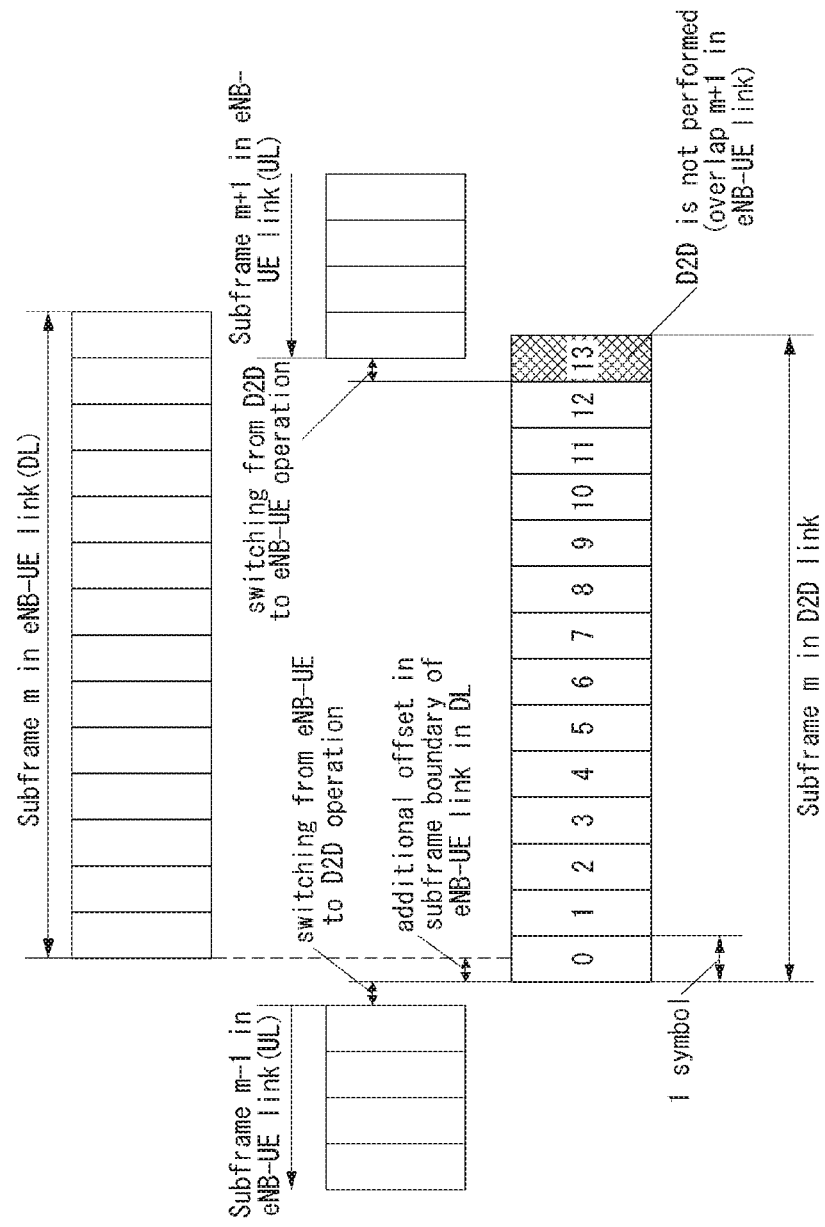
FIGS. 26 through 32 are views illustrating examples in which a guard period is set in a D2D operation.

FIG. 26 illustrates an example in which a guard period is set for mode switching of the UE in a D2D operation.

In FIG. 26, it is assumed that a time of a half symbol or less is consumed for mode switching of the UE and it is also assumed that the last symbol among a total 14 symbols of one subframe is allocated to the region B (that is, a TA has one symbol length) based on the method 1 described above with reference to FIG. 22 so a D2D operation is not possible in the corresponding last symbol.

Here, it is assumed that one subframe has 14 symbols, but the number of symbols constituting one subframe may be varied according to a setting for D2D communication, in particular, according to a setting of a length of a cyclic prefix.

Also, in FIG. 26, it is assumed that a subframe of a D2D link starts earlier by a predetermined offset (for example, by a time corresponding to a half of one symbol time) than a DL subframe boundary of an eNB-UE link.

That is, the UE first performs an operation of the eNB-UE link in a UL subframe m−1 and then performs mode switching for a D2D operation.

Then, a boundary of a D2D subframe m which starts earlier as the predetermined offset is added at a DL reception time point appears, from which the D2D operation is performed.

The UE, which has performed the D2D operation until a symbol #12, performs mode switching to the eNB-UE link again in a front region of a symbol #13 which partially overlaps a UL subframe m+1 of the eNB-UE link so it cannot be used.

The UE performs eNB-UE operation in the UL subframe m+1 which starts after the mode switching to the eNB-UE link.

In order to perform such an operation as illustrated in FIG. 26, a TA having at least a predetermined value or greater should have been applied, but a time for mode switching is guaranteed between an end point of the UL subframe m−1 of the eNB-UE link and a start point of the subframe m of the D2D link.

To this end, the eNB may perform a TA indication so that a TA having at least a predetermined value or greater may be applied to every UE.

This may also be interpreted such that the UL subframe boundary of the eNB appears slightly earlier than the DL subframe boundary from the beginning.

In this sense, FIG. 26 may illustrate a case of a UE having a minimum TA among UEs performing the D2D operation and connected to the eNB. Here, a UE has a greater TA, the UE should operate such that a symbol allowing for the D2D operation in the subframe m is reduced as illustrated in FIG. 27 as described hereinafter.

Figure 27:
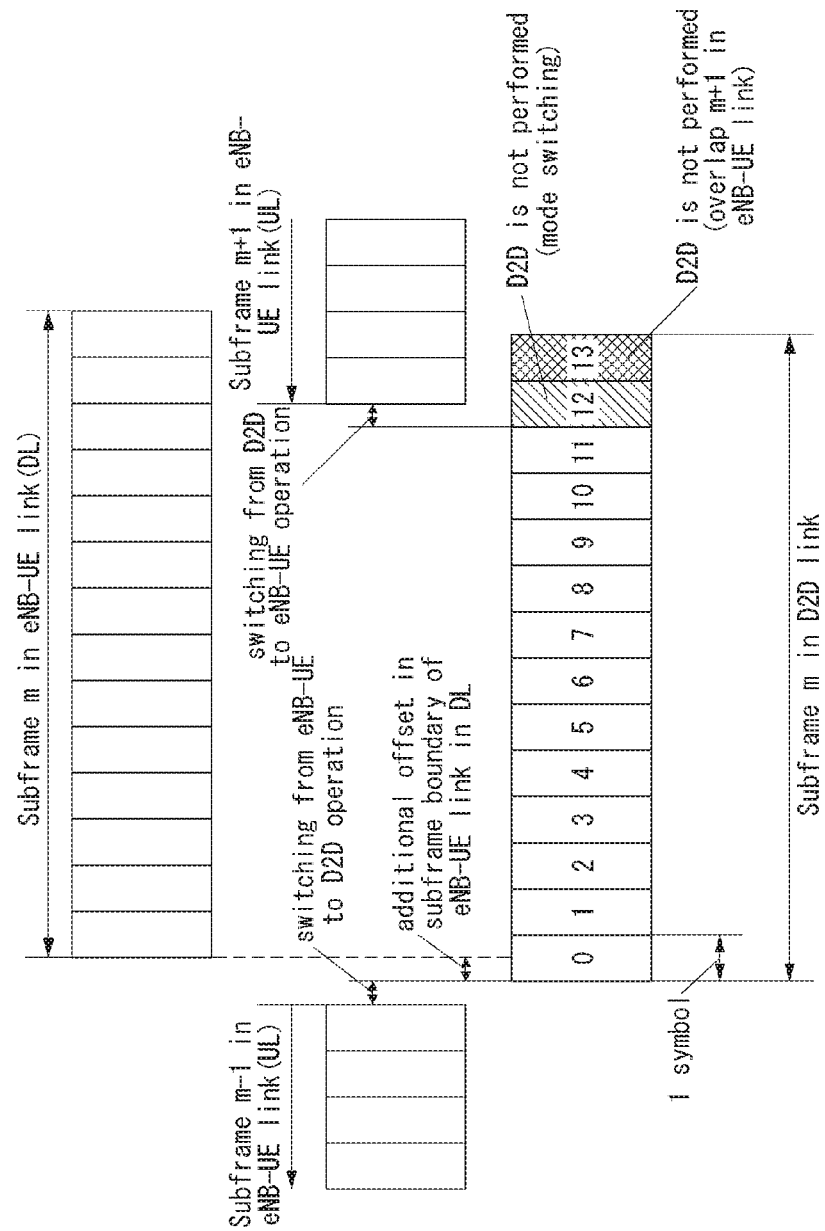

When the TA value is set to have a predetermined level or greater as illustrated in FIG. 27, the number of OFDM symbols (or SC-FDMA symbols) that may be used for D2D in the subframe m is changed.

As a solution to this problem, various formats of transmission and reception signals in the D2D link may be created and a format appropriate for the number of OFDM symbols available in each situation is selected.

Here, since the TA value is set to be different in each UE, the eNB may determine transmission and reception signal formats (or the number of OFDM symbols available for D2D) of the D2D link to be used on the basis of a maximum value of the TA value regarding UEs within a cell and inform the UEs about the determined signal formats through a signal such as system information or an RRC.

When a UE receives the determined signal formats, even though the UE may use a greater number of symbols for D2D in a TA value thereof, the UE operates to transmit and receive a D2D signal according to the formats signaled from the eNB (In general, the UE uses the number of OFDM symbols smaller than that available to be used in the TA value thereof) in order to properly transmit and receive a signal to and from a UE having a different TA value.

Here, creating an excessively large amount of D2D transmission/reception signal formats may complicate implementation of a UE.

In this case, by using the method 4 described above with reference to FIG. 25, an operation of using the most appropriate format but not utilizing some symbols for D2D link may be preferred, instead of restricting the formats of D2D transmission and reception signals to some and using every available symbol for D2D.

Figure 28:
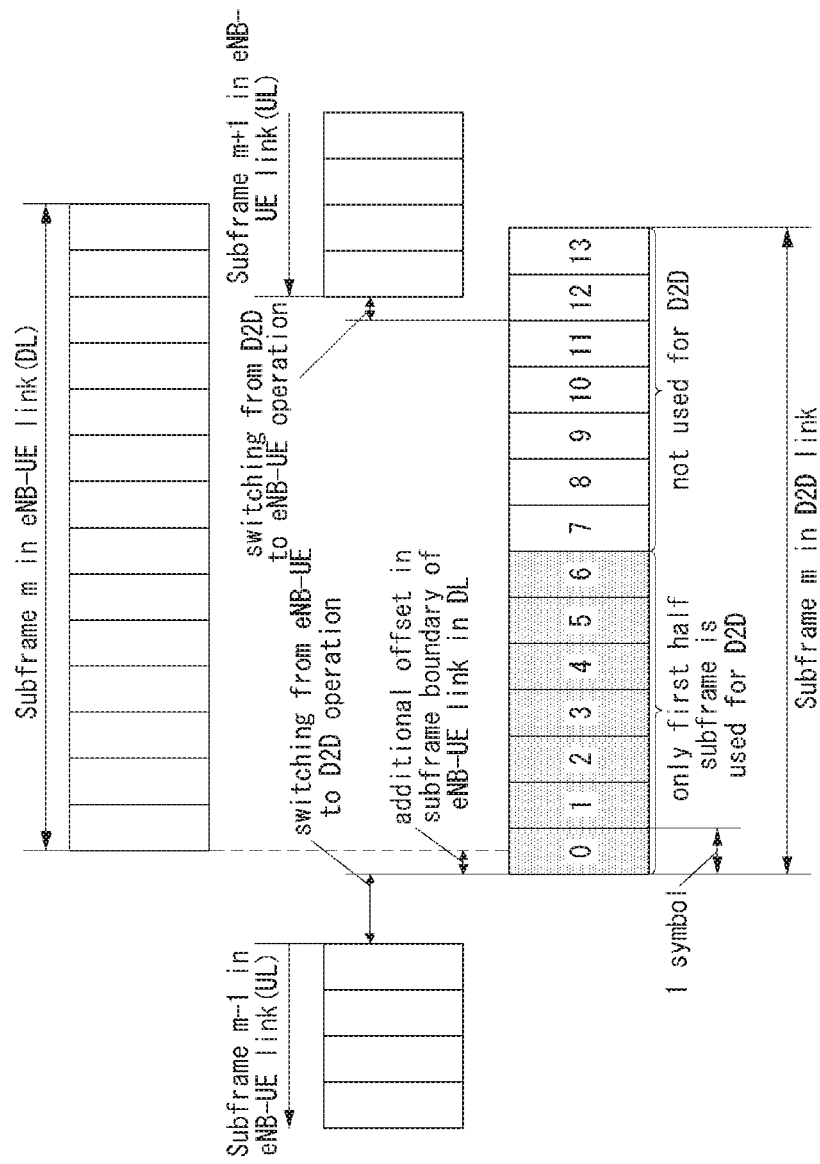

FIG. 28 illustrates an example of this method. In a situation in which the same TA as that of FIG. 27 is given, OFDM symbols #0 to #6 corresponding to a first half are utilized for D2D and the other symbols are not used.

In this case, in a situation in which a relatively small TA is given as illustrated in FIG. 26, the OFDM symbols #0 to #12 may be used for D2D, and this may be explained as having two types of D2D transmission/reception signal formats in FIG. 29 as described hereinafter.

Figure 29:
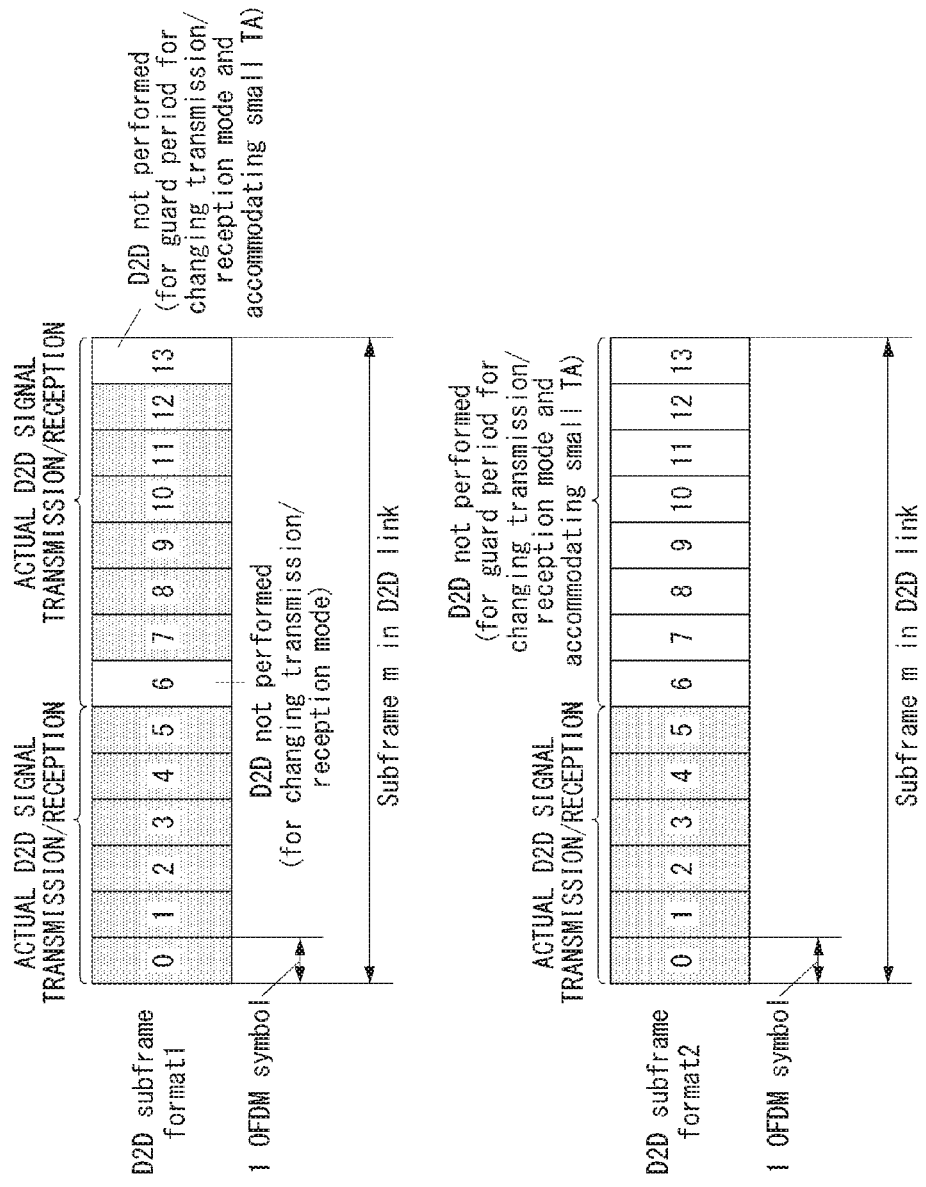

In FIG. 29, some of the OFDM symbols utilized for D2D may not be utilized for actual signal transmission and reception for a transmission/reception mode switching of the UE. In FIG. 29, in particular, symbol #6 is not utilized for actual signal transmission/reception.

In FIG. 29, it is assumed that a format of D2D transmission/reception signals is determined by slot corresponding to a half of one subframe, and the last symbol of one slot (symbol #6 or symbol #13 in FIG. 29) is used for the purpose of mode switching for D2D or eNB-UE link transmission/reception operation in a next slot.

As a result, in a case in which a small TA is given as illustrated in FIG. 26, both two slots may be utilized for D2D transmission and reception by applying the D2D subframe format 1 (in particular, since transmission/reception mode may be converted by using symbol #6, transmission/reception operation modes may be set to be different in each slot).

In contrast, when a large TA is given as illustrated in FIG. 27, only the front slot is utilized for D2D transmission/reception by applying a D2D subframe format 2.

In particular, in the D2D subframe structure of FIG. 29, one slot corresponding to a relatively short time domain is used as a basic unit, and thus, the D2D subframe structure of FIG. 29 may be advantageously applied to a case in which a discovery signal which transfers a relatively small amount of signal is transferred.

If the TA value is so large that the D2D subframe format 2 using only one slot is applied, a larger amount of subframes may be allocated for the D2D purpose, thus solving a resource shortage problem.

Figure 30:
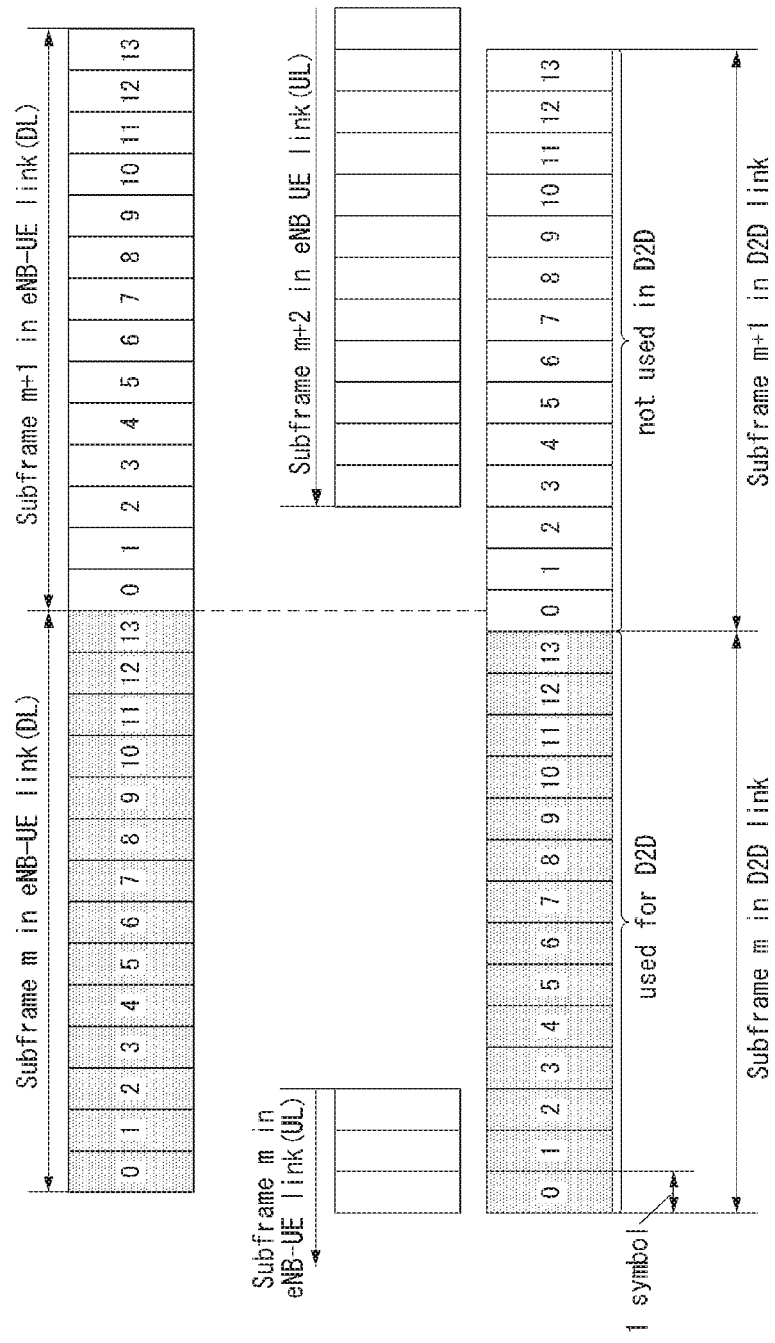

If the TA value is so large that a partial region of the first slot of the D2D subframe overlaps a region of the UL subframe of the following eNB-UE link, two contiguous subframes (subframes #m and #m+1) as illustrated in FIG. 30 are allocated as D2D subframes.

The subframe m+1 may not be actually utilized for D2D, and in actuality, an eNB-UE link operation should be performed in a subframe m+2 in most regions.

The D2D operation may be performed using the subframe m simultaneously. In this case, since all the symbols of the corresponding subframe can be used, in the case of FIG. 29, the D2D subframe format 1 may be applied in the subframe m, and the subframe m+1 may be designated as a D2D subframe but it may be regarded as a null D2D subframe which does not perform any D2D operation.

The null D2D subframe may also be regarded as a D2D subframe format, and putting all the situations together, the eNB may inform the UE about which subframe is used as a D2D subframe (in particular, a subframe in which a D2D operation which does not follow a TA indication is performed, for example, a subframe in which discovery is performed) and what the format is in each of D2D subframes.

Figure 31:
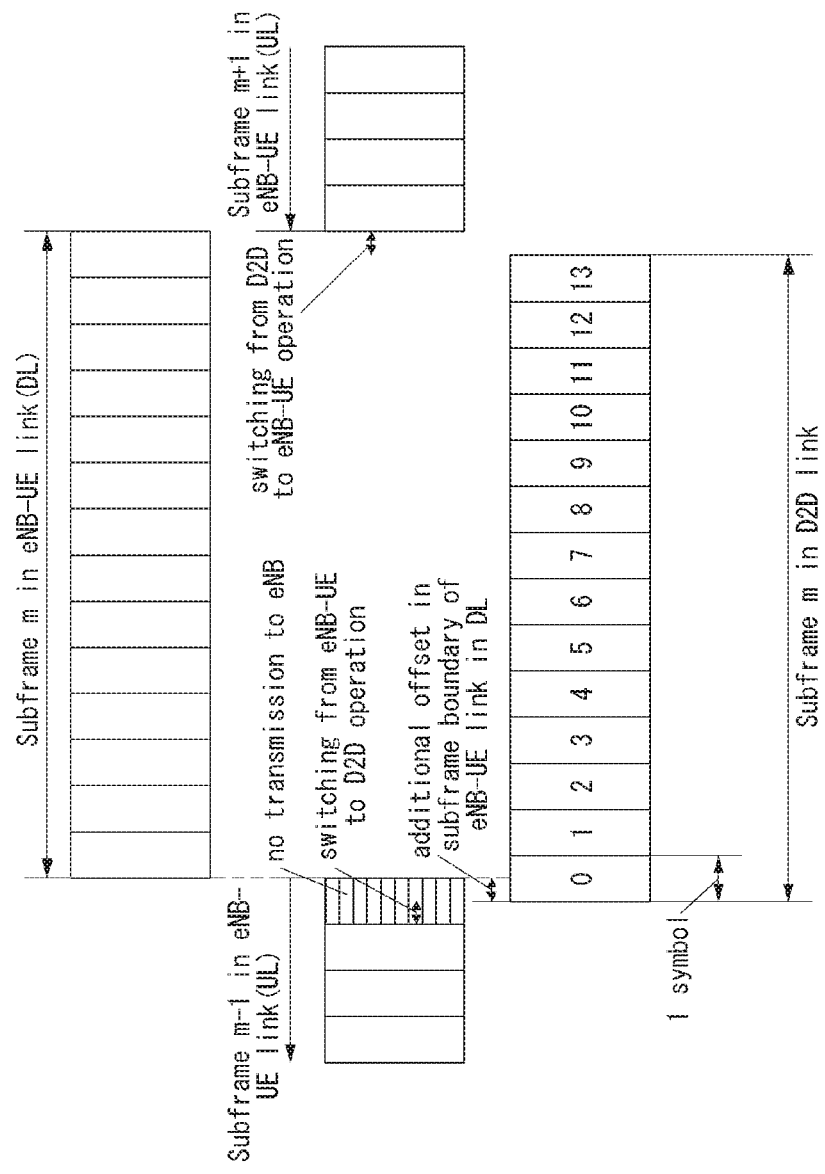

FIG. 31 illustrates an example in which the TA of FIG. 26 is set to be very small.

As illustrated in FIG. 31, the last symbol of the subframe m−1 partially overlaps a first symbol of the subframe m. In this case, mode switching may be performed without using the last symbol of the subframe m−1.

In particular, this operation may be effective in a case in which the UE, which has transmitted a UL signal to the eNB in the D2D subframe m−1, receives a D2D signal in the subframe m.

This is because, the UE which transmits the D2D signal in the subframe m does not require mode switching between the subframe m−1 and the subframe m.

As an example of an operation of not using the last symbol of the subframe m−1, the eNB may configure the corresponding subframe m−1 as a subframe for an SRS so that a corresponding UE may operate to terminate PUSCH or PUCCH transmission to the eNB prior to the last symbol in the corresponding subframe.

That is, in a case in which a certain UE receives a D2D signal in the subframe m and transmits a signal to the eNB in the subframe m−1 and a TA value of a predetermined level (for example, a time for mode switching) or lower, the eNB may adjust such that a transmission indication regarding the last symbol of the subframe m−1 is not performed (through an appropriate SRS configuration, or the like).

Or, without adjustment by the eNB, the UE may operate not to automatically perform transmission (for example, not to transmit the SRS or to terminate PUSCH/PUCCH transmission earlier).

When the UE transmits a D2D signal in the subframe m, mode switching is not required, and thus, a partial region of the last symbol of the subframe m−1 may be used for signal transmission to the eNB. For example, the UE may operate to transmit the aforementioned SRS.

Or, in order to support unity of an operation, it may be defined such that transmission to the eNB is not performed in the last symbol of the subframe m−1.

FIG. 31 is different from FIG. 26 in that the last symbol of the subframe m of FIG. 31 may be used for D2D.

In this case, the eNB may appropriately configure operations of FIGS. 26 and 31 according to a TA value, or for the purpose of unity, the UE operates such that the last symbol is not used for D2D even when a TA is small as illustrated in FIG. 31.

In FIGS. 26, 27, and 31, when the UE performs mode switching between transmission and reception in one subframe, an appropriate symbol should be set as a guard period.

For example, when the frame structure as illustrated in FIG. 26 is used, in a case in which the UE performs different transmission and reception operations in a front portion and a rear portion of the corresponding D2D subframe, the symbol #6, the last symbol, of the front portion may be set as a guard period, rather than being used for D2D signal transmission and reception, in order to make the symbol configurations in the front portion and the rear portion uniform.

Or, the aforementioned additional offset may be provided in the opposite direction so that the UE may operate such that a D2D subframe starts later by the offset than a boundary point of a DL subframe.

Figure 32:
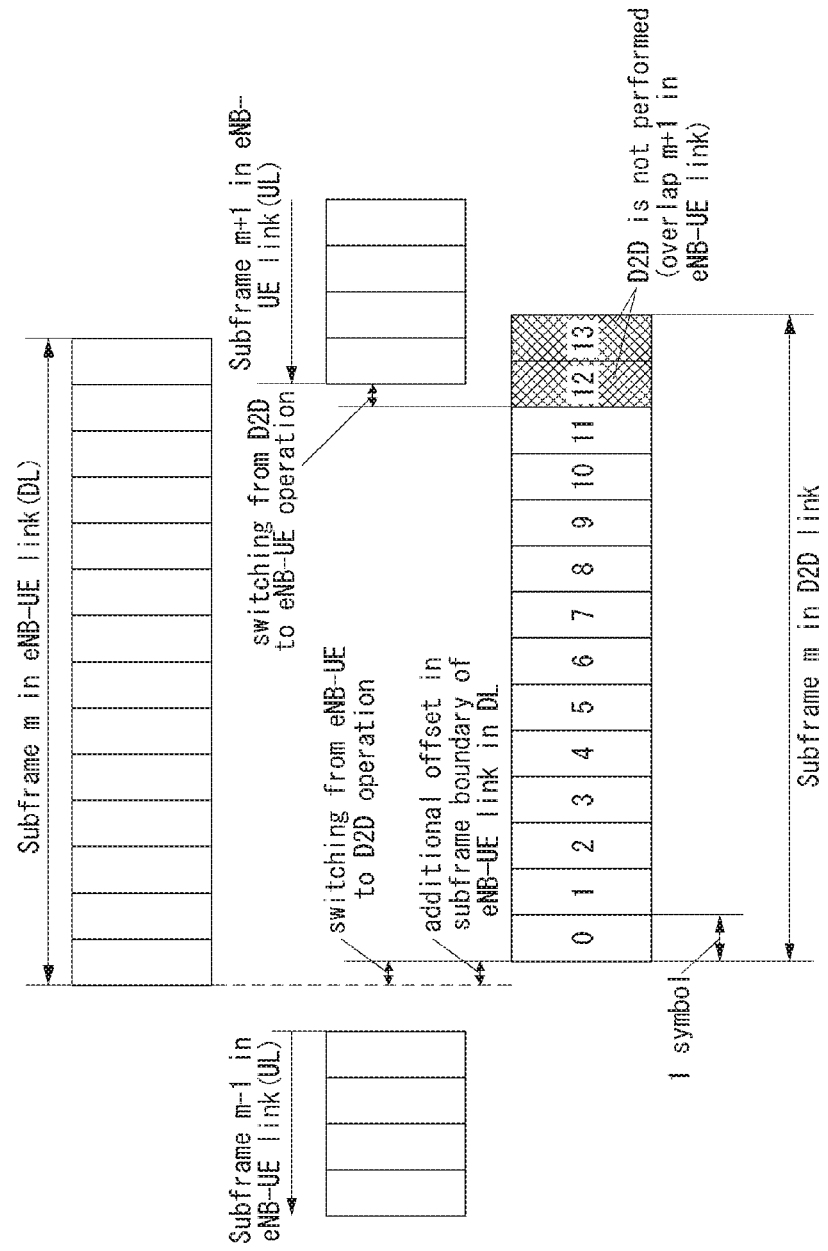

FIG. 32 illustrates an example in which an offset is provided in a direction opposite to that of FIG. 26 in the same situation as that of FIG. 26.

On the assumption that a subframe of a D2D link starts at a time later by a predetermined offset from a boundary of a received DL subframe, the UE performs mode switching for a corresponding time. The final some symbols of the subframe operating D2D overlap the UL subframe of the eNB-UE link, so the symbols cannot be used for D2D, and mode switching is performed again using a portion of the corresponding usage unavailable time.

In the method of FIG. 32, a predetermined mode switching time may be secured before a D2D subframe starts even in a situation in which the UE is very close to the eNB so the TA value is close to 0.

That is, D2D use of an initial symbol is guaranteed all the time, and a position of the last symbol that can be used for D2D may be appropriately set, as necessary.

The operation of FIG. 32 may be considered to be the same as an assumption that D2D subframe starts from symbol #1 in the operation of FIG. 26.

That is, the D2D subframe starts earlier by an offset from the DL subframe, and symbol 0, the first symbol, cannot be used for D2D.

As illustrated in FIG. 32, even when the D2D subframe starts earlier by the offset than the eNB-UE link subframe, the UE may be operated by selecting an appropriate one of formats illustrated in FIGS. 29 and 30 according to a set TA and operated.

As discussed above, the number and position of a symbol available for D2D signal transmission and reception may be varied according to a TA value used by each UE.

The eNB should set appropriate D2D signal transmission/reception symbols in consideration of the TA value that UEs within its cell may have.

However, a maximum value of a TA estimated by the eNB may be smaller than a maximum value of the TA that the UEs actually have. Here, the UE may not be able to use some of D2D symbols set by the eNB when a TA value thereof and a mode switching time are considered.

Thus, when the UE is not able to use some of the D2D symbols set by the eNB, the corresponding UE may report the eNB accordingly.

Here, report information to the eNB may include information regarding a current TA value or a mode switching time required for the UE (or a total required guard period time obtained by adding the mode switching time to the current TA value), or a length of a time interval which is set for D2D transmission and reception but cannot be used by the UE.

In addition, the UE may inform the eNB about a type (or a D2D transmission and reception signal region having the maximum length) of a D2D subframe format that can be operated in a current situation thereof In applying the methods of FIGS. 18 through 32, before a regular D2D signal including control information or data information intended to be transmitted by the D2D transmission UE is transmitted, a separate signal helping a reception preparation operation of a reception UE including time/frequency synchronization may be transmitted.

Hereinafter, a separate signal transmitted for the purpose of helping a reception preparation operation of the reception UE before the D2D signal transmitting regular control/data information will be expressed as 'preamble'.

The preamble refers to a signal known in advance between transmission and reception UEs.

Since the preamble is transmitted for a previous preparation process before regular signal reception such as the reception UE's time/frequency synchronization or gain control of a reception amplifier, if a transmission time of the preamble is sufficient for the previous preparation process, a transmission time of the preamble is not required to occupy a time of one or more OFDM symbols.

Figure 33:
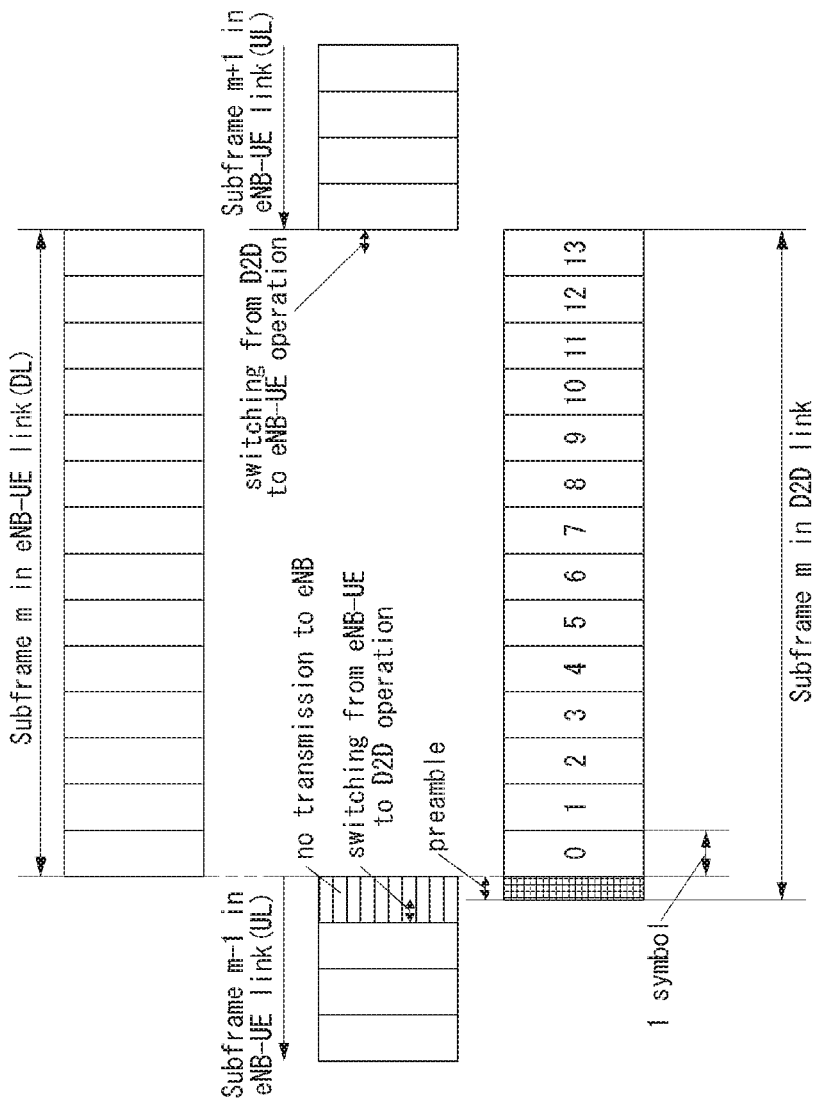
FIGS. 33 through 35 are views illustrating examples in which a point at a position by a predetermined offset from a DL subframe boundary is determined as a start point of D2D transmission.
Figure 34:
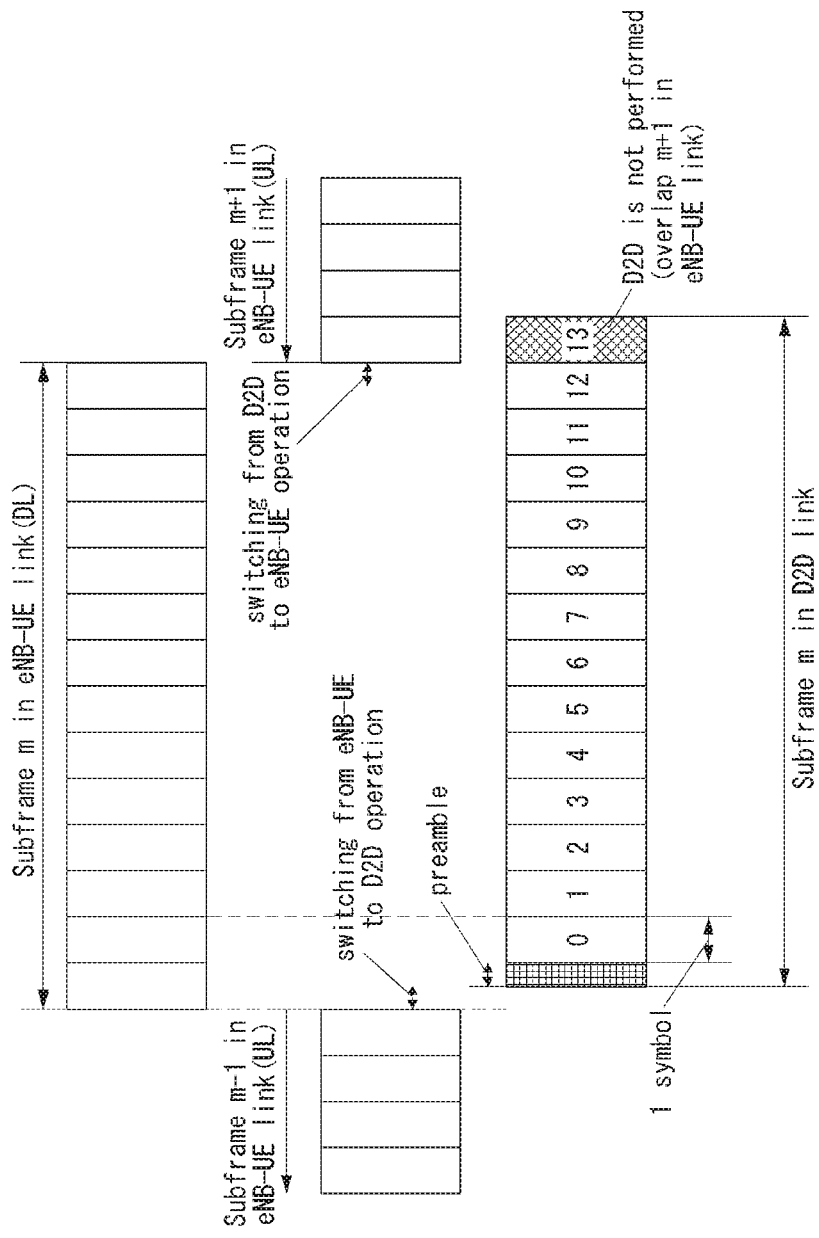
Figure 35:
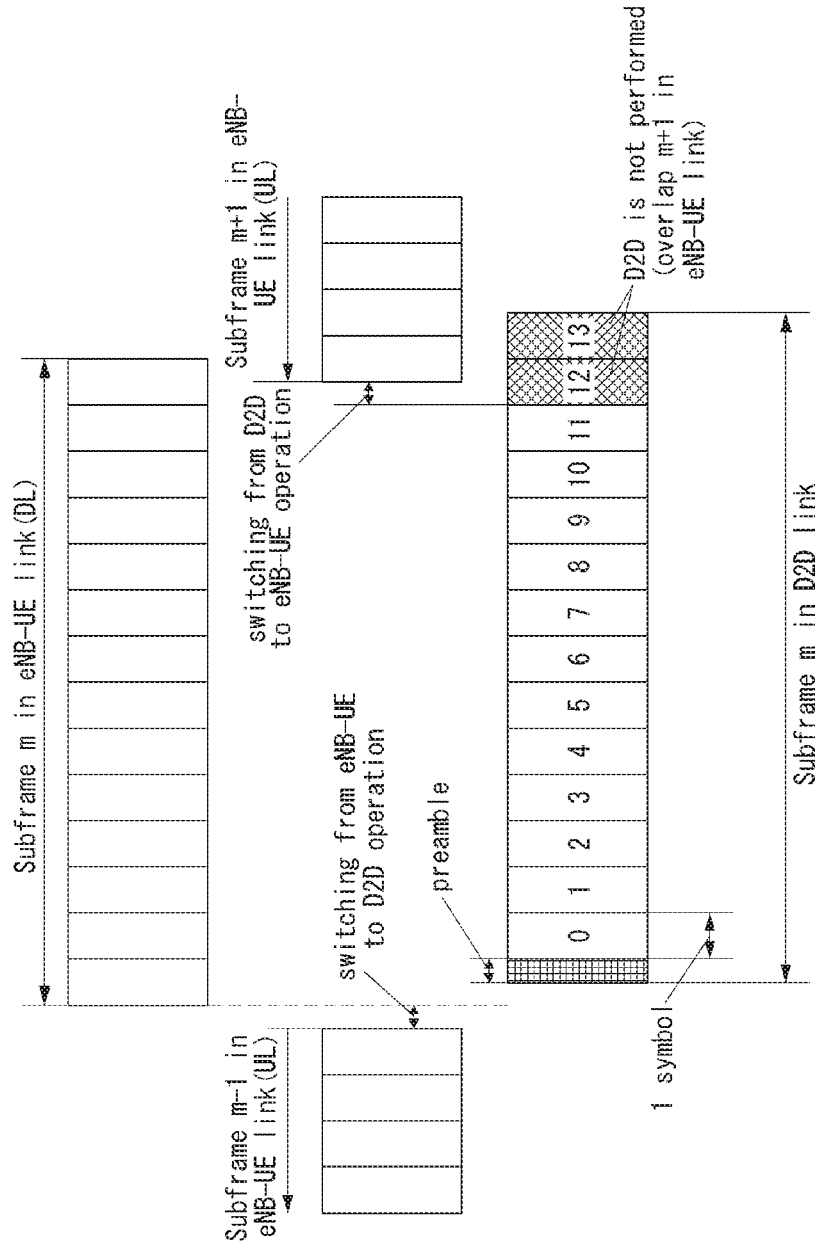

FIGS. 33 through 35 are views illustrating examples in which a point at a position by a predetermined offset from a DL subframe boundary is determined as a start point of D2D transmission.

FIG. 33 illustrates a case in which a point advanced by a predetermined offset from a DL subframe boundary obtained by a UE is regarded as a time point at which a D2D subframe starts (or a time point at which D2D transmission starts), like in FIG. 26.

In the case of FIG. 33, a preamble for synchronization, or the like, is transmitted before regular D2D symbols are transmitted, and it can be seen that symbol #0 corresponding to a first symbol among the regular D2D symbols starts to be transmitted from a boundary point of a DL subframe obtained by the UE.

That is, a length of an offset applied to the DL subframe boundary matches a transmission time of the preamble.

FIG. 33 corresponds to a case in which a TA of 0 is applied to the corresponding UE, and as a result, it is not possible to transmit a signal to the eNB at the last symbol of the subframe m−1.

Instead, transmission in a previous symbol is terminated, switching between transmission and reception is performed for a predetermined time, and a preamble is transmitted/received.

As illustrated in FIG. 33, when a switching time between transmission and reception and a transmission time of the preamble are added, the sum may be equal to or less than one OFDM symbol time, and by appropriately using this structure, loss of an OFDM symbol due to switching and the preamble may be minimized.

Referring to FIG. 33, when it is assumed that symbol #13 of the subframe m cannot be used because it overlaps the subframe m+1, a total of 13 symbols can be used.

If a portion in which there is no signal transmission of UE is guaranteed in the subframe m+1, it is possible to use the symbol #13 of the subframe m may also be used for D2D.

In this situation, in a case in which a TA greater than 0 is applied to the corresponding UE, if the sum of the TA value and a required switching time between the subframes m and m+1 is smaller than or equal to 1 OFDM symbol time, the symbol #13 is not used for D2D, whereby an operation of an eNB-UE link may start from a first symbol of the subframe m+1.

FIG. 34 illustrates an example in which a point postponed by a predetermined offset from a DL subframe boundary obtained by the UE is used as a start time point of D2D transmission.

FIG. 34 corresponds to a case in which the sum of a length of an offset and a preamble transmission time is equal to 1 OFDM symbol time.

That is, FIG. 34 features that a symbol #0 including a D2D signal is simultaneously transmitted with a second symbol of the DL subframe.

When the D2D reception UE requires a switching period smaller than 1 OFDM symbol in order to perform switching between an operation of transmitting a signal to the eNB and a D2D signal reception operation, the D2D reception UE uses a remaining interval excluding a switching period in an OFDM symbol time in which the corresponding switching period is present, to transmit a preamble.

In this manner, loss of the OFDM symbol due to the switching period and preamble may be minimized.

When there is transmission of a transmission or reception UE to the eNB in the subframe m+1, symbols #12 and #13 cannot be used for D2D and switching between reception and transmission should be guaranteed using a partial time of symbol #12.

FIG. 35 is a view illustrating an example of a situation in which a TA having a predetermined level is applied in FIG. 34.

As illustrated in FIG. 35, when the applied TA is smaller than or equal to a value obtained by subtracting a time required for switching from 1 OFDM symbol time, a total of 12 symbols from symbol #0 to symbol #11 may be used in the subframe m.

Thus, the number of symbols may be maintained to be uniform, excluding a special case in which a TA value is very large, whereby a plurality of UEs may share the same format.

If the TA value is very large, a D2D subframe format using a smaller number of symbols may be used or the BS may guarantee that transmission to the eNB in the subframe m+1, a subsequent subframe, is prevented.

Figure 36:
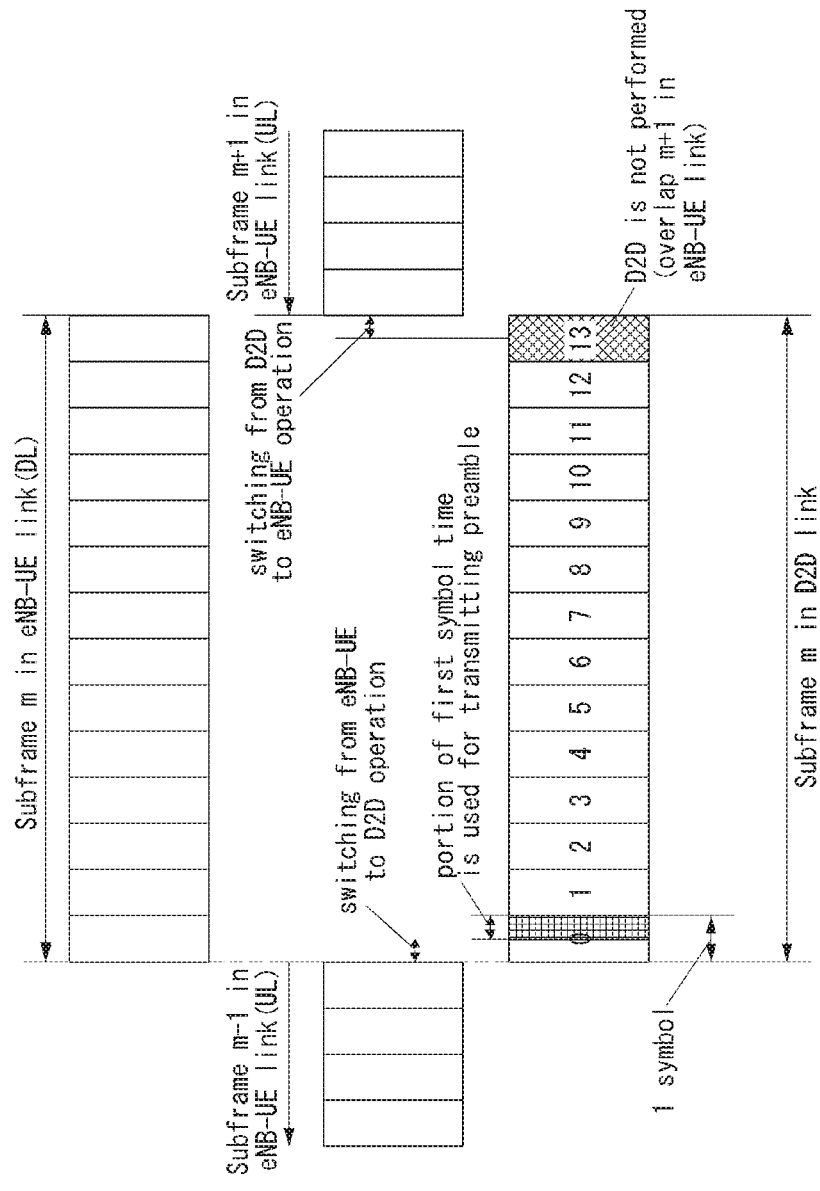
FIG. 36 is a view illustrating an example in which the same point as a DL subframe boundary is used as a start point.

FIG. 36 is a view illustrating an example in which the same point as a DL subframe boundary is used as a start point.

In FIG. 36, the subframe m allocated for D2D has the same subframe boundary as that of the DL subframe, and a TA value is set to 0.

In FIG. 36, switching is performed during a partial amount of time of symbol #0 of the subframe m, and a preamble is transmitted using a subsequent remaining amount of time.

This corresponds to an operation of transmitting a D2D signal including the preamble from a time point delayed by the predetermined offset from the boundary of the DL subframe, and resultantly, it can be seen that the number of symbols available for D2D and temporal positions of the symbols are the same as the case of FIG. 34.

That is, the preamble is transmitted from a time point delayed by the offset from the DL subframe boundary, and the first regular D2D symbol starts to be transmitted from the same time point as that of the second symbol of the DL subframe (symbol #0 in FIG. 34 and symbol #1 in FIG. 36). After a total of 12 symbols are transmitted/received, switching is performed for a transmission operation in the following subframe m+1.

The difference between FIGS. 34 and 36 is that the indices of the symbols used for D2D are different.

In the frame structure of FIG. 36, the first and last symbols of the subframe m are not used for transferring D2D information, and as a result, the structure of the subframe is symmetrical. Also, the frame structure of FIG. 36 is advantageous compared with the frame structure of FIG. 34, in that an operation such as changing a frequency domain by slot is performed.

That is, the numbers of symbols available in two slots of one subframe are the same.

Figure 37:
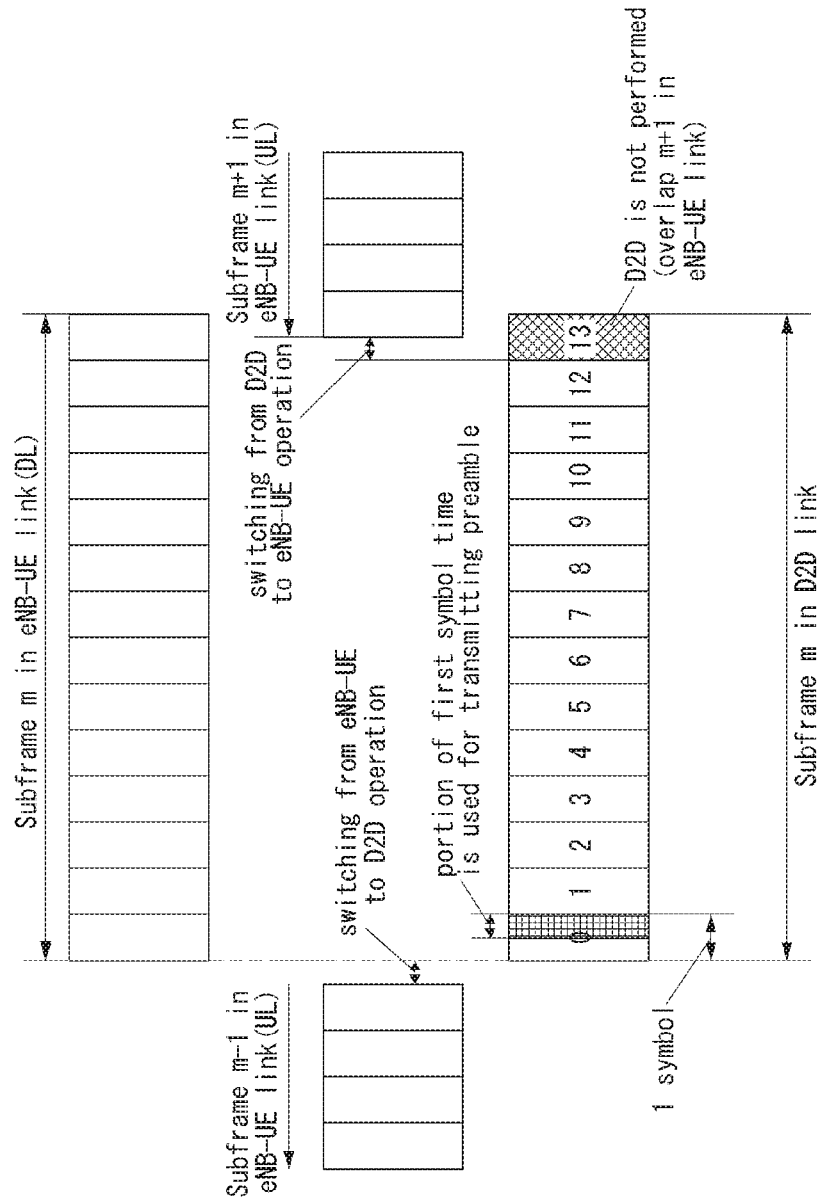
FIGS. 37 and 38 are views illustrating another example in which a point positioned by a predetermined offset from a DL subframe boundary is used as a start point of D2D transmission.
Figure 38:
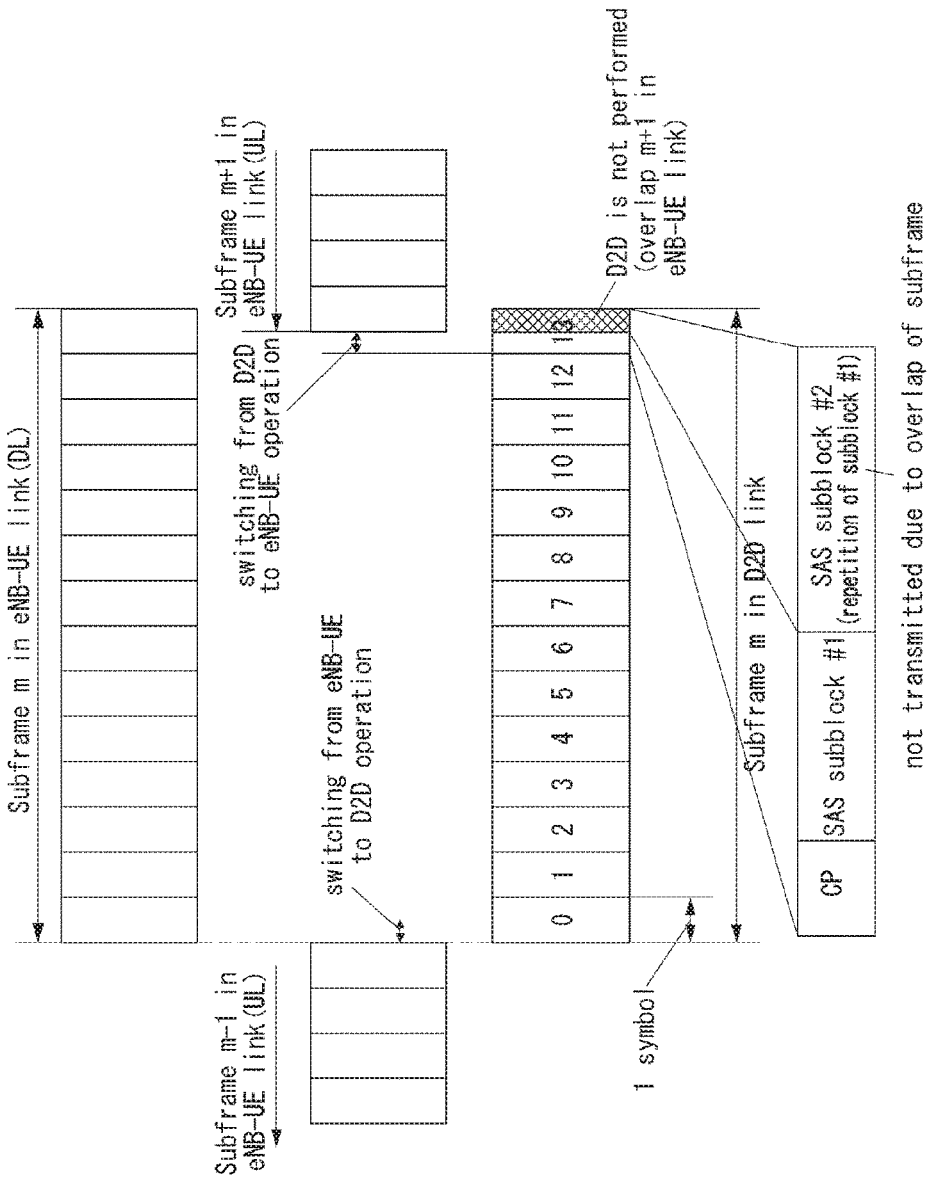

FIGS. 37 and 38 are views illustrating another example in which a point positioned by a predetermined offset from a DL subframe boundary is used as a start point of D2D transmission.

FIG. 37 illustrates an example of a case in which a TA greater than 0 is applied.

As illustrated in FIG. 37, when the sum of the TA value and a time required for switching is smaller than or equal to one OFDM symbol time, the symbols from symbol #1 to symbol #12 may be used.

That is, every UE to which a TA having a predetermined level or less may share the same D2D subframe format.

In a case in which the TA exceeds the predetermined level, a D2D subframe format using a smaller amount of symbols is used or the base station should guarantee that transmission to the eNB in the subframe m+1 corresponding to a subsequent subframe is prevented.

As discussed above, the operation of restricting transmission of the D2D signal in the last partial time domain of the subframe m to prevent an influence in the subframe m+1 as a subsequent subframe when the subframe m is allocated for D2D may have a unit smaller than the unit of 1 symbol.

For example, a D2D signal may be transmitted in a front partial sample (or region) in the symbol #13 of FIG. 38, but the TA value needs to be appropriately adjusted such that transmission of the subframe m+1 may start after a period of time required for the corresponding UE to switch transmission and reception has passed from a point in time at which the portion in which the D2D signal was transmitted was terminated.

Here, transmission of the D2D signal using only a partial sample of one symbol will be expressed as 'partial symbol transmission'.

The partial symbol transmission may include, for example, transmission of a sounding reference signal (SRS).

The SRS may be configured to be applied once in every two subcarriers and 0 is applied to the other remaining subscribers. In terms of a time dimension, the SRS transmission appears such that two same signals are repeated (a cyclic prefix may exist before repetition of the two signals).

Thus, in this case, when the signal of the time dimension repeated in the existing SRS is transmitted once, a partial symbol transmission may be performed using an existing signal transmission circuit.

However, the principle of the partial symbol transmission is not limited to the case of transmission using the SRS, and may also be applied to a transmission of a reference signal or a signal corresponding to a codeword.

Also, in this case, only a portion of a sample corresponding to one symbol of the reference signal or a signal corresponding to a codeword may be transmitted, and a time corresponding to the other remaining sample may be used for the purpose of switching transmission and reception and absorbing a TA of a subsequent subframe.

When the aforementioned methods are used, in a case in which even only subframe is operated for D2D, an eNB-UE operation of a subframe adjacent to the subframe operating for the D2D is restricted.

Such a restriction may occur because a boundary of the D2D subframe and a boundary of the eNB-UE subframe do not match.

Thus, when the D2D is performed in a series of subframes, it may be helpful to continuously set D2D subframes operating with the same boundary of the subframes to reduce the restriction that may occur.

Figure 39:
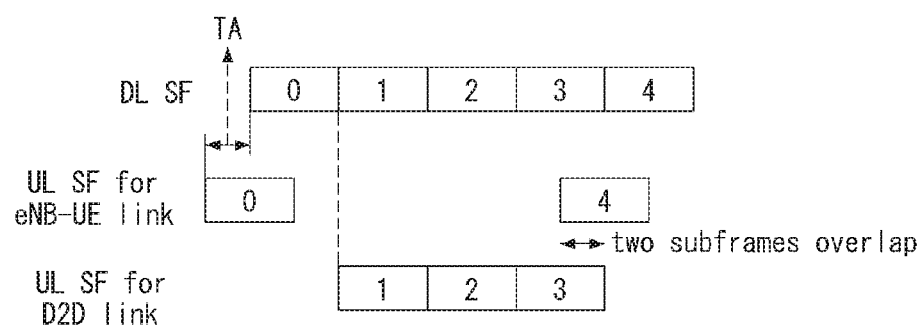
FIGS. 39 and 40 are views illustrating an example of a method for solving a problem in which a boundary of a D2D subframe and a boundary of an eNB-UE subframe do not match.
Figure 40:
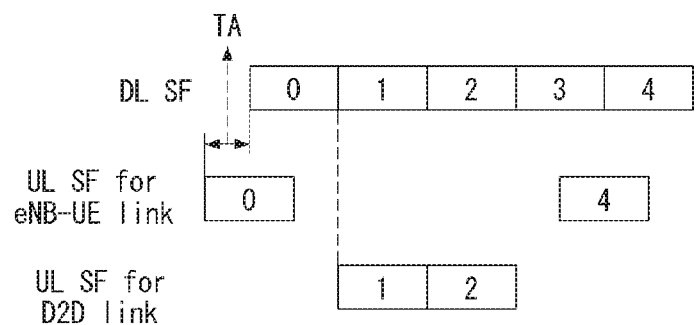

FIGS. 39 and 40 are views illustrating an example of a method for solving a problem in which a boundary of a D2D subframe and a boundary of an eNB-UE subframe do not match.

FIG. 39 illustrates an example of a method for solving a problem in which boundaries of the D2D subframe and the boundary of the eNB-UE subframe do not match by continuously setting D2D subframes.

Referring to FIG. 39, when subframes 1, 2, and 3, are continuously used for D2D, the entire region of the subframes 1 and 2 may be used as D2D subframes without any problem.

In this case, various methods solving a problem of overlap with respect to the eNB-UE link described above may be limitedly applied only to the last subframe among the series of continuous D2D subframes, like the subframe 3.

As discussed above with reference to FIG. 39, the operation of setting the continuous subframes as D2D subframes may be implemented in a form of setting UL/DL configuration for TDD in a UL band in an FDD system.

For example, the eNB may set the configuration of Table 3 or a new configuration in an FDD UL band.

In the DL subframes of the set configuration, the eNB may perform a D2D operation by using the same subframe boundary (or deformed by a predetermined offset) as that of the DL subframe of the eNB-UE link in the DL band, and in the UL subframe, the eNB may use the same subframe boundary as that of the UL subframe of the general eNB-UE link.

Here, the D2D operation of the DL subframe (subframe set to DL) may include both discovery and communication or may include only any one of them.

Or, the eNB may perform the D2D operation on the basis of the boundary of the DL subframe without a TA, and here, the eNB may perform the D2D operation on the basis of the UL subframe set according to the TA give to the corresponding UE in the UL subframe.

For example, D2D discovery is performed without using a TA value optimized for an individual UE in the DL subframe, and for D2D communication (in particular D2D communication between UEs connected to the eNB), a subframe boundary determined according to a TA transmitted to an individual UE in the UL subframe may be used.

Referring to FIG. 39, subframes 1 and 2 may be regarded as DL subframes, and the subframe 0 may be regarded as a UL subframe.

A specific method of interpreting a subframe which overlaps, like the subframes 3 and 4, is as follows.

In a case in which the method 1 of FIG. 22 is used, the subframe 3 is regarded as a special subframe, the region A operated for D2D may be regarded as DwPTS, and the other remaining time may be regarded as a guard period absorbing a TA.

Also, the region B may be utilized for eNB-UE link by the subframe 4 corresponding to a UL subframe in actuality.

In a case in which the method of FIG. 23 is used, the entire region of the subframe 3 may operate for D2D, and the subframe 3 is also regarded as a DL subframe.

In this case, the subframe 4 is regarded as a special subframe and may be regarded as a special subframe including a guard period and UpPTS but without a DwPTS since there is no D2D operation.

In a case in which the method 3 of FIG. 24 is used, both the subframe 3 and the subframe 4 are regarded as special subframes.

However, it may be regarded that the subframe 3 does not have UpPTS and the subframe 4 does not have DwPTS. It may also be interpreted that a single super subframe connecting two subframes is set as a special subframe in a different sense.

In a case in which the method 4 of FIG. 25 is used, the subframe 3 is regarded as a special subframe and a partial region of the region A operating for D2D is regarded as DwPTS.

The other remaining time of the subframe 3 may be regarded as a guard period absorbing a TA.

The region B is utilized as an eNB-UE link by the subframe 4 corresponding to a UL subframe in actuality.

According to circumstances, a region which belongs to the region A but D2D is not operated therein may be utilized as UpPTS as an uplink transmission interval to the eNB, and for example, a PRACH preamble or an SRS using a smaller number of symbols may be transmitted in the region in which D2D does not operate.

In particular, in a case in which the D2D subframe format 2 of FIG. 29 is applied, the last partial symbols of the region A may be set to UpPTS and utilized for transmission of various uplink signals.

That is, as discussed above, in a method for setting a TDD UL/DL configuration in a UL band of FDD, the TDD UL/DL configuration may be selectively set only in a time interval in which D2D operates.

For example, operation may be performed such that the UL/DL configuration is applied only to a radio frame appearing at a predetermined period and the entire subframes are UL subframes in the other remaining radio frame.

In detail, since HARQ has an attribute of operating at a period of 8 ms in UL of FDD (that is, retransmission regarding a PUSCH transmitted in a subframe n is performed in subframe n+8), the TDD UL/DL configuration in the UL band may have a period of 4 ms, 8 ms, or a multiple of 8 ms.

Accordingly, only a subframe that belongs to a specific UL HARQ process in the eNB-UE link is utilized for the D2D operation, a restriction to UL HARQ in the eNB-UE link occurring while the D2D operation is performed may be limited to a specific process, and the other remaining process may be performed without any influence.

For example, one of the TDD UL/DL configurations of Table 3 may be configured in an FDD UL band, and it is assumed that the UL/DL configuration is repeated at the period of 4 ms or 8 ms illustrated in Table 3.

In a case in which the TDD UL/DL configuration appears at a multiple of 8 ms, the entire subframes may be divided into eight continuous subframe groups, and one of the configurations illustrated in Table 3 may be set only in a partial group.

In Table 3, the subframe number may be a value corresponding to the remainder of dividing (radio frame number*10+subframe number) by 8.

Characteristically, in Table 3, configuration #9 has one special subframe and 7 UL subframes.

A DwPTS of the special subframe is used as D2D according to the methods discussed above, and the other may be utilized as general UL subframes.

Here, the special subframe may be present in a certain position, and the position in the special subframe in Table 3 is merely an example.

TABLE 3

| Uplink-downlink configuration | Downlink-to-Uplink Switch-point periodicity | Subframe number | | | | | | | |
|---|---|---|---|---|---|---|---|---|---|
| | | 0 | 1 | 2 | 3 | 4 | 5 | 6 | 7 |
| 0 | 4 ms | D | S | U | U | D | S | U | U |
| 1 | 4 ms | D | S | U | U | D | S | U | D |
| 2 | 4 ms | D | S | U | D | D | S | U | D |
| 3 | 8 ms | D | S | U | U | U | U | U | U |
| 4 | 8 ms | D | S | U | U | U | U | U | D |
| 5 | 8 ms | D | S | U | U | U | U | D | D |
| 6 | 8 ms | D | S | U | U | U | D | D | D |
| 7 | 8 ms | D | S | U | U | D | D | D | D |
| 8 | 8 ms | D | S | U | D | D | D | D | D |
| 9 | 8 ms | D | S | U | U | U | U | U | U |

As a method for simply implementing an operation similar to the operation of FIG. 39, there may be a method of separating M number of continuous UL subframes from eNB-UE link and the operating D2D only in (M−1) number of subframes.

FIG. 40 is a view illustrating an example of a method for simply performing an operation similar to the operation of FIG. 39.

Referring to FIG. 40, subframes 1, 2, and 3 are separate in the eNB-UE link, but in actuality, only the subframes 1 and 2 are used as D2d.

Here, the subframe 3 may be regarded as being used for the purpose of absorbing a TA of each UE.

The case of FIG. 40 is disadvantageous in that one subframe cannot be used, but is advantageous in that a related operation may be simplified even without implementing various transmission and reception schemes according to a TA as in the method discussed above.

In particular, the method of FIG. 40 is appropriate for a case in which the D2D operation is intermittently performed.

In a case in which an additional UL/DL configuration for informing about a D2D operation subframe is set in a UL band, when it is configured as DL of D2D so a complete subframe is available for D2D, it may be used for D2D communication requiring a relatively large resource.

In contrast, in case of a subframe positioned at the end of a series of D2D subframes and used as a special subframe, it may be operated to be utilized for the purpose of D2D discovery requiring a relatively small amount of resource.

In a case in which a specific time/frequency resource is set for a D2D operation but not actually used for D2D transmission and reception, the eNB may transmit data to the UE through the corresponding resource.

The reason why data transmission from the eNB to the UE is possible in the D2D subframe is because the UE sets a UL subframe boundary at the same time point as that of the DL subframe of the eNB-UE link in the corresponding resource.

TDD System

Figure 41:
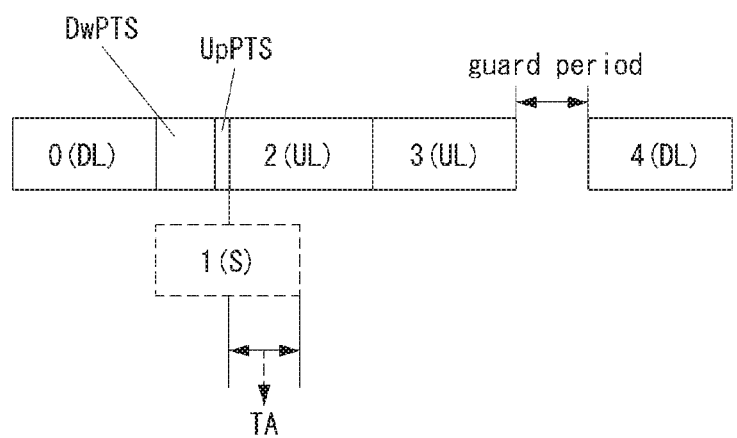
FIGS. 41 and 42 are views illustrating examples of a boundary of a DL subframe and a boundary of a UL subframe in a TDD system.
Figure 42:
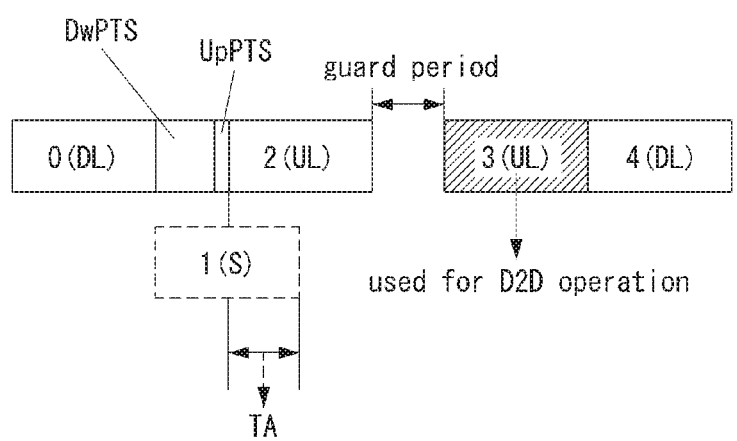

FIGS. 41 and 42 are views illustrating examples of a boundary of a DL subframe and a boundary of a UL subframe in a TDD system.

FIG. 41 is a view illustrating an example of DL and UL boundary in a TDD system.

Referring to FIG. 41, the UL subframe starts ahead by a TA value with respect to the DL subframe, and the mismatch of the subframe is solved by adjusting a guard period present between DwPTS and UpPTS of the special subframe.

In the case of the TDD system, the methods described above in the FDD system may be applied to perform D2D communication.

A characteristics part of the TDD system is that (1) the subframe in which D2D communication is performed is preferably a UL subframe not interfered by eNB transmission and (2) D2D communication has the same subframe boundary as that of a DL subframe.

In order to satisfy both the attributes of (1) and (2), first, a portion set as a UL subframe in a UL/DL configuration (for example, in a UL/DL configuration informed to a plurality of unspecific UEs through system information) set by one eNB is used for D2D operation.

However, the D2D operation uses the last of the continuous UL subframes as possible, and a boundary of the corresponding subframe may be set to be the same as that of the DL subframe in FIG. 42.

In FIG. 42, it is assumed that one subframe 3 is determined as D2D, and continuous subframes may also be set as D2D.

Also, as discussed above in the methods of the FDD system, a boundary adjusted by a predetermined offset from the boundary of the DL subframe may be set as a boundary of the corresponding D2D subframe.

In particular, in case of using the frame structure of FIG. 42, it may be configured such that a UL subframe allocated to the eNB-UE link after a certain D2D subframe is not present, and thus, a problem in which a subframe overlaps as a UL subframe of the eNB-UE link using a TA appears after a D2D operation subframe not using a TA may be prevented.

As a result, the eNB may use the configuration in which a maximum number of symbols are used for the D2D operation, regardless of a TA value available in the corresponding cell.

For example, the eNB may operate to use the upper frame structure, among the two D2D formats of FIG. 29, all the time, or may operate to utilize the 'partial symbol transmission' of FIG. 38 to the maximum.

Or, as discussed above with reference to FIG. 30, in a case in which a TA having a predetermined level or greater is applied, scheduling may be freely performed on the eNB-UE link without a restriction that there is no eNB-UE link transmission in a following subframe.

An operation similar to the operation of setting the TDD UL/DL configuration in the UL band as discussed above in the FDD system may also be performed in the TDD system.

The eNB first informs the UE about one UL/DL configuration in order to inform for what purpose each subframe is used (that is, whether each subframe is used for transmitting a signal of the eNB or whether it is used for transmitting a signal of the UE).

Thereafter, the eNB may inform about an additional UL/DL configuration in order to inform that a portion set as DL subframe in the corresponding configuration is a portion where D2D may be operated, while using the same subframe as the DL subframe of the eNB-UE link.

In the additional UL/DL configuration, in order to guarantee the fact that a subframe of UL has the same boundary as that of the UL subframe of the eNB-UE link all the time, there may be a restriction in that it should be UL on the configuration informing the purpose of the subframe.

Preferably, the D2D operation (or a portion of the D2D operation such as discovery) is set as DL in the additional configuration in order to use the DL subframe boundary of the eNB-UE link, but in actuality, in order to guarantee that there is no eNB signal transmission (there is no transmission such as CRS or CSI-RS transmitted in the at least the entire region), it is set as UL on the configuration designating the purpose of each subframe.

If a D2D discovery is transmitted from a UE positioned outside of the eNB coverage, a subframe having a TA and transmitted to the eNB does not exist.

Thus, when the D2D operation is performed in a manner similar to the case of FIG. 42, the subframe overlap problem due to a TA applied to the eNB-UE link transmission does not occur.

As a result, a configuration in which symbols as large as possible are used in the D2D operation may be used.

For example, it may be operated such that the upper frame structure, among the two D2D formats, is used all the time or such that the 'partial symbol transmission' as in FIG. 38 may be utilized as much as possible.

Hereinafter, a method for solving a conflict that may occur due to overlap between subframes proposed in this disclosure will be described.

In particular, a method for solving a conflict that may occur as a D2D transmission/reception (D2D Discovery or D2D Communication) subframe and a WAN (wireless area network) data transmission/reception subframe overlap will be described in detail.

The D2D transmission/reception (or D2D transception) subframe refers to a subframe allocated for direct communication between D2D terminals, and the WAN data transmission/reception subframe refers to a subframe allocated for communication between a BS and a terminal.

The D2D transmission/reception subframe may be expressed as a D2D subframe, a DBD resource (region( )), or a sidelink transmission/reception subframe.

Also, a subframe related to a D2D discovery procedure may be expressed as a D2D discovery subframe, and a subframe related to a D2D communication procedure may be expressed as a D2D communication subframe or a D2D data subframe.

Hereinafter, for the purposes of description, a subframe related to D2D will be expressed as a D2D subframe, a subframe related to WAN data transmission and reception will be expressed as a WAN subframe, a subframe related to D2D discovery will be expressed as a D2D discovery subframe, and a subframe related to D2D data transmission will be expressed as a D2D data subframe.

Also, in a case in which transmission and reception resources are distinguished, names of subframes may be distinguishably expressed as a transmission subframe and a reception subframe accordingly.

Also, the sidelink is a concept used for direct communication between terminals, and may have the same meaning as that of D2D used in this disclosure.

Hereinafter, the terms of sidelink and D2D will be used together.

The reason why the D2D transmission/reception subframe and a WAN data transmission/reception subframe or D2D transmission/reception subframes overlap is because a boundary of a UL subframe is ahead of a boundary time point of a DL subframe by a TA (timing advance or timing alignment) in order to reduce interference that occurs due to UL signal transmissions of a plurality of terminals, that is, in order to allow UL signals of a plurality of terminals to reach a BS at the same time point.

Figure 43:
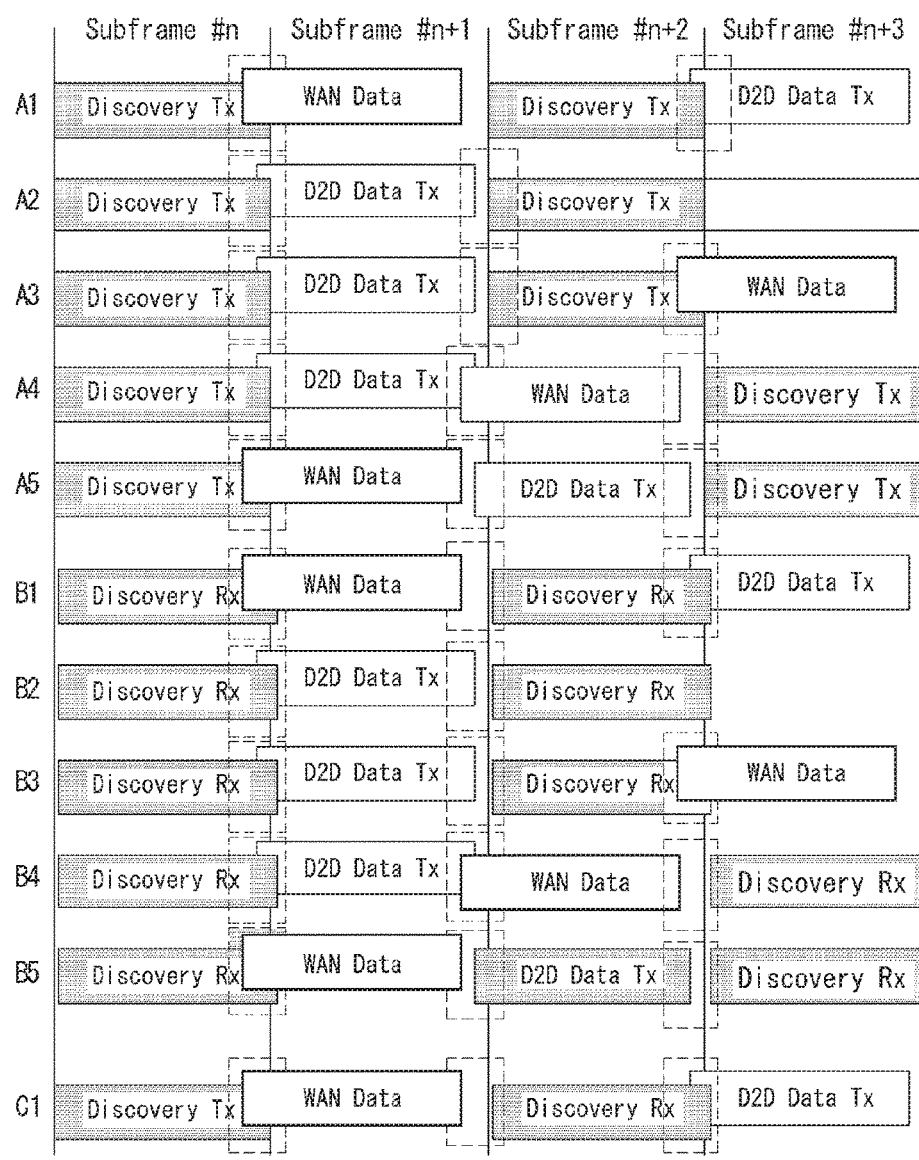
FIGS. 43 and 44 are views illustrating examples of a method for solving a collision that occurs due to overlap between subframes, proposed in this disclosure.
Figure 44:
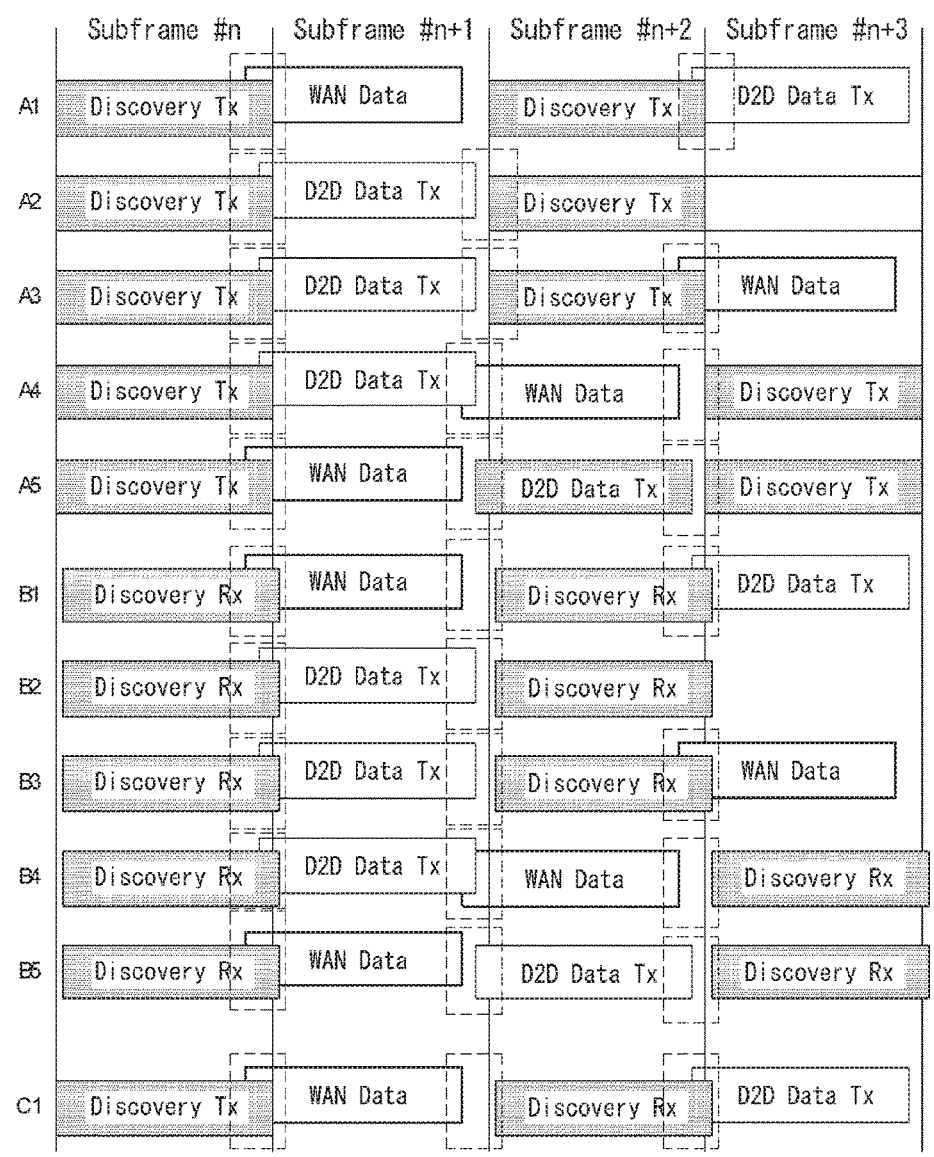

FIGS. 43 and 44 are views illustrating examples of a method for solving a conflict that occurs due to overlap between subframes, proposed in this disclosure.

FIG. 43 is a view illustrating an example of a method for resolving a conflict occurring due to overlap between subframes proposed in this disclosure.

That is, FIG. 43 illustrates a method for providing priority to WAN data transmission and reception.

Thus, in a case a D2D subframe and a WAN data subframe overlap, a method for solving a conflict by transmitting WAN data having high priority in a region (or symbol( ) where the overlap occurs is provided.

As illustrated in FIG. 43, it can be seen that, in an A1 case, subframe #n and subframe #2 are D2D discovery transmission resources, subframe #n+1 is a WAN data transmission/reception resource, and subframe #3 is a D2D data transmission resource.

Here, when priority is given to the WAN data transmission and reception (uplink transmission and downlink reception), a final predetermined number of symbols (symbols overlapping the subframe #n+1) of the D2D discovery transmission resource in subframe #n are discontinuously transmitted (DTX-ed).

The final predetermined number of symbols may be one or more symbols.

That is, the final predetermined number of symbols may be the number of overlapping symbols or the smallest number of symbols among values greater than the number of overlapping symbols.

Also, DTX-ed refers to that a signal is not transmitted in DTX-ed symbols, and an example of a method for implementing the DTX may be puncturing or rate matching.

When a WAN data transmission/reception subframe does not exist and only D2D transmission/reception subframes exist in a frame structure, that is, in a case in which a frame structure includes only D2D discovery subframe and a D2D data (communication) subframe, a preceding subframe has priority.

That is, as illustrated in A2 case and B2 case of FIG. 43, since D2D discovery transmission subframe (A2 case) and D2D discovery reception frame (B2 case) of subframe #n precede a D2D data transmission subframe of subframe #n+2, discovery TX and discovery RX are normally transmitted and received over the subframe interval, and a portion of a front symbol of a subsequent frame, that is, a D2D data Tx subframe, is DTX-ed.

FIG. 44 illustrates another example of a method for solving a conflict occurring due to overlap between subframes proposed in this disclosure.

FIG. 44 illustrates a method for giving priority to a preceding subframe in a case in which a frame includes a D2D discovery transmission/reception subframe, a D2D data transmission/reception subframe, a WAN (cellular) data transmission/reception (including PUCCH) subframe, and the like.

That is, by giving priority to a preceding subframe, transmission of a subframe having high priority in the overlap region of the subframe is guaranteed, thus solving a conflict that may occur due to the overlap between subframes.

In the A1 case of FIG. 44, the D2D discovery Tx of subframe #n is a subframe preceding the WAN data of the subframe #n+1 and having higher priority, and thus, discovery Tx is performed up to the boundary of the subframe #n, and thereafter, the WAN in data is transmitted or received.

Similarly, D2D discovery Tx of the subframe #n+2 precedes D2D data Tx of a subframe #n+3 and having higher priority, discovery Tx is performed up to the boundary of the subframe #n+2, and thereafter, D2D data is transmitted.

A1 case to C1 case of FIGS. 43 and 44 are merely examples, and methods for solving a conflict occurring due to an overlap between subframes may be varied according to rules and conditions described additionally hereinafter.

Figure 45:
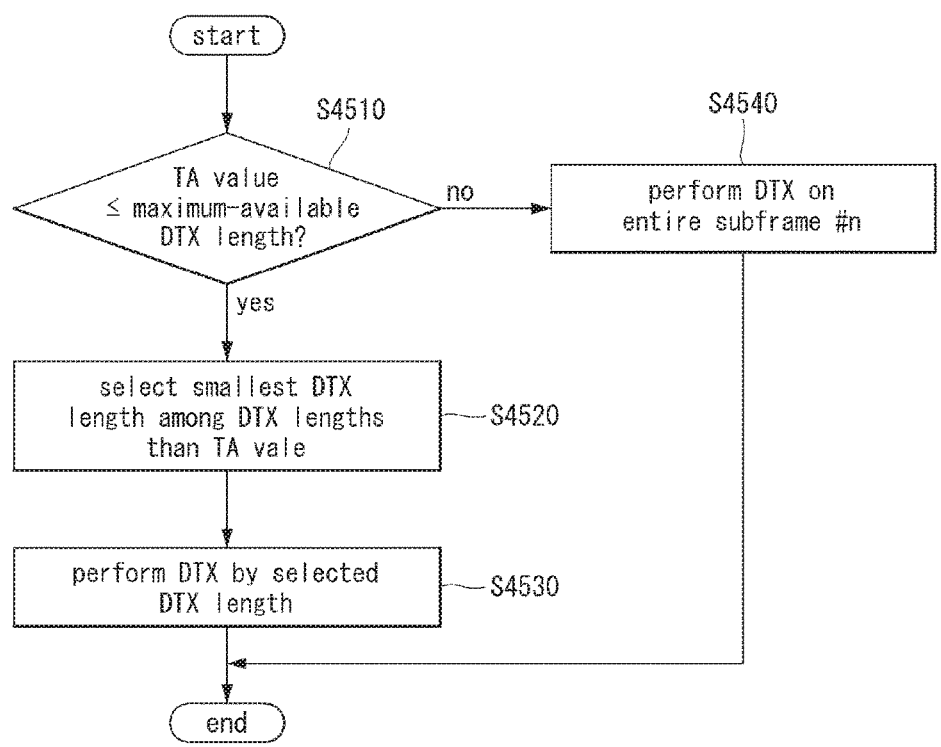
FIGS. 45 and 46 are views illustrating examples of a method for solving a collision that may occur due to overlap between subframes, proposed in this disclosure.
Figure 46:
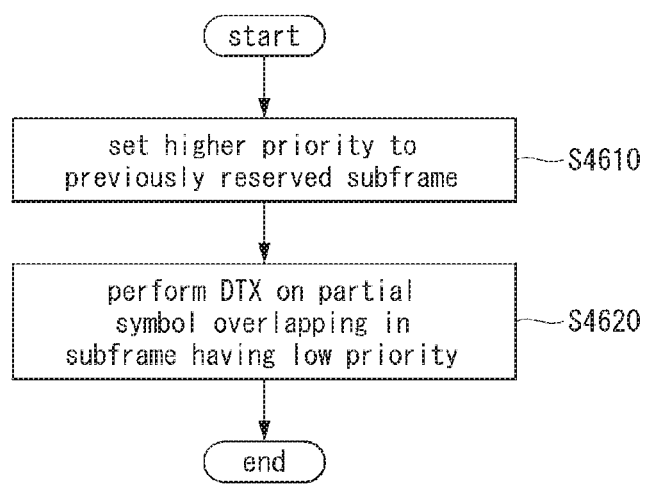

FIGS. 45 and 46 are views illustrating examples of a method for solving a conflict that may occur due to overlap between subframes, proposed in this disclosure.

FIG. 45 is a flow chart illustrating another example of a method for solving a conflict that may occur due to overlap between subframes proposed in this disclosure.

That is, FIG. 45 illustrates a method for solving a conflict that may occur due to overlap between subframes by comparing TA values and DTX length values.

The method of FIG. 45 will be described in detail with reference to the A1 case of FIG. 43.

That is, in the A1 case of FIG. 43, it can be seen that resource of D2D discovery Tx is allocated to subframe #n and resource of WAN data Tx is allocated to subframe #n+1.

FIG. 45 illustrates a method of DTX-ing some symbols or the entire subframe in the subframe #n of the D2D discovery Tx when transmission of WAN data has priority over D2D discovery Tx.

In detail, a UE determines whether a TA (timing advance) value of a UL subframe for WAN data Tx exceeds a maximum-available DTX length in the subframe #n or not (S4510).

When the TA value does not exceed the maximum-available DTX length according to the determination result, the terminal compares DTX lengths having predefined sizes (e.g. 0, ½, 1 symbol-length DTX) with the TA value, and selects the smallest DTX length among DTX lengths greater than the TA value (S4520).

The terminal performs DTX by the selected DTX length in the overlap symbol of the subframe #n (S4530), thus preventing a conflict due to the overlap between subframes.

Meanwhile, when the TA value is greater than the maximum-available DTX length according to the determination result in step S4510 (e.g. TA>1 symbol length), the terminal abandons the D2D discovery Tx (or D2D discovery Rx) from the subframe #n.

That is, the terminal performs DTX in the entire interval of the subframe #n (S4540), thus preventing a conflict due to overlap between subframes.

FIG. 46 is a flow chart illustrating another example of a method for solving a conflict that may occur due to a conflict between subframes proposed in this disclosure.

Specifically, FIG. 46 illustrates a method for giving priority to a subframe reserved for transmitting and receiving specific information in advance.

That is, by DTX-ing a symbol of a subframe having low priority is DTX-ed in a region (or symbol) of an overlapping subframe, a conflict that may occur due to overlap between subframes may be solved.

The method of FIG. 46 will be described in detail with reference to the A1 case of FIG. 43.

Here, it is assumed that a subframe for D2D transmission is reserved in advance and D2D terminals know about that.

That is, in the A1 case of FIG. 43, when the subframe #n and an array of subframes are reserved and allocated in advance as subframes (for D2D discovery Tx or D2D discovery Rx) for (subframe set) D2D discovery transmission/reception and D2D terminals know about that in advance, the subframe #n+1 (WAN data) which has not been reserved and allocated in advance may be DTX-ed, thus preventing a conflict due to overlap between subframes.

Here, a rule that a portion of front symbols of the WAN data transmission/reception, rather than the subframe of D2D discovery Tx, will be punctured or rate-matched may be determined in advance.

That is, in the method of FIG. 46, when specific subframes are reserved as D2D discovery resource in advance, priority is given to the reserved resource (A1 case of FIG. 43) (S4610), and thus, a portion of front symbols of the subframe #n+1 of the WAN data (since it is scheduled to be allocated to a subframe after the reserved subframe) having low priority is DTX-ed in order to protect the D2D discovery resource having high priority (S4620).

Here, the number of DTX-ed symbols may be determined using the method of FIG. 45 described above.

Hereinafter, various methods for solving a conflict when subframes overlap will be further described.

First, when the WAN data of FIG. 43 is related to a VoIP service operated on the basis of previously reserved and allocated resource in a semi-persistent scheduling (SPS) scheme, the WAN data may be defined to have priority higher than that of the D2D discovery Rx resource.

In this case, priority rule and resource reservation allocation information should be known in advance through an indication, or the like, between D2D terminals.

The indication may be transmitted to the D2D terminals through an SIB, a common RRC signal, a dedicated RRC signal, and the like.

In another embodiment, a method for solving a conflict that may occur due to overlap between subframes by determining priority of resource, that is, subframes, according to attributes of the subframes will be described.

When the method of giving priority to the previously reserved and allocated subframe extends, importance of a specific frame differs according to for which purpose and how the specific subframe has been reserved and allocated, and thus, a method for determining priority according to attributes of a subframe may also be used.

In general, a subframe schedule with WAN data may have the highest priority.

However, even a subframe related to D2D transmission/reception is a subframe for which resource allocation is reserved fixedly (or semi-static reserved), it may be defined to have higher priority than the subframe scheduled with the WAN data.

In detail, in a case in which resource is allocated in the form of a semi-static resource pool or in a case in which an individual resource is allocated in the form of SPS among D2D resource allocation schemes, the D2D subframe may have priority higher than that of the WAN data subframe.

In this case, since the base station already knows information related to the resource allocation of the D2D and WAN data, even though a portion (overlap region) of the WAN data subframe is punctured in an overlap region of the D2D subframe and the WAN data subframe, the terminal may properly receive data transmitted in the subframe of the WAN data.

The reason is because the terminal may be informed by the base station about the fact that the portion (overlap region) of the WAN data subframe has been punctured.

However, when a partial symbol of the subframe related to D2D (discovery or data) transmission/reception is punctured due to overlap between subframes, the following problem may arise.

That is, since the D2D reception terminal not associated with the base station does not know about the fact that the WAN data has been scheduled in a specific subframe, the terminal cannot know about the fact that the overlap region of the D2D discovery or the D2D data subframe has been DTX-ed in a situation in which the WAN data subframe has priority.

In order to solve this problem, it may be preferred for the WAN data subframe to be DTX-ed, but when the WAN data transmission/reception needs to be protected, DTX should be inevitably performed on the overlap region of the D2D subframe.

Thus, the D2D terminals may be determined in advance such that the D2D terminals perform DTX all the time in the overlap region of the D2D subframes, regardless of whether the WAN data is scheduled in a follow subframe.

Or, the BS may predefine that scheduling of WAN data is not performed in a subframe immediately subsequent to a subframe reserved as D2D, and shares the scheduling information with D2D terminals through signaling to allow the D2D terminals to properly receive D2D discovery or D2D data through a corresponding subframe.

In addition, in a case in which a semi-static resource allocation scheme has higher priority than that of a dynamic allocation scheme in D2D resource allocation and an RRC signal or an SIB signal is used to change a resource allocation scheme, a D2D terminal, which receives the RRC signal or the SIB signal, should know that priority of subframes is changed at a point in time (subframe) in which resource allocation changed through a change in resource allocation scheme is valid.

That is, the base station releases allocation of semi-static resource to the terminal, and thereafter, when the base station starts to allocate dynamic resource, priority of subframes related to D2D transmission may be changed from a valid point in time (or moment) at which the allocation of the semi-static resource to the terminal is released Here, RRC signaling or an SIG signal transmitted to change a resource allocation scheme may be used as a reference of a point in time to which a change in priority of subframes is applied.

In another embodiment, in a case in which several reserved subframes with respect to D2D resource exist, a conflict phenomenon may occur due to overlap between subframes of reserved resources (for the reason of the same or different periods, or the like).

For example, priority of subframes of each mode may be differently set in resource allocation of D2D transmission mode 1 and mode 2.

That is, the resource allocation scheme of the D2D transmission mode 2 is a resource allocation method having priority higher than that of WAN data, while the D2D transmission mode 1 may be a resource allocation method in which D2D transmission/reception has priority lower than that of the WAN data.

Here, when a subframe of the D2D transmission mode 1 and a subframe of the D2D transmission mode 2 overlap, priority of the mode 2 is admitted and, since a resource allocation scheme having priority higher than that of the WAN data is first, a portion of the WAN data subframe is DTX-ed.

In another embodiment, priority may be given between resource allocations of D2D discovery and the D2D data.

It is possible to set priority in resource allocation between D2D discovery type 1, type 2A, 2B, and D2D communication mode 1, and mode 2.

Basically, it may be defined such that the D2D data resource has priority higher than the D2D discovery resource.

Also, in the aspect of the attributes of a subframe, it may be defined such that previously statically allocated resource (e.g., a semi-static resource configuration, or SPS) may be defined to have priority higher than randomly allocated resource (dynamic resource allocation by PDCCH or EPDCCH).

In case of the same static resource allocation method, D2D data may be defined to have priority higher than that of D2D discovery.

Also, in case of the same random resource allocation method, priority of the D2D data and priority of D2D discovery may be determined by designation of priority in advance.

As discussed above, by giving priority to the D2D data subframe, when subframes overlap, an overlap region of the D2D discovery subframe may be DTX-ed.

Conversely, by giving priority to a subframe of the D2D discovery over a subframe of the D2D data, an overlap region of the D2D data subframe may be DTX-ed when subframes overlap.

Here, in the case of the semi-static allocation, a common resource allocation method for a plurality of terminals like the discovery type 1 may also be included.

As discussed above, in a case in which higher priority is set to a specific subframe or specific resource and subframes overlap due to a TA of a UL subframe, or the like, a terminal performs DTX by a length of some symbols in which subframes having low priority overlap.

However, the DTX length may be variously set, requiring various formats according to the DTX length.

That is, the receiver (for example, terminal) may be informed about various formats according to the DTX lengths in advance or may perform blink decoding on each format to recognize the DTX lengths.

In another method, in order to reduce implementation complexity in the receiver, when subframes overlap, the receiver may drop a specific subframe including an overlap region by subframe to prevent a conflict.

Here, the dropped subframe may be a subframe having low priority or a subframe prearranged to be dropped in advance when subframes overlap.

Here, in order to minimize resource loss that may be made due to subframe dropping, blind decoding of various transmission formats described above is performed, and in order to support this, an appropriate format indicator may be transmitted to minimize resource loss.

For example, when it is assumed that the last symbol of a subframe is DTX-ed in a 0, 0.5, 1 symbol form, a CRC is obtained for symbols excluding the DTX region, and when masking is performed thereon, a masking pattern may be determined to indicate a DTX length.

That is, when masking patterns are 000000, 111111, and 0101010, the masking patterns are mapped to DTX length, respectively, in order to indicate the DTX lengths.

Here, since the CRC is not separately applied to the last symbol, special information may be additionally transmitted in the last symbol.

That is, a sequence type reference signal may be transmitted in the last symbol or a signal in such a form as a half-symbol SRS, or the like, may be transmitted.

In another embodiment, an operation in a subframe which is not previously reserved and allocated may be determined in relation to previously reserved and allocated resource (or subframe) such as D2D discovery, D2D data, or WAN data.

For example, in a case in which a subframe corresponding to a multiple of 10 is allocated as a subframe of D2D data, it may be defined such that WAN data is not used in a subframe immediately subsequent to the subframe corresponding to the multiple of 10.

In another method, a subframe immediately subsequent to subframes allocated as WAN SPS data subframes may be defined not to be used for D2D data.

This methods are to guarantee transmission of WAN data or D2D data in a previously reserved and allocated subframe.

In another method, a subframe immediately subsequent to a specific subframe may be defined to be used freely.

That is, in a case in which a D2D discovery signal is previously reserved and allocated, a subframe subsequent to the reserved and allocated subframe may be freely used without a special restriction, and the D2D discovery signal may be DTX-ed or dropped in a symbol in which overlap between subframes occurs.

This case is to protect transmission in resource having low priority transmitted in a previously reserved resource, even though transmission having higher priority occurs later.

Thus, when inefficiency occurs with respect to resource use, in order to solve this problem, a method of preventing scheduling of transmission having high priority in a subsequent subframe may be used.

Hereinafter, various embodiments of methods for solving a collision that may occur due to simultaneous transmission of signals between D2D transmissions or between a D2D transmission and a WAN transmission proposed in this disclosure will be described in detail with reference to related drawings.

Basically, in a case in which overlapping occurs due to simultaneous signal transmissions, puncturing or rate matching may be performed on a section in which signals are simultaneously transmitted, that is, a section in which overlapping occurs, or an (ending) gap may be set in the section in which overlapping occurs.

A collision or overlapping used hereinafter may refer to a collision or overlapping between signals due to simultaneous transmissions of the two signals or may refer to overlapping or a collision between subframes (SFs) in which respective signals are transmitted.

Also, a collision/overlapping between signals may be interpreted as having the same meaning as a collision/overlapping of transmissions or a collision/overlapping between SFs.

Also, puncturing an overlap section may be interpreted as having the same meaning as performing rate matching on an overlap section or setting an (ending) gap defined not to transmit a signal in the overlap section.

Also, a WAN (signal) transmission used hereinafter may refer to transmitting/receiving UE-to-eNB control information or data, and a D2D transmission may refer to transmitting/receiving inter-D2D terminal control information or data.

Figure 47:
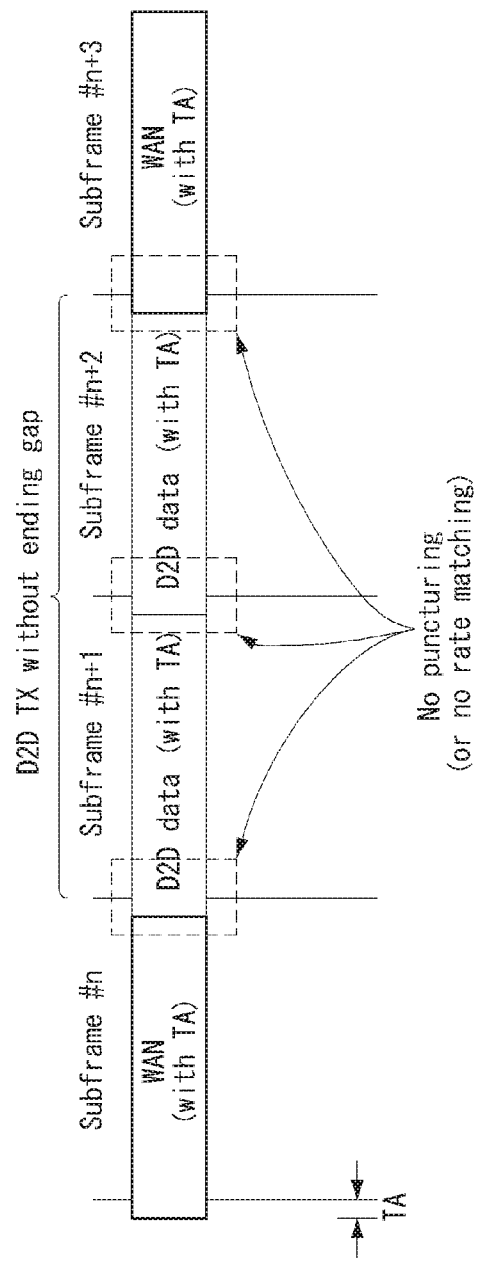
FIGS. 47 to 50 are views illustrating examples of a D2D transmission method proposed in this disclosure.

FIG. 47 is a view illustrating an example of a D2D transmission method proposed in this disclosure.

As illustrated in FIG. 47, it can be seen that WAN data and D2D data are transmitted and received in a time division multiplexing 9TDM0 manner.

That is, the WAN data is transmitted in a specific subframe (SF), and the D2D data is transmitted in another specific SF.

Hereinafter, for the purposes of description, the SF in which the WAN data is transmitted and received will be referred to as a "WAN SF", and the SF in which the D2D data is transmitted and received will be referred to as a "D2D SF".

In the WAN SF, cellular uplink channels such as a PUSCH, a PUCCH, an SRS, a PRACH, and the like, may be transmitted.

In FIG. 47, it is illustrated that the WAN data and/or the D2D data are distinguished in units of subframes and transmitted in the TDM manner, but this is merely an example and the WAN data and/or the D2D data may be distinguished in units of nay other units such as a slot unit, a frame unit, and the like, so as to be transmitted and received.

As discussed above, the D2D transmission is performed through a UL SF.

Also, the D2D terminal may receive a timing advance (TA) value or D2D transmission time information performing the same function as that of the TA value from a BS and transmit D2D data. The D2D transmission time information may be expressed as a D2D UL TA.

Alternatively, the D2D terminal may apply a TA value by itself and transmit D2D data to another D2D terminal In FIG. 47, it is illustrated that the TA is applied to all the four SFs, i.e., subframe #n, subframe #n+1, subframe #n+2, and subframe #n+3.

Also, it is assumed that the TA values applied to the four SFs are the same.

As illustrated in FIG. 4, the same TA value is applied to the D2D SFs (subframe #n+1 and subframe #n+2), and thus, an overlap section or a collision section does not occur between the SFs.

Thus, in FIG. 47, since signals do not collide nor overlap each other, there is no need to perform puncturing or rate matching on a specific portion of the SFs.

Here, an overlap section between SFs or a collision section in which signals collide with each other may be defined as an ending gap.

The ending gap refers to a section in which puncturing, DTX, rate matching, or the like, is performed in order to prevent signal collision.

In FIG. 47, SF #n+1 and SF #n+2 represent a D2D TX without an ending gap.

The D2D TX without ending gap refers to D2D transmission which has consecutive D2D TX SFs and does not have an ending gap in a final portion of each of the SFs.

Hereinafter, definition and related operations of the ending gap will be described in more detail.

For the purposes of description, D2D transmission (TX) without an ending gap will be referred to as a "first D2D transmission" and a D2D TX without an ending gap will be referred to as a "second D2D transmission".

In the same sense, a D2D SF without an ending gap will be referred to as a "first D2D (TX) SF", and a D2D SF with an ending gap will be referred to as a "second D2D (TX) SF".

As discussed above, the first D2D TX may also be interpreted as a first D2D SF, and the second D2D TX may also be interpreted as a second D2D SF.

Definition of D2D Operation Related to Ending Gap (1) A final portion (e.g., a last symbol) of the second D2D SF, i.e., the D2D TX SF with an ending gap, is punctured (or rate-matched).

(2) A final portion (e.g., a last symbol) of the first D2D SF, i.e., the D2D TX SF with an ending gasp, is punctured (or rate-matched).

Hereinafter, a meaning of the second D2D TX, i.e., D2D TX with an ending gap, will be described.

(1) In a case in which there is a subframe that overlaps another SF (hereinafter, referred to as an "overlap SF") due to application of the TA, among a single or consecutive D2D SFs, SFs (or D2D TX) prior to the overlap SF are grouped to one group.

D2D TX in the SFs grouped to one group corresponds to a "first D2D TX", and the D2D TX in the overlap SF corresponds to a "second D2D TX".

In this case, puncturing is performed on a final D2D TX SF (overlap SF) among a single or consecutive D2D TX SFs. That is, a TX UE performs puncturing on the final portion (e.g., the last symbol) of the last TX SF and performs D2D TX by an RX UE.

The RX UE does not perform decoding on the punctured portion.

Here, the reason for puncturing the last SF of the consecutive SFs is to prevent a collision between SFs in advance because what kind of SF transmitting a signal will come directly after the last D2D TX SF is not known.

(2) In a case in which one or one or more D2D TX to which a TA is not applied exists in the middle of consecutive D2D TX, the D2D TX SF to which the TA is not applied is defined as a last TX SF of the second D2D TX (D2D TX with an ending gap).

Thus, a final portion of the TX SF to which the TA is not applied is punctured according to the D2D operation rule (1) as described above.

That is, the reason for puncturing the final portion of the D2D TX SF to which the TA is not applied is because SF overlapping may occur due to a subsequent SF in the final portion of the TX SF to which the TA is not applied.

(3) In case of configuring only D2D TX SFs to which the TA is applied, the D2D TX SFs may be defined as a first D2D TX SF (D2D TX without a gap).

Thus, the last TX SF of the SFs configured as only the TA-applied D2D TX is not punctured.

Definition of an ending gap and D2D operations related thereto will be described in detail with reference to FIGS. 47 to 50.

In FIG. 47, it can be seen that the D2D SFs, that is, SF #n+1 and SF #n+2, do not include an ending gap.

Thus, a D2D terminal transmits and receives D2D data without performing puncturing on the D2D SF (SF #n+1 and SF #n+2).

Figure 48:
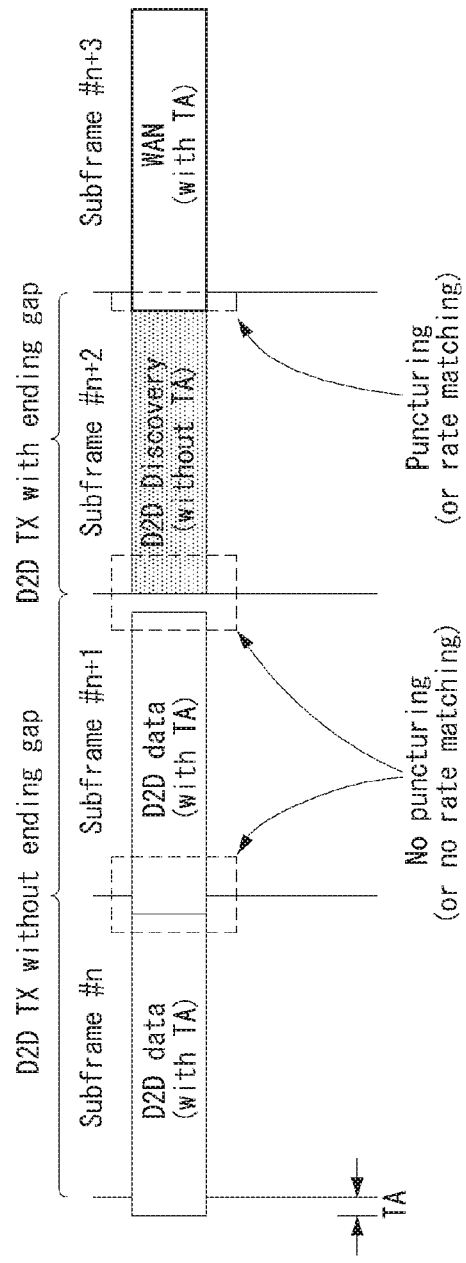

FIG. 48 illustrates another example of a D2D transmission method proposed in this disclosure.

Referring to FIG. 48, it can be seen that a D2D terminal performs D2D transmission by applying a TA to the SF #n+1 and the SF #n+2, and that the D2D terminal performs D2D transmission without applying a TA to the SF #n+2.

Here, overlapping or a collision occurs due to WAN transmission with a TA in a subsequent SF #n+3 in a final portion of the SF #n+2.

Thus, a final portion (ending gap) of the SF #n+2 without a TA is punctured.

Here, the SF #n and the SF #n+1 are D2D TX sections without an ending gasp, and the SF #n+2 is defined as a D2D TX section with an ending gap.

Figure 49:
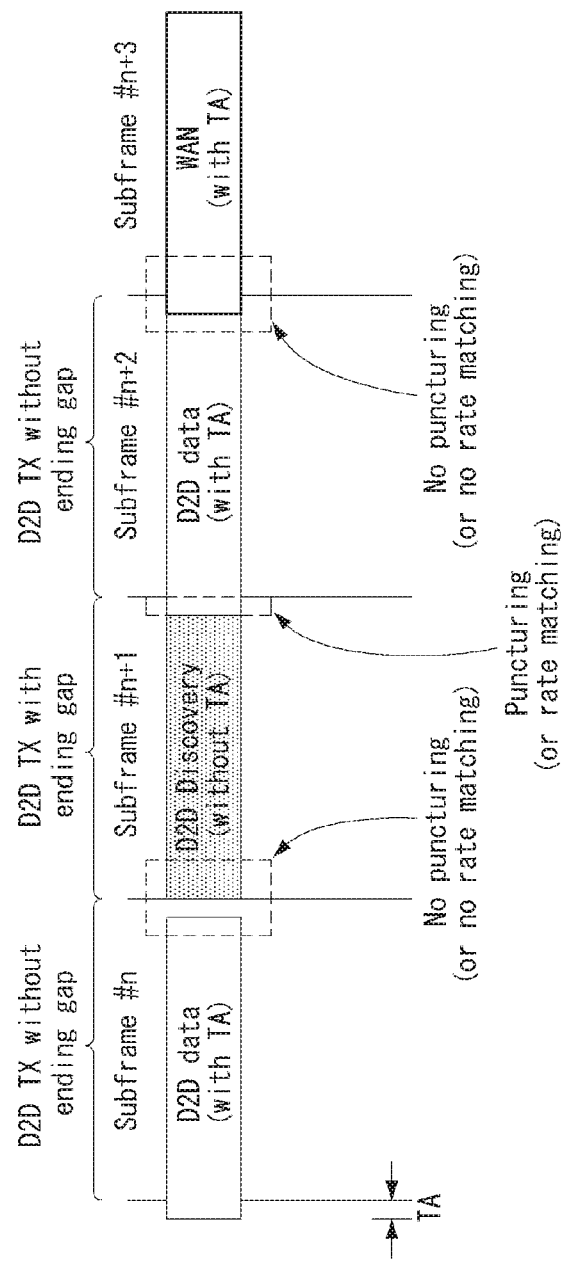

FIG. 49 is a view illustrating another example of a D2D transmission method proposed in this disclosure.

In FIG. 49, it is illustrated that the D2D terminal transmits consecutive D2D TX through consecutive D2D SFs but there is a D2D TX without a TA between the consecutive D2D TXs.

In this case, since the operation rule (or requirements) of the D2D TX without an ending gap as discussed above is not satisfied, puncturing is performed in the final portion of the SF without a TA, and thus, the consecutive D2D SFs are divided into three D2D TX SFs, i.e., three D2D TX sections.

Referring to FIG. 49, it can be seen that consecutive SFs of subframe #n, subframe #n+1, and subframe #n+2 are all D2D TX SFs but D2D TX without a TA is performed in the subframe #n+1.

That is, the subframe #n+1 corresponds to an SF of a D2D TX with a gap, and thus, a final portion of the SF #n+1 is punctured according to the D2D operation rule (2) related to an ending gap discussed above.

Also, since the D2D TX with a TA occurs in the subframe #n and SF #n+2, puncturing is not applied to the final portion of each of the SFs (e.g., a last symbol) according to the D2D operation rule (1) related to an ending gap discussed above.

That is, the reason for not applying puncturing to the subframes #n and #n+2 is because signal overlapping does not occur in each of the SFs.

Performing puncturing on a section in which signals overlap (or a section in which SFs overlap) may refer to performing puncturing or rate matching on N (N=1, 2, . . . ,) number of last symbols in which TX without a TA occurs or on N number of samples (which refer to samples according to OFDM or SC-FDMA sampling rate), or setting an (ending) gap.

Figure 50:
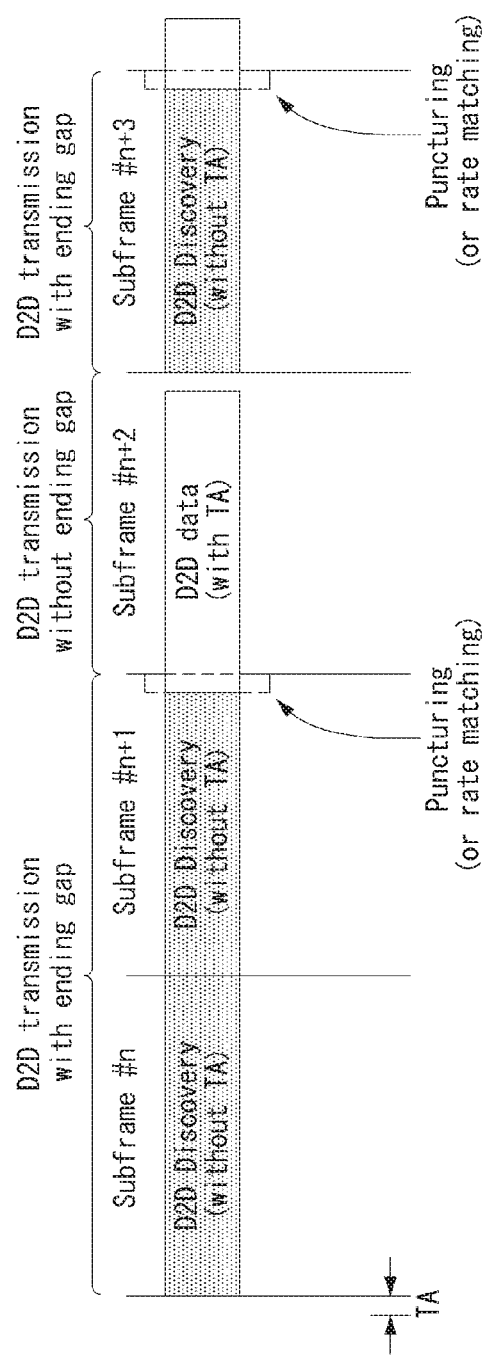

FIG. 50 is a view illustrating another example of a D2D transmission method proposed in this disclosure.

Specifically, FIG. 50 illustrates an operation method related to performing puncturing in a case in which a D2D terminal continuously performs D2D transmission without applying a TA to consecutive D2D SFs.

That is, in a case in which D2D transmission without a TA is continuously performed, the rule of "D2D TX with an ending gap" discussed above is applied in order not to perform puncturing between the continuous D2D transmissions.

As illustrated in FIG. 50, it can be seen that, in a case in which continuous D2D transmissions are performed through consecutive D2D SFs, puncturing is not performed in SFs, excluding a last D2D SF, among the consecutive D2D SFs, but performed only in the last D2D SF.

Both the subframe #n and subframe #n+1 are consecutive D2D SFs without a TA, and the subframe #n+2 is an SF with a TA.

Thus, overlapping occurs in a final portion of the subframe #n+1, and puncturing is performed in the overlap section. That is, signal is not transmitted in the overlap section.

As illustrated in FIG. 50, a D2D discovery transmission is made at a DL reception time point, and thus, a TA is not applied.

In FIG. 50, an example in which a TA is not applied to an SF in which D2D discovery is transmitted and a TA is applied to an SF in which D2D data is transmitted is illustrated, but conversely, it is also possible to apply a TA to the SF in which the D2D discovery is transmitted and a TA is not applied to the SF in which the D2D data is transmitted.

Alternatively, a TA may be applied to both the D2D discovery and the D2D data, or may be applied to none of them.

Here, the TA may be the same as a TA applied to a cellular uplink transmission or may be a TA having a meaning different thereto.

When the TA used in the D2D transmission has a meaning different from that of the TA used in the cellular uplink transmission, the TA may be set to have a value smaller or larger than the TA value applied to the cellular uplink transmission.

Alternatively, among several previously designated TA values, a TA value having the smallest or largest difference from the TA applied to the cellular uplink transmission may be set as the TA.

Here, the TA value newly defined for a D2D transmission may be explicitly transmitted from a BS to a D2D terminal through signaling, or the D2D terminal itself may implicitly determine the TA value through calculation or a method of selectively using a TA value.

In FIGS. 47 to 50, whether to perform puncturing in a specific section (final portion of an SF) is determined on the basis of whether a TA is applied in signal transmission or an SF, but in order to implement it in a simpler manner, two modes may be newly defined and whether to perform puncturing may be determined accordingly.

That is, several D2D transmissions corresponding to each mode may be included, and when a D2D transmission is finished in a specific mode, puncturing may be applied to a last transmission.

Here, each mode may correspond to a first D2D transmission mode and a second D2D transmission mode discussed above.

Taking priority among SFs or signals used in this disclosure may be interpreted such that a final portion of a transmission SF of a signal having priority is not punctured.

Also, a D2D transmission subframe indicates a D2D subframe in which D2D transmission occurs, and a subframe boundary may not be the same between D2D SFs due to a TA, TX, or RX.

Also, the D2D transmission subframe may be an SF in which D2D transmission does not occur or may be an SF merely reserved to be allocated for D2D transmission.

Alternatively, the D2D transmission subframe may mean a transmission opportunity like a resource pool.

Hereinafter, various situations in which overlapping may occur when a signal is transmitted/received in an SF, a method for solving a problem by a transmission terminal (TX UE) such that overlapping may not occur when a signal is transmitted/received, and a method for enabling a reception terminal (RX UE) to recognize such an overlapping occurrence situation in advance will be described in detail.

A D2D transmission terminal (D2D TX UE) transmits D2D data and a D2D signal through one or one or more subframes (SFs). The D2D signal may refer to a signal including control information.

Here, the D2D data and the D2D signal may be continuously transmitted through one or one or more SFs.

The D2D terminal may differentiate between (1) a case in which the D2D terminal performs D2D transmission with the same value as an uplink timing advance (TA) value within a cell; and (2) a case in which the D2D terminal performs D2D transmission with a value different from a UL TA value within a cell.

The intra-cell UL TA refers to a TA value corresponding to a cellular UL transmission.

The D2D transmission may refer to transmission of D2D data and/or a D2D signal by the D2D terminal.

In a case in which the D2D terminal performs D2D transmission with the same TA value as that of a UL TA value used in WAN (eNB-UE) communication, an influence of direct interference on an existing legacy WAN UE is reduced.

Here, the UL TA used in WAN communication may be expressed as a first TA and a TA used in D2D communication may be expressed as a second TA, or vice versa.

However, when the D2D terminal performs D2D transmission using a TA value different from the UL TA value of WAN communication, interference on an existing WAN UE may be great.

In this case, interference generated due to a difference in the TA value may severely affect a signal transmission in consecutive SFs, as well as in the same subframe.

For example, in a case in which a terminal transmits a signal without applying (or using) a TA in the SF #n and transmits a signal by applying a TA in the SF #n+1, the signals transmitted through the two SFs may overlap due to simultaneous transmission in a specific section of the SFs.

In this case, any one of the two signals may not be transmitted in the specific section.

If WAN transmission and D2D transmission overlap in a specific section of an SF, priority is given to the WAN signal transmission.

In this case, the D2D terminal may puncture an overlap section of the D2D SF (transmission of the D2D signal is punctured in an overlap section of the D2D SF) or drops the D2D signal in the D2D SF in which overlapping occurs.

Here, puncturing or dropping may be interpreted as having a meaning that a signal is not transmitted.

Also, since the collision between SFs may also occur between D2D signals (discovery signal, communication signal, or synchronization signal), a method for preventing the collision is required.

In particular, it is important to enable the D2D RX UE to know in advance as to how the D2D TX UE performs D2D transmission. The reason is to allow the D2D RX UE to accurately receive a signal transmitted from the D2D TX UE.

For example, in a case in which the TX UE punctures a last symbol of a transmission signal and transmits the same to the RX UE, the TX UE informs the RX UE that the last symbol has been punctured, through signaling.

When the RX UE knows that the last symbol has been punctured, the RX UE may discard a signal corresponding to the punctured portion (last symbol) and perform demodulation and decoding only on the other remaining portion, without performing an unnecessary decoding operation.

In D2D transmission to be used hereinafter, it is assumed that a plurality of D2D signals (data and/or signal) are transmitted in consecutive D2D SFs.

In the case of the continuous D2D transmissions through consecutive D2D SFs, since D2D transmission having the same or similar attribute is made through consecutive subframes, it may be unnecessary to set an (ending) gap in the last SF of the consecutive D2D SFs.

Hereinafter, a definition of continuous D2D transmissions and conditions for satisfying the definition will be described, and various methods for setting a gap in continuous D2D transmissions under the conditions will also be described.

First, first to fifth conditions or a general rule for defining continuous D2D transmissions will be described.

1. D2D Transmissions Having the Same TA Value are Regarded as Continuous D2D Transmissions For example, an SF to which communication mode 2 is applied and an SF to which type 1 discovery is applied are defined as consecutive D2D SFs or continuous D2D transmissions.

Here, a condition regarding a synchronization reference of D2D transmission may be added to determine whether it is continuous D2D transmissions.

The synchronization reference is a synchronization signal transmitted by a specific cell and may mean a primary synchronization signal (PSS)/secondary synchronization signal (SSS)/common reference signal (CRS).

That is, in a case in which the synchronization reference is added to determine whether it is continuous D2D transmissions, when D2D transmissions have the same TA value and (2) synchronization references of the respective D2D transmissions are the same, the D2D transmission may be defined as continuous D2D transmissions, that is, transmitted through consecutive D2D SFs.

For example, in a case in which subframe #n belongs to a mode 2 communication resource pool of cell 1 and subframe #n+1 belongs to a type 1 discovery resource pool of the same cell 1, the two subframes (subframe #n and subframe #n+1) have the same TA and the same synchronization reference (cell 1), and thus, they may be defined as continuous D2D transmissions.

Thus, as discussed above, a gap is not set in the final portion of the subframe #n. The reason is because signal overlapping does not occur between the two SFs (SF #1 and SF #2).

Meanwhile, in a case in which the subframe #n belongs to the mode 2 communication pool of the cell 1 and the subframe #n+1 belongs to a mode 2 communication resource pool of a cell 2, even though the two subframes have the same TA, since synchronization references in the SFs are different, the two SFs are not defined as continuous D2D transmissions or consecutive D2D SFs.

The reason is because, in a case in which synchronization references of two SFs are different, when a D2D transmission terminal transmits a D2D signal in the subframe #n, a possibility in which the D2D transmission terminal transmits a WAN signal instead of a D2D signal in the subframe #n+1 is higher.

Thus, the two subframes are not regarded as continuous D2D transmissions, and thus, a gap is set in the final portion of the subframe #n.

Here, a BS may transmit a cell ID as a synchronization reference of the D2D transmission in each resource pool (or each SF) to the D2D UE.

The cell ID may be transmitted to the D2D UE through broadcast signaling of a serving cell of each UE.

The D2D terminal may determine whether it is continuous D2D transmissions by comparing synchronization references of the respective resource pools.

Characteristically, in a case in which several adjacent cells are in synchronization, a plurality of cells may become a synchronization reference with respect to one resource pool.

That is, whether an aggregation of cells as a synchronization reference is the same may be used as a reference for determining whether it is continuous D2D transmissions.

Meanwhile, in order to perform D2D communication between cells or perform D2D communication with a UE outside of coverage, a UE may transmit a D2D synchronization signal (D2DSS) to another UE.

In this case, the D2DSS may be used as a synchronization reference for determining whether it is continuous D2D transmissions.

That is, only for a reference pool in which the D2DSS transmitted in the same resource is used as a synchronization reference may be regarded as continuous D2D transmissions or consecutive D2D SFs.

Or, in a case in which a D2DSS transmitted in different resources in each resource pool is determined as a synchronization reference, when a sequence of the transmitted D2DSS is the same, it may be determined as the same synchronization reference and a resource pool in which each D2DSS is transmitted may be regarded (or defined) as continuous D2D transmissions.

In another embodiment of 1, when the TA value is the same, it may be broadly interpreted that the TA is not accurately identical but within a specific error range (TA<T_limit [us]).

In another embodiment of 1, a method for regarding D2D transmissions having the same TA value as continuous D2D transmissions may be separately applied to D2D communication transmission and D2D discovery transmission.

That is, in a case in which TA values of D2D communication transmissions are the same, the D2D communication transmissions may be defined as continuous D2D communication transmissions, and in a case in which TA values of D2D discovery transmissions are the same, the D2D discovery transmissions may be defined as continuous D2D discovery transmissions.

In a case in which continuous D2D transmissions are determined through the first to fifth conditions discussed above, the last SF among consecutive D2D SFs includes an ending gap.

2. Same Applications are Regarded as Continuous D2D Transmissions (1) Method 1: Two D2D transmissions to which mode 2 communication with different RX UEs is applied are regarded as continuous D2D transmissions.

(2) Method 2: Two D2D transmissions to which mode 1 communication with different RX UEs is applied are regarded as discontinuous D2D transmissions.

(3) Method 3: D2D transmissions with respect to the same application without classification of communication mode are all regarded as continuous D2D transmissions (4) Method 4: D2D transmissions with respect to the same application without classification of communication mode are all regarded as discontinuous D2D transmissions The method 1 to method 4 may be used alone or may be combined to be used.

3. Transmissions of D2D Data Scheduled Through One SA are Regarded as Continuous D2D Transmissions in D2D Communication.

In the method 3, D2D data scheduled through the same SA is regarded as continuous (or one) D2D transmissions.

Thus, the continuous D2D transmissions do not include a gap in the middle thereof.

Here, whether to include a gap in the last SF of the continuous D2D transmissions may be determined according to a TA value.

If the TA value in the last SF (or last D2D transmission) is greater than 0 (TA>0), the last SF does not include a gap.

However, when the TA value is 0 (TA=0) or smaller than a specific value in the last SF, the last SF includes a gap in a final portion thereof.

Here, the case in which TA is 0 or smaller than a specific value refers to a case in which there is a possibility of overlapping with a subsequent SF.

It should be set such that the TX UE and the RX UE knows such a matter in advance.

Thus, D2D data scheduled through different SAs may be regarded as different D2D transmissions.

In this case, each SF in which each D2D transmission is made includes a gap in a final portion (or a symbol).

4. Transmissions of the Same MAC PDU are Regarded as Continuous D2D Transmissions The method 4 may be defined to be used only in discovery.

(1) Method 1: Applied to only discovery MAC PDU
(2) Method 2: Applied to only communication MAC PDU
(3) Method 3: Applied to both discovery MAC PDU and communication MAC PDU 5. Performing of Subframe Bundling is Regarded as Continuous D2D Transmissions Here, subframe bundling transmission refers to performing D2D transmission by bundling one or more SFs between D2D terminals, and refers to a method of bundling a designated number of SFs (i.e., two, four, or eight SFs) to perform D2D transmission.

(1) Method 1: TX UE Performs Puncturing Only in a Last SF of Bundled SFs.

The RX UE may receive SF bundling related information through RRC signaling, or the like, in advance.

For example, the RX UE may receive the fact that a final portion of the designated bundled SFs (the last SF of the bundled SFs) has been punctured.

Here, the SF bundling-related information may be the number of bundled SFs, SF information including puncturing among the bundled SFs, and the like.

As discussed above, the TX UE and the RX UE should recognize an SF bundling situation in advance through RRC signaling, or the like.

Here, WAN transmission may be included in the middle of single SF bundling.

In this case, when a size of the SF bundle (or SF bundling) is small, the TX UE may recognize it and operate to transmit the entire bundle only when there is no WAN transmission in all of the bundled SFs.

For example, since the TX UE can recognize whether WAN transmission is performed in the SF #n+4 through WAN scheduling in SF #n, the TX UE may perform D2D transmission through SF #n+3 and SF #n+4, that is, through two bundled SFs.

However, when a size of the SF bundling is large, it may be difficult for the TX UE to transmit the entire SF bundle.

In this case, the TX UE may perform D2D transmission by including a gap in the middle of the SF bundle.

For example, in a case in which the TX UE performs D2D transmission using four bundled SFs of SF #n, SF #n+1, SF #n+2, and SF #n+3, the TX UE may check WAN scheduling up to SF #n−3, and when there is no WAN scheduling up to SF #n−3, the TX UE performs D2D transmission through two bundled SFs (SF #n and SF #n+1).

Here, when WAN scheduling occurs in the SF #n−2, a gap for preventing a collision between SFs is set in the SF #n+1.

The method 1, that is, the method for setting a gap in the middle of SF bundling, may also be applied to method 3 as described hereinafter in the same manner.

(2) Method 2: The TX UE performs puncturing in each SF of the bundled SFs.

Similarly, the TX UE should inform the RX UE about a puncturing rule in the bundled SFs through a pre-signal such as RRC signaling, or the like.

(3) Method 3: It Corresponds to a Puncturing Method when WAN Scheduling is Performed in the Middle of Bundled SFs.

That is, the method 3 refers to a method of performing WAN scheduling on only an SF in which WAN scheduling is to be performed and performing D2D transmission through SF bundling in other SFs.

In this case, overlapping may occur between signal transmissions or between SFs due to a difference between a TA of a WAN SF and a TA of a preceding D2D SF.

In order to avoid overlapping of signals or SFs that may occur due to a difference in TA, a D2D SF immediately before a WAN scheduling SF includes a gap in a final portion or a corresponding symbol is punctured.

Here, in order to prevent an unnecessary operation that the RX UE should decode all the signals to know whether puncturing has been performed, it is defined that TX transmission and puncturing-related information is transmitted to the RX UE to allow the RX UE to know the aforementioned puncturing rule in advance.

The TX transmission and puncturing-related information may be provided by the eNB to the RX UE or the TX UE may directly provide the information to the RX UE.

In another embodiment of the method 3, when WAN scheduling is performed, a method of dropping D2D transmission in all of bundled SFs of SF bundling may also be used.

Similarly, the TX UE or the BS may inform the RX UE about the rule in advance for the recognition of the RX UE.

The methods 1 to 3 discussed above may be used alone or may be combined to be used.

In applying the ending gap-related D2D operation rules 1 to 5, the additional condition that the continuous D2D transmissions are defined only when the synchronization reference discussed in rule 1 is the same may also be applied as an additional condition.

First, a case in which the condition that the synchronization reference should be the same is added to the rule 2 will be described.

That is, only when the same application has the same synchronization reference, it is defined as continuous D2D transmissions.

Here, the additional condition that the synchronization reference should be the same may also be applied as an auxiliary condition regarding rules to be described hereinafter.

In addition to the general rules (regulation 1 to rule 5 ) discussed above, cases not included in the specific example or the general rules will be described in detail.

Regulations 1 to 9 below may also be applied as specific rules or the general rules (1 to 4) together.

1. Repetition of D2D Data

It refers to a method of repeatedly transmitting D2D data by the TX UE.

It may be performed as the same operation as the SF bundling discussed above, but since characteristics thereof are different from the SF bundling, it will be defined as a D2D operation in a different form.

When a plurality of D2D data transmissions are performed by one D2D scheduling assignment (SA), it is defined as D2D data repetition.

In the corresponding method, a third rule of the D2D operation related to an ending gap may be applied.

In this case, it is assumed that a repetition pattern (a period, a resource position, and the like) are determined in advance.

In a D2D subframe anticipated to have a collision with a WAN signal, it may be defined that a TX UE does not transmit D2D data and a D2D RX UE previously recognizes aforementioned situation and does not attempt to receive D2D data. Here, the D2D RX UE may previously recognize the aforementioned situation upon receiving a signal, or the like, in advance.

When the corresponding method is used, the TX UE may operate as follows.

When the TX UE detects occurrence of a collision between WAN transmission and D2D transmission, the TX UE skips only transmission of collision data in the collision subframe and transmits subsequent D2D data according to a defined repetition pattern Here, skipping transmission of data in a collision (or overlap) SF refers to stop transmission of the D2D data only in the collision section of the collision SF.

In another embodiment, the TX UE may delay transmission of collision data and resume transmission in a next repetition transmission opportunity.

In another embodiment, the TX UE may not perform (or stop) D2D transmission according to the repetition pattern after the collision SF.

In another embodiment, even though a collision occurs only in one SF, the TX UE may cancel every D2D transmission corresponding to the repetition pattern and starts to perform transmission from the beginning.

In this case, the TX UE may perform D2D transmission according to a new repetition pattern or may perform D2D transmission according to the existing repetition pattern.

The D2D operations of the TX UE may be known to the RX UE through a pre-signal in advance.

In a case in which a repetition pattern for a D2D transmission is periodically generated, TX puncturing may be applied to all the repetition patterns in a lump.

Also, repetition of the D2D data may be continuously generated. That is, in case of continuous D2D data repetition, a gap is not included in the middle of the repetition transmission and an SF (a last SF) in which the final transmission of the repetition transmission occurs may include a gap or may not according to a predetermined condition.

The predetermined condition may be, for example, a size of a TA value, or the like.

For example, in a case in which repetition transmission regarding the D2D data is performed with a small TA or without a TA, if a D2D transmission having a greater TA value comes immediately after the D2D data repetition transmission, an SF (a last SF among the D2D data repetition transmission SFs) immediately before the D2D transmission SF having the greater TA value should include a gap.

Alternatively, it may be defined that when the TA value regarding the D2D data is equal to or smaller than a threshold value, a gap is used all the time.

Alternatively, in a case in which WAN transmission is scheduled and a TA value of D2D transmission is smaller than a TA value of the WAN transmission, an SF of the D2D transmission before the WAN transmission may include a gap.

However, in a case in which the WAN transmission is scheduled but a TA of the D2D transmission is the same as the TA of the WAN transmission or comes in an error range considered to be the same, the D2D SF does not include a gap.

2. Consecutive Discovery Subframes (with TA=0)

The method 2 is a method of performing D2D transmission in subframe #n and subframe #n+1 and performing D2D transmission by applying TA=0 in each SF.

A discovery signal is transmitted on the basis of a DL reception timing.

In this manner, the method 2 represents a method of continuously transmitting a discovery signal through consecutive subframes.

Overlapping does not occur between two SFs in which the discovery signal is transmitted.

However, since which type of transmission/reception comes after the subframe n+1 is not known, the TX UE may puncture a final section (e.g., 1 symbol) of a last SF of consecutive SFs to perform D2D transmission.

Similarly, the TX UE or the BS transmits the fact in advance to the RX UE through RRC signaling, or the like.

That is, the TX UE or the BS previously informs the RX UE about D2D transmission subframe information.

The D2D transmission SF information may be information regarding a substantial D2D transmission subframe or potential subframe information.

Or, the D2D transmission SF information may be a D2D transmission opportunity set by RRC, SIC, or the like, in advance.

Here, a discovery signal is described as an example, but the corresponding method may also be applied to any type of D2D transmission such as data mode 1, mode 2, and the like, as well as the discovery type 1 and type 2.

In this case, the RX UE may infer D2D transmission through resource pool information given by SIB or RRC signaling.

If the TX UE informs the RX UE in advance that the TX UE will puncture a last symbol of a last transmission subframe of the D2D transmission, the RX UE may accurately perform decoding for D2D data reception in consideration of a puncturing symbol.

In consecutive D2D transmission subframes, puncturing of the last symbol may be significant as discussed above.

However, since there may also be a D2D transmission which is not continuous so the RX UE cannot accurately recognize information of an inconsecutive transmission subframe, puncturing may be performed on every D2D transmission subframe.

In particular, in case of TA=0 in D2D transmission (or in a case in which a TA value is smaller than a predetermined threshold value), the D2D TX UE may perform D2D transmission by puncturing a last symbol in every subframe of the D2D transmission.

3. Consecutive Data Subframes (with TA>0)

In a case in which a D2D signal with a TA value greater than 0 (or greater than a predetermined threshold value) is generated in consecutive subframes, a TA value of the D2D transmission may be generally assumed to have the same value as a WAN UL TA value.

In the D2D transmission including such subframes, even though puncturing is not performed on a final portion (or last symbol) of a last subframe of transmission, a possibly that transmission collision or overlapping does not occur is high.

Of course, a case in which a signal with a TA value greater than the TA value of the D2D transmission is transmitted in a subsequent subframe of consecutive D2D SFs may be considered, but it may be assumed that such a situation does not occur.

However, a TA threshold value may be set in consideration of a situation in which a signal with a TA value greater than the TA value of the D2D signal is transmitted in the subsequent SF, and it may be defined that puncturing is not performed in the last transmission SF when the TA of the D2D transmission is greater than the threshold value and puncturing is performed in the last transmission SF only when the TA value of the D2D transmission is smaller than the threshold value.

A default value of the TA threshold value may be TA=0.

Alternatively, 30 us may be set to a default value of the TA value in consideration of an error of the TA value.

4. Consecutive Data Subframes (with TA=0 or TA>0)

In a case in which a D2D transmission (e.g., mode 2) with TA=0 and a D2D transmission (e.g., mode 1) with TA>0 are made in consecutive subframes, a collision may occur due to simultaneous transmissions of signals.

Here, the collision due to simultaneous transmissions of signals may be interpreted as having the same meaning as that of a collision between SFs, overlapping between SFs, and overlapping between signals.

For example, in a case in which a D2D transmission of mode 1 is TA>0 and a D2D transmission of mode 2 is TA=0, if mode 1 transmission is performed after mode 2 transmission, a signal collision or overlapping occurs in a final portion of an SF of the mode 2 transmission due to an application of the TA value of the mode 1 transmission.

In this case, the TX UE or the BS may transmit resource configuration information of the mode 1 to the RX UE in advance, and thus, the RX UE may recognize whether TX puncturing has been performed by utilizing the received resource configuration information.

For example, when the RX UE recognizes that mode 2 resource and mode 1 resource are configured in consecutive SFs through the resource configuration information, the RX UE may determine that a last symbol of the mode 2 resource is punctured all the time and perform a D2D reception operation.

Here, TA=0 is assumed in the mode 2 transmission, but in otherwise case, the operation of puncturing a last symbol of the mode 2 transmission SF may not be performed.

It may be more preferable for the mode 1 transmission to take priority over the mode 2 transmission for the following reasons.

eNB scheduled transmission shall always be prioritized over the random transmission within a pre-assigned pool (as UE has a chance not to execute the transmission after random selection due to a certain overriding condition), for which UE needs to know the scheduling of subframe n+1.

5. Continuous Transmission of Discovery Signal and Data

Hereinafter, (1) a case in which data is transmitted after discovery transmission and (2) a case in which a discovery signal is transmitted after data transmission will be separately described.

Here, it is assumed that TA>0 in data transmission.

(1) Discovery+Data Transmission (with TA>0)

A final portion of a discovery signal (with TA=0) is always punctured, regardless of type of a transmission signal that follows the discovery signal.

That is, in a case in which a final portion of an SF in which every possible discovery signal is generated on the basis of a discovery resource pool is TX-punctured in advance, the RX UE may perform reception operation using signaled resource configuration information.

(2) Discovery+Data Transmission (with TA=0) or Vice Versa

It may be defined that TX puncturing is also performed on a data subframe, as well as on a discovery SF.

That is, the RX UE recognizes that the last symbol is punctured regarding the discovery signal received in every possible discovery signal transmission opportunity on the basis of discovery or data resource configuration information in advance and performs decoding.

Meanwhile, in order to minimize a waste of resource, it may be defined to perform TX puncturing only in a final portion of an SF in which a final transmission of continuous transmissions is made, without distinguishing between discovery and data.

Or, discovery and data may be distinguished and it may be defined to perform TX puncturing only on a last symbol of an SF in which a final transmission of continuous transmissions is made, in continuous discovery signal transmissions or continuous data transmissions.

Here, the fact that data transmission is TA=0 or TA>0 may be transmitted to the RX UE through RRC signaling in advance.

6. Single MAC PDU or Different MAC PDU

In this method, in a case in which the same MAC PDU (including different RVs0 are transmitted through consecutive SFs, puncturing is performed only in a last subframe of the consecutive subframes.

This method is applied only to a transmission in which TA value is 0 (TA=0).

In a case in which different MAC PDUs are transmitted through consecutive SFs, puncturing is performed on a last symbol of an SF in which each MAC PDU is transmitted.

In this method, when a last symbol of a last subframe of the D2D transmission is inferred, a reference thereof is that only a redundancy version (RV) transmission generated from the same MAC PDU is included in a single D2D transmission.

If MAC PDUs are different, it may be assumed that transmission of the different MAC PDUs are not included in a single D2D transmission.

Or, conversely, even in the case of the different MAC PDUs, when it corresponds to continuous transmissions, it may be defined by a single D2D transmission.

In this case, whenever a MAC PDU is varied, TX puncturing may be performed or TX puncturing may be performed only in a final portion of continuous D2D transmissions.

Such situations may be determined in advance.

7. In Case of TA>1

In a case in which a TA value is greater than a length of 1 symbol (TA>1), when signals overlap, it may be preferred to drop a signal, which has been scheduled to be transmitted in a subframe in which overlapping occurs, in units of subframes, rather than performing TX puncturing on the overlap section.

Or, when signals overlap, the corresponding signals may be dropped to every subframe belonging to the D2D transmission.

In this case, the RX UE may be implemented to previously receive such rule and perform RX processing in advance.

The RX UE may infer a situation in which overlapping occurs through previously signaled resource configuration information or RA information included in an SA.

Here, the method of inferring occurrence of a collision between signal transmissions (or SFs) through an SA may also be applied to any other method proposed in this disclosure.

The method for transmitting the fact that the TA has a value greater than 1 (or a predefined threshold value) to the RX UE is a method for determining whether a TA of the TX UE has exceeded a preset threshold value on the basis of the TA of the TX UE when the TA of the TX UE is informed to the RX UE.

Here, the value "1" may refer to, for example 1 symbol.

That is, the TX UE may transmit the TA thereof to the RX UE, and thereafter, the RX U E may receive the TA of the TX UE and compare the TA value with a threshold value to recognize whether D2D transmission has been made by applying puncturing.

The aforementioned method may also be applied to any other method proposed in this disclosure similarly.

Also, the corresponding method may also be applied to a case in which TA<1, as well as to a case in which TA>1.

Hereinafter, additional rules to be applied when a collision occurs between signals in D2D transmission will be further described.

Among cases in which overlapping occurs between D2D signal transmissions, when overlapping occurs between a communication mode 1 transmission and a communication mode 2 transmission, priority is given to the mode 1 so a mode 2 signal may be punctured or a mode 2 signal transmission (SF to which the mode 2 signal is applied) may be dropped or skipped.

8. From TX UE0, Data (for RX UE1)+Data (for RX UE2): Consecutive Subframe

This is a method for solving a collision that may occur when data is transmitted through consecutive SFs to different RX UEs.

That is, a TX UE (e.g., UE0) performs D2D transmission on different RX UES (e.g., UE1 and UE2) through consecutive subframes, TX puncturing should be performed in each subframe.

The reason is because, the RX UE1 or the RX UE2 may receive only one of subframes and, since the RX UEs cannot know which signal is to be received thereafter, the TX UE0 performs TX puncturing in every SF to transmit a signal.

In this manner, in a case in which transmission subframes whose target UEs are different are consecutive, it is excluded from a definition of a single D2D transmission or continuous D2D transmissions, whereby the aforementioned rules may also be applied to the corresponding method.

The method of 8 may also be applied to a case of discovery signal transmission, rather than a data signal, in the same manner.

Hereinafter, solutions to occurrence of a collision between signals when carrier aggregation (CA) is supported will be described in detail.

In a case in which signals are transmitted and received using CA, the TX UE may transmit a discovery MAC PDU in SF #n and SF #n+1 of CC1, and transmit WAN data in SF #n+1.

In this case, when two CCs (CC1 and CC2) are in the same carrier band or in the same timing advance group (TAG), inter-carrier interference (CC1 and CC2) may occur, and thus, performing the aforementioned puncturing may need to be considered.

That is, in the case of a signal transmitted without a UL TA discussed above, the rule that TX puncturing should be performed in a final portion of an SF in which the signal is generated is applied to a situation in which different CCs are used, rather than a situation of the same CC, whereby a collision between signals in CA may be prevented.

In detail, in a situation in which CA is applied, when the TX UE performs D2D transmission through a carrier in the same band or in the same TAG performing puncturing in a final portion (a final portion of an SF without a TA) of subframe immediately before (or ahead of) transmission of the carrier may be included as an additional puncturing condition Here, the TX UE or the BS should transmit the TA information used by the TX UE to the RX UE.

The RX UE may receive the TA information of the TX UE from an eNB through RRC signaling or an SIB.

Or, the TX UE may directly transmit the TA information thereof or related information from which the RX UE may infer the TA value, to the RX UE.

In another example, the TX UE may include the TA information of the TX UE in an SA and transmit the same to the RX UE, or may transmit the TA information through new control information In another embodiment, the TX UE may inform the TA value of the TX UE regarding consecutive data in every D2D transmission or scheduled by a single SA to the RX UE.

In case of discovery transmission, since the TX UE does not transmit an SA to the RX UE, the RX UE may receive the TA value of the TX UE through RRC signaling or an SIB signal used in resource configuration in advance.

In another embodiment, it may be assumed that TX puncturing is performed in a final portion of each MAC PDU in one or more MAC PDU transmissions.

Here, in a case in which a length of a MAC PDU is fixed, the MAC PDU occupies N number of subframes in an actual physical layer subframe.

Thus, a period of TX puncturing may be an integer multiple of N.

Here, the RX UE may also know the fact that a last symbol of a subframe corresponding to the integer multiple of N is TX-punctured.

In addition, a method for performing puncturing to prevent a collision between signals in a situation in which WAN TX is performed on CC2.

In this situation, the aforementioned methods may be applied as is to a collision or overlapping between signals that may occur due to D2D transmission (subframe n) in CC1 and WAN transmission (subframe n+1) in CC2.

In this case, transmission of a pre-signal may be defined to allow the RX UE to receive related information through RRC signaling or PHY/MAC signaling to recognize a transmission situation in the CC2.

Hereinafter, a problem of a power limitation that may arise due to simultaneous transmissions of signals in CA will be described.

That is, in the case of CA, a power limitation situation is also required to be additionally considered, as well as the collision situation due to simultaneous transmissions described above.

If a power limitation situation is not met, the aforementioned methods and rules may be used as is.

However, in a case in which a power limitation situation should be considered due to overlapping between CCs, a portion or the entirety of collision signals should be dropped or the signals should be transmitted by reducing transmission power.

In this case, subframe boundaries corresponding to CC1 and CC2 are not adjusted or TA values thereof are different to cause signal transmissions to partially overlap each other.

Thus, in this case, dropping of signal transmission and power control, as well as puncturing a TX symbol, that is, a portion of an SF, should be considered together.

A situation in which a discovery signal is transmitted through CC1 and a WAN signal is transmitted through CC2 will be described as an example.

In the case of discovery signal, it is assumed that a TA value is 0 (TA=0), and in case of WAN TX, it is assumed that a TA value is greater than 0 (TA>0).

In this case, the TX UE should determine whether to transmit a last symbol of the discover signal as is or whether to perform TX puncturing.

If a situation is not the power limitation situation, the TX UE transmits the discovery signal as is without puncturing.

However, in a case in which an overlap portion should be avoided due to interference in signal between carriers, the TX UE performs TX puncturing to transmit the discovery signal.

Here, the TX UE and the RX UE performs signaling for sharing a puncturing situation in advance.

Similarly, even in the case of subframe bundling (SB), when WAN transmission of the CC2 affects a signal transmitted through the CC1, the TX UE may be defined to drop or skip D2D transmission in a subframe in which a collision occurs, or may be defined to drop the entirety of subframe bundling.

In another embodiment, in case of subframe bundling, a collision between signals may be prevented through an eNB scheduling restriction.

That is, in a case in which D2D subframe bundling is performed in the subframe #n and SF #n+1, the eNB does not perform WAN scheduling in the subframe #n+1 such that the RX UE may know that there is no WAN TX in the subframe #n+1.

In this case, the subframe #n+1 may include a previously designated gap (i.e. TX puncturing).

In another embodiment, in a case in which TAGs are different, transmission may be performed even in subframe boundaries which are not aligned with each other, separate processing is not required for overlapped signals between the CC1 and the CC2.

That is, in this case, since an interference problem due to a power limitation or a collision between signals does not arise, a rule such as a separate gap or dropping is not required.

However, in case of the same TAG, the aforementioned situation may be changed. That is, in this case, a gap may be required in a specific SF, or according to circumstances, transmission of a signal in a specific SF may need to be dropped.

In particular, in case of exceeding a TA error range (e.g., 30 us) between CCs, positive measures such as dropping a D2D signal or a WAN signal may be required to be taken.

In another embodiment, a case in which D2C transmission is performed on the CC1 and WAN TX is performed on the CC2 will be described.

For example, it is assumed that the TX UE performs D2D transmission in the subframe #n of the CC1 and transmits a WAN TX or a D2D TX in a subframe #n+1 of the CC1 or a WAN TX or a D2D in a subframe #n+1 of the CC2.

In this case, the subframe #n (D2D transmission) of the CC1 includes a gap (TX puncturing) in a final portion.

Here, it may be defined that the subframe #n (D2D transmission) of the CC1 includes a gap only in a case in which TA=0 is applied.

In addition, an example in which D2D transmission is performed on the CC1 and D2D or WAN transmission is performed on the CC2 in a carrier aggregation situation will be described.

In a case in which the CC1 and CC2 are the same CCs, the methods described above in the non-CA situation may be applied.

For example, it may be previously defined that all the bundled SFs are abandoned when WAN TX cannot be performed in a portion of bundling SF or a WAN TX situation is known.

The previous definition may be a WAN scheduling restriction (i.e., WAN scheduling is performed in a D2D subframe bundling section), retransmission of a signal in an SF omitted in a subsequent after D2D subframe bundling is stopped, an operation of transmitting a portion following the skipped SF without a signal transmission in the omitted SF, an operation of dropping all the packet transmissions by subframe bundling, or an operation of automatically disabling (or deactivating or releasing) subframe bundling.

In addition, WAN TX may occur in the same CC or may occur in a different CC in the middle of D2D transmission.

In particular, in a case in which WAN TX is in the same TAG or in a different TAG if a difference in TA value is equal to or greater than a predetermined value, the foregoing method may be applied.

That is, which rule is to be applied may be determined according to differences in the TA value.

In addition, in a case in which signals are classified according to TA values without distinguishing between D2D and WAN and overlapping occurs between SFs due to a position of a subframe with a TA value after a subframe without a TA, the foregoing overlapping solving method may be applied.

Here, a threshold value of the TA value may be 0 or a certain vale, and may be designated in advance.

That is, a D2D signal and a WAN signal having a TA value are classified to have the same attribute, and the foregoing rule may be applied.

Figure 51:
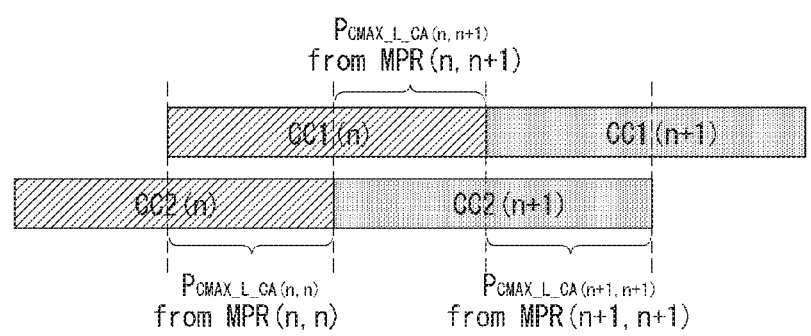
FIGS. 51 to 55 are views illustrating examples of a D2D transmission method in a CA situation proposed in this disclosure.

FIG. 51 is a view illustrating an example of a D2D transmission method in a CA situation proposed in this disclosure.

Specifically, FIG. 51 illustrates an example of a method for performing D2D transmission by applying power limitation (Pcmax) in a CA situation in which subframe boundaries are not aligned.

Here, Pcmax indicates configured maximum UE output power.

Referring to FIG. 51, it can be seen that maximum power reduction parameters are different according to overlapping sections between CCs, so a power limitation situation is varied in units of subframes.

Thus, in the CA situation, a gap setting may be differently applied to D2D transmission according to overlapping sections between CCs.

For example, in a case in which a power limitation is not predicted in CA and overlapping occurs between signal transmissions, a rule may be determined in advance to set a gap at the end of every subframe of each CC.

In this case the RX UE may accurately know puncturing applied to transmission of the TX UE.

Or, in case of the same TAG or in case in which a TA value is equal to or smaller than a threshold value (in a case in which the TA value is smaller than the threshold value), a gap setting rule defined in a single carrier may be re-used as is.

Here, in a case in which an overlapping section is small between signals, it is assumed that an influence of a power limitation (according to MPR) will be limited, whereby overlapping between signals is disregarded and a non-CA rule is used.

However, when the TA value is greater than the predetermined value (or the threshold value), an influence of the overlapping signal (between carriers) may be increased and a situation in each subframe is changed, and thus, it may be desirable to set a gap having a predetermined size in a final portion of (or at the end of) every subframe in D2D transmission such that the RX UE may recognize the situation.

Hereinafter, methods for solving a collision that may occur as a D2D signal different from a D2D synchronization signal (D2DSS) is continuously transmitted will be described.

In a case in which the D2DSS signal and a different D2D signal are continuously transmitted through consecutive SFs, a preceding subframe of an SF in which the D2DSS is transmitted may not require a gap (or TX puncturing).

Also, a situation in which the D2DSS signal is not transmitted may be prevented by introducing scheduling restricting to an SF subsequent to the SF in which the D2DSS is transmitted.

There is a possibility that resource of the D2DSS signal is reserved by the eNB or according to a previously designated method, and a possibility that the D2DSS is transmitted in the reserved resource may be high.

Also, the D2DSS signal has characteristics that it is periodically transmitted, and thus, resource of the D2DSS may be periodically allocated.

In this manner, resource for the D2DSS signal may be transmitted to the RX UE in advance through RRC signaling or an SIB.

Thus, the RX UE may previously know information (resource pool information) of a subframe having a possibility in which the D2DSS is transmitted, through a previously transmitted signal.

Also, since the eNB directly allocates resource of the D2DSS signal, it may recognize a position of the resource in which the D2DSS signal is transmitted Thus, the eNB may perform scheduling regarding transmission of a different D2D signal by avoiding a position of the resource previously allocated for the D2DSS, whereby a collision that may occur between the D2DSS and the different D2D signal.

That is, the D2DSS may be defined to be regarded as a signal protected in a WAN scheduling subject, whereby a situation in which the D2DSS is dropped due to a problem of priority or puncturing is performed in a partial region in which the D2DSS signal is transmitted may not take place.

For example, it is assumed that a D2D signal is transmitted through an SF #n and the D2DSS is transmitted through an SF #n+1.

Here, in a case in which a TA is configured such that D2DSS transmission does not collide with a previous D2D transmission, the SF #n does not require a separate gap or TX puncturing to avoid signal collision.

The reason is because a TA value of the D2DSS is basically assumed not to be greater than a D2D signal (e.g., data transmission with a TA value), and thus, the SF #n in which the D2D signal is transmitted does not require a gap.

In another embodiment, D2DSS transmission may be protected by scheduling such that WAN transmission does not made behind the D2DSS transmission.

That is, since WAN transmission is not scheduled in a subsequent subframe of an SF in which the D2DSS is transmitted in consideration of transmission of the D2DSS signal, an overlapping problem does not arise between the WAN transmission and the D2DSS signal.

Thus, in this case, the D2DSS transmission SF does not require a gap or TX puncturing.

In addition, any other D2D signals, as well as the WAN transmission, may be scheduled to avoid a collision with the D2DSS transmission, whereby the D2DSS transmission may be protected without setting a gap.

In detail, by setting a TA value to be greater than the D2DSS transmission or by not scheduling a signal that may overlap the D2DSS transmission in terms of time, the D2DSS transmission may be protected and an unnecessary gap may not be set.

In addition, by performing scheduling such that resource is not allocated to a signal having a TA value greater than the D2DSS immediately after the D2DSS resource, a signal collision may be prevented.

Alternatively, even though resource for a different signal is reserved in the D2DSS transmission resource, the TX UE may transmit the D2DSS, whereby a signal that may overlap the D2DSS transmission may not be automatically transmitted.

It is assumed that the RX UE recognizes such a situation through previously agreement with the TX UE or the eNB.

Meanwhile, in order for the RX UE to receive a signal (e.g., previous data) close to the D2DSS, the adjacent signal should use the same timing reference as that of the D2DSS.

The reason is because the RX UE may accurately decode data when the D2DSS and the D2D data are synchronized.

However, since it is not guaranteed whether the D2DSS and the D2D data are synchronized, the RX UE is informed about whether the D2DSS and the D2D data are synchronized, so that the RX UE may accurately perform decoding on the D2D data.

For example, information indicating whether synchronization is adjusted may be included in a data (demodulation) reference signal and transmitted to the RX UE.

That is, the information related to whether synchronization is adjusted may be included in an attribute (root index, CS index, OCC index, etc.) of a DM RS sequence.

In detail, at least a portion of the attribute of the DM RS sequence may be induced from a sequence of the D2DSS adjusted in synchronization.

As a result, the RX UE may recognize which D2D channel and which D2DSS are synchronized, and may not set a separate gap in a case in which the D2DSS follows a D2D channel in synchronization.

Hereinafter, a method for solving a power limitation or a power shortage phenomenon in a CA situation will be described in more detail with reference to FIGS. 52 to 55.

In case of a terminal set to use two or more component carriers (CCs), D2D transmission may be performed in one carrier and WAN transmission may be performed in another carrier simultaneously.

In this case, power per transmission channel and per carrier may be reduced due to a power limitation problem according to simultaneous transmissions of the signals through the CCs.

Hereinafter, the present disclosure provides a scheme for solving a power limitation problem in consideration of characteristics of D2D transmission when some carriers, among a plurality of CCs, are used for D2D and the other carriers are used for WAN in a case in which data can be transmitted using a plurality of CCs.

In general, a method of transmitting a WAN signal when a simultaneous transmission situation occurs by comparing a D2D signal and the WAN signal, that is, a method of giving priority to the WAN signal, is assumed.

However, as discussed above, in the case of D2DSS transmission, the D2DSS transmission may be defined to have higher priority than the WAN signal.

Figure 52:
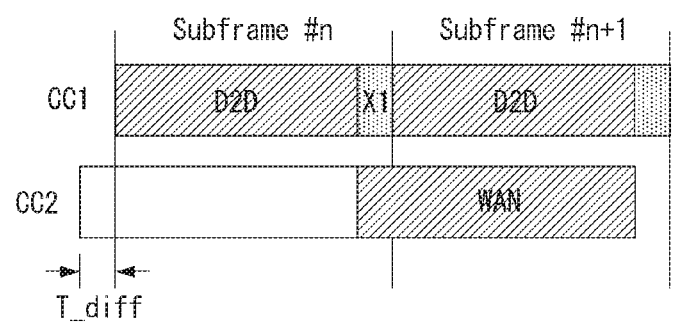

FIG. 52 is a view illustrating another example of a D2D transmission method in a CA situation proposed in this disclosure.

Referring to FIG. 52, a method for transmitting a D2D signal through the CC1 and transmitting a WAN signal through the CC2 will be described.

In the CC1, it is assumed to continuously transmit a D2D signal through the SF #n and the SF #n+1, and TA=0 is applied to transmission of each signal.

In this case, transmission of continuous D2D signals is defined as one D2D transmission according to the rule discussed above, and a gap is not set or symbol puncturing is not performed at the end of a plurality of subframes present in the middle of transmission of the continuous D2D signals.

However, a gap is set in a final portion of a last subframe of the continuous SFs according to the rule discussed above.

As illustrated in FIG. 52, as the WAN signal is transmitted in the CC2, in particular, a power limitation problem may arise in an overlap section, X1 region, due to overlapping between the D2D signal and the WAN signal in the X1 region.

That is, in the X1 section, a phenomenon in which a maximum transmission power set value is exceeded due to simultaneous transmissions of signals may occur.

The UE, recognizing the situation, may give priority to transmission of the WAN signal of the subframe #n+1 and may puncture the last symbol, i.e., X1, of the D2D signal transmission of the subframe #n. An operation related to performing puncturing may be varied according to TA values.

For example, in a case in which a TA value is greater than a length of 1 symbol, the TX UE may not transmit the D2D signal through the subframe #n. That is, transmission of the D2D signal in the SF #n is dropped.

On the other hand, in a case in which the TA is smaller than the length of 1 symbol, the TX UE may perform puncturing only on the overlapped symbol, so that the D2D signal may not be transmitted only in the overlapped symbol.

Here, the maximum transmission power value for D2D transmission may be separately defined, and power headroom reporting may be calculated on the basis of the maximum power value and reported.

If the set maximum transmission power value is exceeded in a signal/symbol overlapping situation, a partial symbol of D2D transmission or D2D transmission subframe is dropped.

Figure 53:
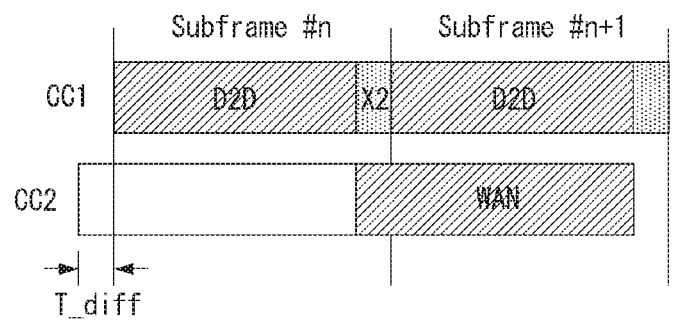

FIG. 53 is a view illustrating another example of a D2D transmission method in a CA situation proposed in this disclosure.

Specifically, FIG. 53 illustrates an operation of lowering power (or controlling power) in an X2 section, instead of puncturing the X2 section.

This case may correspond to a case in which a maximum transmission power value is not exceeded in an overlapping section of a signal.

Here, it should be assumed that transmission of a D2D signal does not affect transmission of a WAN signal.

Figure 54:
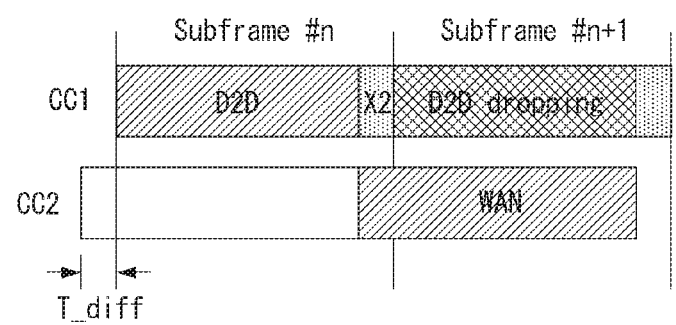

FIG. 54 is a view illustrating another example of a D2D transmission method in a CA situation proposed in this disclosure.

Specifically, FIG. 54 illustrates an operation of dropping any D2D signal (in subframe) that is even slightly overlap a WAN signal, by predicting that the set maximum transmission power value is exceeded in the overlap section X2.

That is, it can be seen that the entire SF #n+1 overlapping the WAN signal in the X2 section in which it overlaps transmission of the WAN signal and in most regions of the SN #n is dropped.

The method of FIG. 54 is advantageous in that the maximum transmission power set value can be maintained over two subframes (SF #n and SF #n+1) by preventing simultaneous transmission through dropping of the overlap section.

Figure 55:
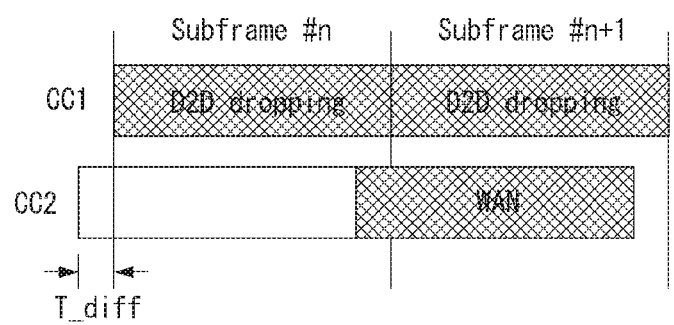

FIG. 55 is a view illustrating another example of a D2D transmission method in a CA situation proposed in this disclosure.

In FIG. 54, it is illustrated that transmission of the D2D signal is punctured or dropped in a time section in which the WAN signal and the D2D signal overlap.

FIG. 55 illustrates an operation of dropping the entire SF of a CC having a transmission section of a signal which even slightly overlap transmission of the WAN signal, unlike FIG. 54 described above.

That is, as illustrated in FIG. 55, the SF #n and SF #n+1 of the CC1 have a portion overlapping the WAN signal transmission section of the CC2, and thus, transmission regarding the D2D signal is dropped in the entirety of the SF #n and the SF #n+1 of the CC1.

The method described above with reference to FIGS. 52 to 55 show a case in which a maximum transmission power value for a D2D signal is assumed to be separately set.

On the basis of the set maximum transmission power value, the TX UE calculates a power headroom report (PHR) for D2D signal transmission and performs an operation of reporting the calculated PHR.

In the D2D power headroom report within the same cell, a PH is calculated on the basis of a previously determined virtual transmission format, and the calculated PH is reported.

On the other hand, in case of CA, a PH is calculated on the basis of an actually transmitted D2D transmission format, and the calculated PH is reported.

Device to Which Present Invention is Applicable

Figure 56:
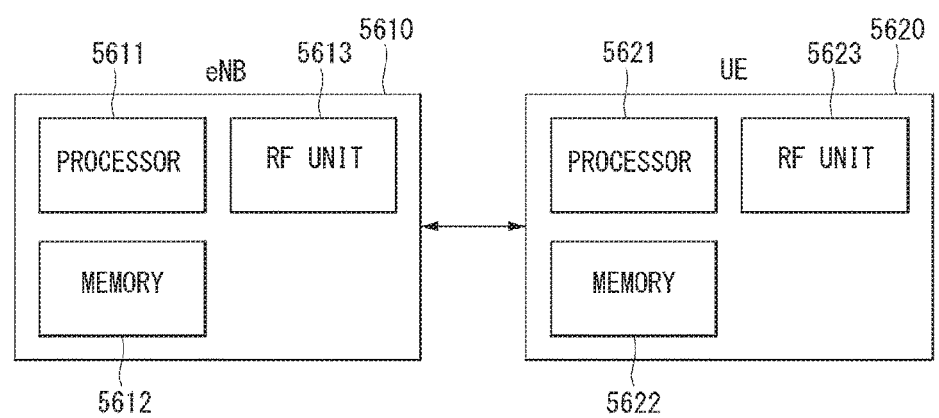
FIG. 56 is a view illustrating an example of an internal block diagram of a wireless communication device to which methods proposed in this disclosure are applicable.

FIG. 56 is a view illustrating an example of an internal block diagram of a wireless communication device to which methods proposed in this disclosure are applicable.

Referring to FIG. 56, a wireless communication system includes a base station (BS) (or eNB) 5610 and a plurality of terminals (or UEs) 5620 positioned within coverage of the BS 5610.

The eNB 5610 includes a processor 5611, a memory 5612, and a radio frequency (RF) unit 5613. The processor 5611 implements functions, processes and/or methods proposed in FIGS. 1 through 46. Layers of radio interface protocols may be implemented by the processor 5611. The memory 5612 may be connected to the processor 5611 to store various types of information for driving the processor 5611. The RF unit 5613 may be connected to the processor 5611 to transmit and/or receive a wireless signal.

The UE 5620 includes a processor 5621, a memory 5622, and a radio frequency (RF) unit 5623. The processor 5621 implements functions, processes and/or methods proposed in FIGS. 1 through 55. Layers of radio interface protocols may be implemented by the processor 5621. The memory 5622 may be connected to the processor 5621 to store various types of information for driving the processor 5621. The RF unit 5623 may be connected to the processor 5621 to transmit and/or receive a wireless signal.

The memory 5612 or 5622 may be present within or outside of the processor 5611 or 5621 and may be connected to the processor 5611 or 5621 through various well known units. Also, the eNB 5610 and/or the UE 5620 may have a single antenna or multiple antennas.

The above-described embodiments are results in which the elements and characteristics of the present invention are combined in a specific form. Each of the element or characteristics has to be considered as being optional unless otherwise explicitly described. Each of the elements or characteristics may be implemented in such a way as not to be combined with other elements or characteristics. Furthermore, some of the elements and/or the characteristics may be combined to form an embodiment of the present invention. Order of the operations described in the embodiments of the present invention may be changed. Some of the elements or characteristics of one embodiment may be included in the other embodiment or may be replaced with elements or characteristics corresponding to the other embodiment. It is evident that in the claims, embodiments may be constructed by combining claims not having an explicit citation relation or the claims not having an explicit citation relation may be included in a new claim according to amendments after an application.

The embodiments of the present invention may be implemented by various means, for example, hardware, firmware, software, or any combinations thereof. For hardware implementation, methods according to embodiments of the present disclosure described herein may be implemented by one or more of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and the like.

For firmware or software implementation, the methods according to embodiments of the present disclosure may be implemented in the form of a module, a procedure, a function, or the like, performing the foregoing functions or operations. Software codes may be stored in a memory unit and driven by a processor. The memory unit may be positioned within or outside of the processor and exchange data with the processor through various known means.

The present invention be materialized in a specific form without departing from the spirit and essential characteristics of the present invention. Accordingly, the detailed description should not be interpreted as being limited from all aspects, but should be considered as being illustrative. The scope of the present invention should be determined by reasonable analysis of the attached claims, and all changes within an equivalent range of the present invention fall within the scope of the present invention. Furthermore, in the claims, embodiments may be constructed by combining claims not having an explicit citation relation or the claims not having an explicit citation relation may be included in a new claim according to amendments after an application.

INDUSTRIAL APPLICABILITY

In the wireless communication system of this disclosure, an example of a D2D transmission scheme applied to a 3GPP LTE/LTE-A system is described, but the D2D transmission scheme may also be applied to various wireless communication systems other than the 3GPP LTE/LTE-A system.

The invention claimed is:

1. A terminal for transmitting a device-to-device (D2D) signal using a first component carrier and a cellular signal using a second component carrier in a wireless communication system supporting a carrier aggregation, the terminal comprising:
a radio frequency (RF) unit including a transceiver and configured to transmit and receive a wireless signal; and
a processor functionally connected to the RF unit, wherein the processor
controls the RF unit to transmit the D2D signal on the first component carrier to a second terminal;
controls the RF unit to transmit the cellular signal on the second component carrier to a base station; and
punctures on an overlapped portion of the first component carrier based on timing advance (TA) to control a transmission power of the D2D signal not to exceed a maximum transmission power in the overlapped portion of a subframe if the transmission of the D2D signal overlaps with the transmission of the cellular signal.

2. A method for transmitting, by a first terminal, a device-to-device (D2D) signal using a first component carrier and a cellular signal using a second component carrier in a wireless communication system, the method comprising:

transmitting the D2D signal on the first component carrier to a second terminal;

transmitting the cellular signal on the second component carrier to a base station; and puncturing on an overlapped portion of the first component carrier based on timing advance (TA) to control a transmission power of the D2D signal not to exceed a maximum transmission power in the overlapped portion of a subframe if the transmission of the D2D signal overlaps with the transmission of the cellular signal.

3. The method of claim 2, wherein the D2D signal is transmitted in a first subframe, and the cellular signal is transmitted in a second subframe.

4. The method of claim 3, wherein the first subframe is a subframe #n, and the second subframe is a subframe #n+1.

5. The method of claim 2, wherein the overlapped portion is less than 100% of the first subframe.

\* \* \* \* \*